US011857962B2

(12) United States Patent
Ferguson et al.

(10) Patent No.: US 11,857,962 B2
(45) Date of Patent: Jan. 2, 2024

(54) SYSTEMS AND METHODS FOR SAMPLE ANALYSIS

(71) Applicant: Aptitude Medical Systems, Inc., Goleta, CA (US)

(72) Inventors: Brian Scott Ferguson, Goleta, CA (US); Wentao Shi, Goleta, CA (US); Hui Kang, Goleta, CA (US); Tyler Chozinski, Goleta, CA (US); Jinpeng Wang, Goleta, CA (US); Qiang Gong, Goleta, CA (US)

(73) Assignee: APTITUDE MEDICAL SYSTEMS, INC., Goleta, CA (US)

( * ) Notice: Subject to any disclaimer, the term of this patent is extended or adjusted under 35 U.S.C. 154(b) by 0 days.

(21) Appl. No.: 17/879,312

(22) Filed: Aug. 2, 2022

(65) Prior Publication Data

US 2023/0027159 A1 Jan. 26, 2023

Related U.S. Application Data

(63) Continuation of application No. PCT/IB2022/051223, filed on Feb. 11, 2022.

(60) Provisional application No. 63/149,241, filed on Feb. 13, 2021.

(51) Int. Cl.
*B01L 3/00* (2006.01)

(52) U.S. Cl.
CPC ... *B01L 3/502723* (2013.01); *B01L 2200/026* (2013.01); *B01L 2200/0689* (2013.01); *B01L 2200/141* (2013.01); *B01L 2300/042* (2013.01); *B01L 2300/044* (2013.01); *B01L 2300/047* (2013.01); *B01L 2300/0672* (2013.01); *B01L 2300/0887* (2013.01); *B01L 2300/123* (2013.01); *B01L 2300/165* (2013.01)

(58) Field of Classification Search
CPC ............ B01L 3/502723; B01L 3/5029; B01L 2200/026; B01L 2300/042; B01L 2300/044; B01L 2300/047; B01L 2300/0672
See application file for complete search history.

(56) References Cited

U.S. PATENT DOCUMENTS 4,654,127 A * 3/1987 Baker .................... G01N 33/49 205/792
5,922,591 A * 7/1999 Anderson ............... B01F 35/71 422/68.1
2002/0173047 A1* 11/2002 Hudak .................. B01L 3/5023 436/178
2017/0152081 A1* 6/2017 Crivelli ............. B01L 3/502715

* cited by examiner

*Primary Examiner* — Jill A Warden
*Assistant Examiner* — Dwayne K Handy
(74) *Attorney, Agent, or Firm* — IPRO, PLLC; Na Xu

(57) ABSTRACT

The present disclosure provides systems and methods for sample analysis. The system comprises a container. The container comprises a sample receptacle and a cap, and the cap comprises a reservoir for retaining a composition, a first piercing member and a first pierceable barrier for sealing said composition within said reservoir. There is also provided a method for sample analysis.

13 Claims, 36 Drawing Sheets

Front

Top

Bottom

Front

Top

Bottom

Top

Bottom

SYSTEMS AND METHODS FOR SAMPLE ANALYSIS

This application is a continuation of PCT/IB2022/051223, filed Feb. 11, 2022, which claims the benefit of U.S. Application No. 63/149,241, filed Feb. 13, 2021. Priority is claimed to these applications and the disclosures of these prior applications are considered part of the disclosure of this application and to the extent allowed the entire contents of the aforementioned applications are incorporated herein.

FIELD OF THE INVENTION

The present disclosure relates to the biomedical field, in particular to systems and methods for sample analysis.

BACKGROUND OF THE INVENTION

Most biological assay systems rely on collection devices. However, specimens or reagents in the devices are usually leaking from the devices, and concerns with cross-contamination are especially acute when the assay being performed involves biological samples. Additionally, there are too many procedures in analyzing samples including measuring the volume of the specimens and the reagents. Therefore, there is substantial interest in developing a system or method for sample analysis for users without training.

SUMMARY OF THE INVENTION

The present disclosure provides systems and methods for sample analysis. As for users without training, the system might also be used to analyze a sample, e.g., a biological specimen. Furthermore, there may be no need to measure the volume of the specimens or the reagents before performing an assay on the present system. Additionally, the system may be also designed to prevent the specimens and the reagents leaking. Therefore, it may be convenient to perform an assay on the present system, and the qualitative or quantitative results of an assay may be reliable.

In one aspect, the present disclosure provides a container, comprising a sample receptacle and a cap, wherein: the cap comprises a reservoir for retaining a composition, a first piercing member and a first pierceable barrier for sealing said composition within said reservoir; the sample receptacle comprises a first open end for receiving a sample, and one or more second piercing members, said first open end is configured for closure by said cap and for receiving said composition; said first piercing member and said one or more second piercing members are configured to disestablish the first pierceable barrier from opposite side of said first pierceable barrier when said first open end is closed by said cap.

In some embodiments, wherein said first piercing member extends downwardly toward said first open end of the sample receptacle when said first open end is closed by said cap.

In some embodiments, wherein said cap comprises a top inner surface, and said first piercing member extends from the top inner surface of said cap.

In some embodiments, wherein said first piercing member extends approximately perpendicularly from said top inner surface.

In some embodiments, wherein said first piercing member comprises a blunt or curved upper edge.

In some embodiments, wherein said sample receptacle comprises an inner base surface, and the width of said first open end is greater than or equal to the width of said inner base surface.

In some embodiments, wherein said one or more second piercing members extend upwardly toward said first open end of the sample receptable.

In some embodiments, wherein said one or more second piercing members extend from the inner base surface of said sample receptable.

In some embodiments, wherein said one or more second piercing members extend approximately perpendicularly from said inner base surface of said sample receptable.

In some embodiments, wherein said sample receptacle comprises two of said second piercing members arranged opposite one another on either side of a vertical plane extending through the length of said sample receptable.

In some embodiments, wherein said sample receptacle comprises two of said second piercing members configured to allow said first piercing member to be positioned between them when said first open end is closed by said cap.

In some embodiments, wherein each of said one or more second piercing members comprises a blunt or curved upper edge.

In some embodiments, wherein said first and second piercing members are configured to disestablish said first pierceable barrier without a twisting action during closure of said cap.

In some embodiments, wherein said first pierceable barrier comprises a pierceable plastic film or a foil film.

In some embodiments, wherein said first pierceable barrier comprises a pierceable film made from a material selected from the group consisting of polyethylene terephthalate (PETE), polycarbonate, polyethylene, and polyvinyl chloride (PVC).

In some embodiments, wherein said sample receptacle comprises an outlet, and said outlet is in fluidic communication with said sample receptable.

In some embodiments, wherein said outlet is on said inner base surface of said sample receptable.

In some embodiments, wherein said outlet is sealed by a second pierceable barrier.

In some embodiments, wherein said second pierceable barrier comprises a pierceable plastic film or a foil film.

In some embodiments, wherein said second pierceable barrier comprises a pierceable film made from a material selected from the group consisting of polyethylene terephthalate (PETE), polycarbonate, polyethylene, and polyvinyl chloride (PVC).

In some embodiments, wherein said cap is attached to said sample receptacle via a living hinge, or said cap is not attached to said sample receptable.

In some embodiments, wherein said cap comprises a wall defining the outer perimeter of said reservoir.

In some embodiments, wherein said wall has an outer edge and said first pierceable barrier is sealingly attached to said outer edge so as to cover said reservoir.

In some embodiments, wherein said wall nests within the first open end of said sample receptacle to form a fluid tight seal when said first open end is closed by said cap.

In some embodiments, wherein an outer surface of said wall is made from or is coated with an elastomeric material for sealingly engagement against an inner surface of said sample receptacle when said first open end is closed by said cap.

In some embodiments, wherein at least a portion of an interior surface of the sample receptable, configured to be in contact with said wall of the cap when the cap is closed, is made from or is coated with an elastomeric material substantially coextensive with said elastomeric material of the outer surface of the wall, for sealing the first open end against flow when the atmospheric pressure is equal to or greater than the pressure in the container.

In some embodiments, wherein said elastomeric material is independently selected from the group consisting of polytetrafluoroethylene (PTFE), polycarbonate (PCTE), polyethylene (PE) and polypropylene (PP).

In some embodiments, wherein the reservoir is sized to accommodate no less than about 500 μL.

In some embodiments, wherein the reservoir is sized to accommodate about 500 μL to about 3000 μL of said composition.

In some embodiments, wherein said sample receptacle is configured to receive about 0.5 ml to about 1.5 ml of said sample.

In some embodiments, wherein said sample is a biological sample.

In some embodiments, wherein said biological sample is saliva.

In some embodiments, wherein said sample receptacle includes an interior surface that is sloped downward from said first open end toward said inner base surface, wherein said sloped interior surface defines a flow path for said composition following release of said composition from said reservoir when said first pierceable barrier is disestablished by said first and second piercing members.

In some embodiments, wherein said cap further comprises said composition sealed within said reservoir.

In some embodiments, wherein said composition comprises one or more selected from the group consisting of: redox reagent, nucleic acid, nonionic detergent, DNA intercalating redox reporter, and ribonuclease inhibitor.

In some embodiments, wherein said DNA intercalating redox reporter comprise methylene blue.

In some embodiments, wherein said sample receptacle comprises one or more third piercing members located on an outer base surface of said sample receptacle, said one or more third piercing members extend outwardly from said outer base surface.

In some embodiments, wherein sample receptacle comprises an extension, said extension extends outwardly from said outer base surface and an inner of said extension is in fluidic communication with said first open.

In some embodiments, wherein the diameter of an outer surface of said extension is smaller or equal to the diameter of an inner surface of a sample receiving inlet of an adapter.

In some embodiments, wherein said outer surface of said extension is made from or is coated with an elastomeric material for sealingly engagement against said inner surface of said sample receiving inlet when said container is mounted on said adapter.

In some embodiments, wherein at least a portion of said inner surface of said sample receiving inlet, configured to be in contact with said extension of said container when said container is mounted on said adapter, is made from or is coated with an elastomeric material substantially coextensive with said elastomeric material of said outer surface of said extension, to form a fluid tight seal when said container is mounted on said adapter.

In some embodiments, wherein said one or more third piercing members extend outwardly from an outer base surface of said extension.

In some embodiments, wherein said one or more third piercing members extend approximately perpendicularly from said outer base surface.

In some embodiments, wherein said one or more third piercing members extend in a direction substantially oppositely to said one or more second piercing members.

In some embodiments, wherein said one or more third piercing member are arranged in a generally circular fashion on said outer surface of said extension.

In some embodiments, wherein said one or more third piercing members are arranged surrounding said outlet of the sample receptable.

In some embodiments, wherein said one or more third piercing members are configured to disestablish a pierceable barrier of an adapter when said container is mounted on said adapter.

In some embodiments, wherein said one or more third piercing members comprise a blunt or curved lower edge.

In some embodiments, wherein said one or more third piercing members have a height of no less than about 0.5 mm.

In some embodiments, wherein said one or more third piercing member extends downwardly toward a sample receiving inlet of an adapter when said container is mounted on said adapter.

In some embodiments, wherein said one or more third piercing member extends approximately perpendicularly downwardly toward said sample receiving inlet of said adapter.

In some embodiments, wherein said sample receptacle comprises one or more outer rings, said one or more outer ring extends outwardly from said outer base surface.

In some embodiments, wherein an outer surface of said one or more outer rings is made from or is coated with an elastomeric material for sealingly engagement against an inner surface of an adapter when said container is mounted on said adapter.

In some embodiments, wherein at least a portion of said inner surface of said adapter, configured to be in contact with said one or more outer rings of said container when said container is mounted on said adapter, is made from or is coated with an elastomeric material substantially coextensive with said elastomeric material of said outer surface of said one or more outer rings, to form a fluid tight seal when said container is mounted on said adapter.

In some embodiments, wherein said cap comprises a first snap feature and said sample receptacle comprises a second snap feature, said first snap feature and said second snap feature are configured for said first open to be irreversibly closed by said cap.

In some embodiments, wherein said first snap feature comprises at least one protruding element and said second snap feature comprises at least one recess element configured to irreversibly catch said at least one protruding element.

In some embodiments, wherein said sample receptacle comprises one or more third snap features, said one or more third snap features are on bottom of said sample receptable.

In some embodiments, wherein said one or more third snap features and one or more snap features of an adapter are configured for said container to be irreversibly mounted on said adapter.

In some embodiments, wherein said one or more third snap features comprise at least one protruding element, and said one or more snap features of said adapter comprise at least one recess element configured to irreversibly catch said at least one protruding element.

In some embodiments, wherein said container and said adapter form a tight seal when said container is mounted on said adapter.

In some embodiments, wherein said one or more third snap features are arranged opposite one another on either side of said outer base surface of said sample receptable.

In some embodiments, said one or more third snap features have a height of about 2 mm to about 5 mm.

In some embodiments, wherein said one or more third snap features comprise at least one protruding element or at least one recess element.

In some embodiments, wherein said sample receptacle has a height of no less than about 10 mm.

In some embodiments, wherein said sample receptacle has a height of about 10 mm to about 500 mm.

In some embodiments, wherein said sample receptacle has a height of about 250 mm.

In some embodiments, wherein said inner base surface of said sample receptacle has an area of about 200 $mm^2$ to about 600 $mm^2$.

In another aspect, the present disclosure provides a device comprising a first layer, said first layer comprises a sample receiving inlet, and at least one fluid channel extending from and in fluidic communication with said sample receiving inlet, the terminus of each fluid channel is in fluid communication with a vent sealed by a hydrophobic vent material, wherein said first layer has an average thickness of about 0.1 mm to about 0.3 mm.

In some embodiments, wherein said at least one fluid channel is configured to be completely filled with about 20 μL to about 150 μL fluid.

In some embodiments, wherein said at least one fluid channel comprises two or more fluid channels substantially equidistant from said sample receiving inlet.

In some embodiments, wherein said at least one fluid channel comprises two or more fluid channels with substantially equal channel width.

In some embodiments, wherein pore size of said vent has an average diameter of about 0.1 μm to about 10 μm.

In some embodiments, wherein said vent is a self-sealing vent.

In some embodiments, wherein said hydrophobic vent material is selected from the group consisting of: polytetrafluoroethylene (PTFE), polycarbonate (PCTE), polyethylene (PE) and polypropylene (PP).

In some embodiments, wherein side walls of the at least one fluid channel is not coated with a hydrophilic material.

In some embodiments, wherein said sample receiving inlet comprises a lyophilized reagent.

In some embodiments, wherein said lyophilized reagent comprises an assay reagent.

In some embodiments, wherein said assay reagent comprises a nucleic acid amplification enzyme and a DNA primer.

In some embodiments, wherein a height of each fluid channel is about 0.1 mm to about 1.5 mm.

In some embodiments, wherein a width of each fluid channel is about 0.3 mm to about 1 mm.

In some embodiments, wherein a length of each fluid channel is about 50 mm to about 150 mm.

In some embodiments, wherein said first layer is made of a polycarbonate material, an acrylic material or a mylar material.

In some embodiments, said device further comprises a second layer with at least one side coated with a hydrophilic material, and when said second layer is operably coupled with said first layer, said side coated with the hydrophilic material faces and/or is in contact with the first layer.

In some embodiments, said side is coated with said hydrophilic material via an acrylic material or a silicone material.

In some embodiments, wherein said second layer comprises a sample receiving inlet, and when said second layer is operably coupled with said first layer, said sample receiving inlet in the second layer is vertically aligned to said sample receiving inlet in the first layer.

In some embodiments, wherein said second layer is made of a polycarbonate material, an acrylic material or a mylar material.

In some embodiments, wherein said second layer has an average thickness of about 1 mm to about 4 mm.

In some embodiments, wherein said second layer is bound to said first layer with an adhesive.

In some embodiments, wherein said adhesive comprises an acrylic material or a silicone material.

In some embodiments, wherein said device further comprises a third layer with at least one side coated with a hydrophilic material, and when said third layer is operably coupled with said first layer, said side coated with the hydrophilic material faces and/or is in contact with the first layer.

In some embodiments, wherein said third layer has an average thickness of about 0.1 mm to about 0.3 mm.

In some embodiments, wherein said third layer is bound to said first layer with an adhesive.

In some embodiments, wherein said adhesive comprises an acrylic material or a silicone material.

In some embodiments, wherein said third layer comprises at least one opening, when said third layer is operably coupled with said first layer, each of said at least one opening is aligned to and in fluid communication with a fluid channel in the first layer.

In some embodiments, wherein said third layer comprises two or more said openings, and when said third layer is operably coupled with said first layer, none of the openings is aligned to the same fluid channel with another opening.

In some embodiments, wherein said third layer is made of a hydrophilic material.

In some embodiments, wherein said hydrophilic material comprises polyester.

In some embodiments, wherein said device further comprises a fourth layer, and the fourth layer comprises at least one vent sealed by a hydrophobic vent material, when said device is assembled, said terminus of each fluid channel in said first layer is in fluid communication with said at least one vent of the fourth layer.

In some embodiments, wherein said fourth layer has a thickness of about 0.1 mm to about 0.3 mm.

In some embodiments, wherein said fourth layer is bound to said second layer with an adhesive, or said fourth layer is an adhesive.

In some embodiments, wherein said adhesive comprises an acrylic material or a silicone material.

In some embodiments, wherein said fourth layer is made of an acrylic material or a silicone material.

In some embodiments, wherein said fourth layer comprises a sample receiving inlet, and when said fourth layer is operably coupled with said second layer, said sample receiving inlet in the fourth layer is vertically aligned to said sample receiving inlet in the second layer.

In some embodiments, said device further comprises a fifth layer, said fifth layer comprises a substrate coated with a layer of conductive material, and said conductive material is ablated to form insulative areas on said fifth layer.

In some embodiments, wherein said conductive material is gold.

In some embodiments, wherein said substrate is made from a material selected from the group consisting of polyethylene terephthalate (PETE), acrylonitrile butadiene styrene (ABS), polystyrene, polycarbonate, an acrylic, polyethylene terephthalate (PETG), polysulfone, and polyvinyl chloride (PVC).

In some embodiments, wherein said fifth layer comprises two symmetrically positioned insertion monitoring electrodes, and when said device is assembled, said insertion monitoring electrodes are exposed and not covered by any other layer of said device.

In some embodiments, wherein said two insertion monitoring electrodes are substantially identical.

In some embodiments, wherein the length of said insertion monitoring electrode is about 2 mm to about 4 mm.

In some embodiments, wherein the width of said insertion monitoring electrode is about 1 mm to about 3 mm.

In some embodiments, wherein said insertion monitoring electrode is located in a corner of said fifth layer.

In some embodiments, wherein said fifth layer comprises at least one working area, said working area comprises a working electrode, a counter electrode, a reference electrode and at least two fluid fill electrodes.

In some embodiments, wherein said counter electrode embraces said working electrode.

In some embodiments, wherein at least one of said fluid fill electrodes is positioned prior to said working electrode and at least one of said fluid fill electrodes is positioned after said working electrode along the direction of the current flow.

In some embodiments, wherein said fifth layer has an average thickness of about 0.1 mm to about 0.3 mm.

In some embodiments, wherein said fifth layer is bound to said third layer with an adhesive.

In some embodiments, wherein said adhesive comprises an acrylic material or a silicone material.

In some embodiments, wherein when said third layer is operably coupled with said fifth layer, said opening in said third layer is aligned to and in fluid communication with said working area in the fifth layer.

In some embodiments, wherein when said third layer is operably coupled with said fifth layer, said working area is not covered by said third layer.

In some embodiments, wherein when said device is assembled, said working area of said fifth layer is in fluid communication with said fluid channel of said first layer.

In some embodiments, said device further comprises an adapter for operably coupling to a container.

In some embodiments, wherein said container comprises the container of the present disclosure.

In some embodiments, wherein said adapter comprises a sample receiving inlet configured to be in fluid communication with said sample receiving inlet of said first layer of an assembled device.

In some embodiments, wherein said sample receiving inlet of said adapter is sealed by a pierceable barrier.

In some embodiments, wherein said pierceable barrier comprises a pierceable plastic films or a foil film.

In some embodiments, wherein said first pierceable barrier comprises a pierceable film made from a material selected from the group consisting of polyethylene terephthalate (PETE), polycarbonate, polyethylene, and polyvinyl chloride (PVC).

In some embodiments, wherein said sample receiving inlet of said adapter comprises a blocking element having a bottom configured to prevent said lyophilized reagent from leaving said device.

In some embodiments, wherein the bottom of said blocking element has a width greater than that of the lyophilized reagent.

In some embodiments, wherein said blocking element comprises at least one piercing member extending upwardly toward said pierceable barrier.

In some embodiments, wherein said piercing member is configured to disestablish a pierceable barrier of a container and a sample receptacle of said container is in fluidic communication with said sample receiving inlet of said adapter, when said container is mounted on said adapter.

In some embodiments, wherein said container comprises one or more piercing member, and said piercing member of said adapter is allowed to be positioned between said piercing member of said container when said container is mounted on said adapter.

In some embodiments, wherein said one or more piercing member of the adapter has a height of less than 5 mm.

In some embodiments, wherein said piercing member of said container is configured to disestablish said pierceable barrier of said device, said piercing member of said adapter is configured to disestablish a pierceable barrier of said container and a sample receptacle of said container is in fluidic communication with said sample receiving inlet of said adapter, when said container is mounted on said adapter.

In some embodiments, wherein said piercing member of said adapter comprises a blunt or curved upper edge.

In some embodiments, wherein said adapter comprises one or more snap features.

In some embodiments, wherein said one or more snap features of said adapter comprise at least one protruding element or at least one recess element.

In some embodiments, wherein said one or more snap features of said adapter and one or more snap features of a container are configured for said container to be irreversibly mounted on said device.

In some embodiments, wherein said one or more snap features of said container comprise at least one protruding element, and said one or more snap features of said device comprise at least one recess element configured to irreversibly catch said at least one protruding element.

In some embodiments, wherein at least a portion of the inner surface of the adapter, configured to be in contact with one or more outer rings of an outer base surface of a container when said container is mounted on said device, is made from or is coated with an elastomeric material substantially coextensive with said elastomeric material of the outer surface of said outer rings, to form a fluid tight seal when said container is mounted on said adapter.

In another aspect, the present disclosure provides a system, comprising the container of the present disclosure.

In some embodiments, the system further comprises a device of the present disclosure.

In some embodiments, the system further comprises a thermo control module.

In some embodiments, wherein said thermo control module is configured to perform isothermal nucleic acid amplification.

In some embodiments, wherein said thermo control module is configured to maintain a temperature of about 55° C. to about 75° C.

In some embodiments, the system further comprises a signal detection module.

In some embodiments, wherein said signal is an electrochemical signal.

In some embodiments, wherein said signal is a qualitative signal and/or a quantitative signal.

In another aspect, the present disclosure provides a method for collecting and/or storing a sample, comprising using the container of the present disclosure.

In another aspect, the present disclosure provides a method for determining the presence and/or amount of a target in a sample, comprising using the container of the present disclosure, the device of the present disclosure, and/or the system of the present disclosure.

In another aspect, the present disclosure provides a method for preparing a sample derived from a subject, comprising: I) introducing the sample into a sample receptacle through a first open end of said sample receptable; II) closing said first open end irreversibly by attaching a cap to said sample receptable; III) said cap comprises a reservoir for retaining a composition, a first piercing member and a first pierceable barrier for sealing said composition within said reservoir; IV) said sample receptacle comprises one or more second piercing members; V) when the first open end of the sample receptacle is closed by said cap, said first piercing member and said one or more second piercing members effect a force to disestablish the first pierceable barrier from opposite side of said first pierceable barrier.

In some embodiments, further comprising mixing the composition released from the cap and the sample within said irreversibly closed sample receptable.

In some embodiments, wherein said first piercing member extends downwardly toward said first open end of the sample receptacle when said first open end is closed by said cap.

In some embodiments, comprising using the container of the present disclosure.

In another aspect, the present disclosure provides a method for determining the presence and/or amount of a target in a sample, comprising: I) preparing the sample using the container of the present disclosure, II) mounting the container comprising the prepared sample on the device of the present disclosure; and III) inserting said device into a reader comprising a thermo control module and a signal detection module.

In some embodiments, wherein said first piercing member extends downwardly toward said first open end of the sample receptacle when said first open end is closed by said cap.

In some embodiments, wherein comprising using the system of the present disclosure.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWING

The novel features of the invention are set forth with particularity in the appended claims. A better understanding of the features and advantages of the present invention will be obtained by reference to the following detailed description that sets forth illustrative embodiments, in which the principles of the invention are employed, and the accompanying drawings (also "figure" and "FIG. " herein), of which:

DETAILED DESCRIPTION

Figure 1:
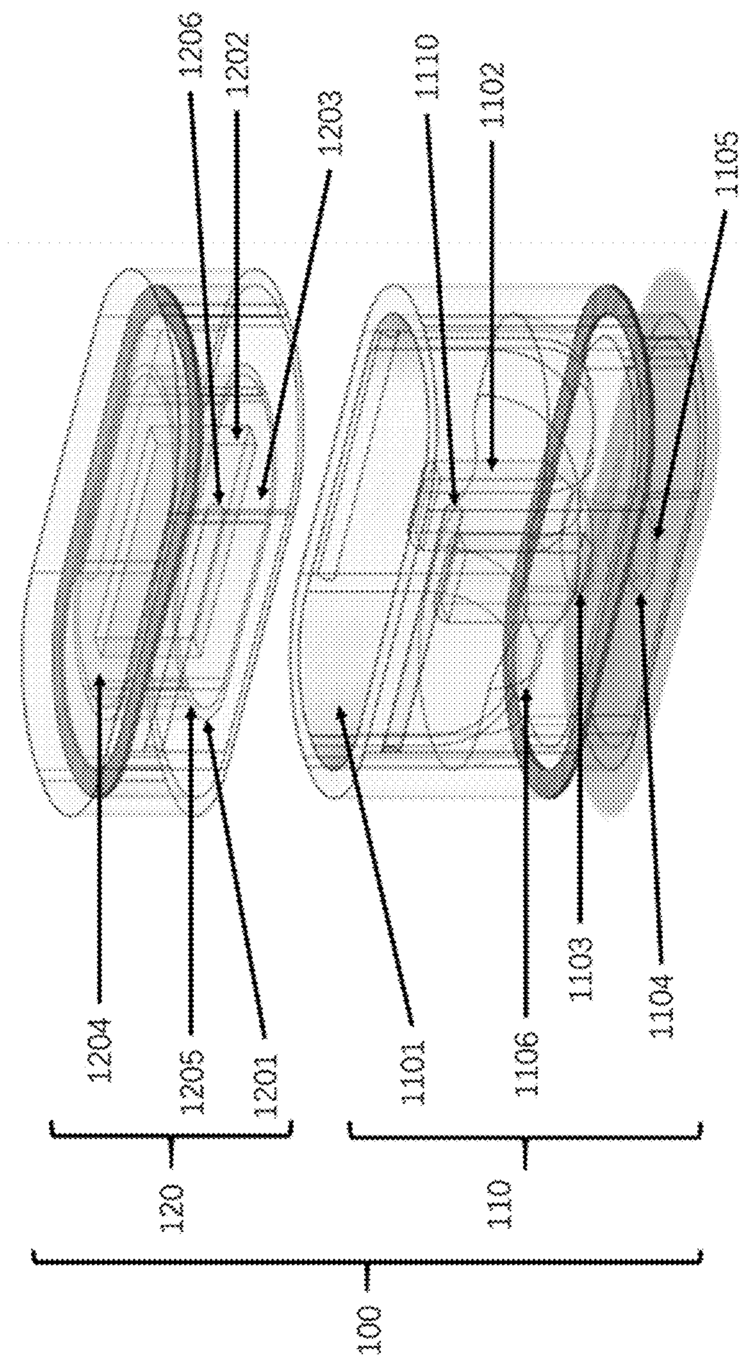
FIG. 1 illustrates a perspective view of a container according to an embodiment of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "acrylic" product or material, as used herein, generally refers to a synthetic polymer, for example, a polymer of methyl methacrylate. For example, a kind of acrylic product may include at least 70 at most acrylic acid of 100 weight %.

The term "acrylonitrile butadiene styrene", as used herein, generally refers to a synthetic polymer, for example, a polymer of an acrylonitrile, a butadiene and/or a styrene. For example, the average repeating unit number may be more than 10 or 100.

The term "adapter", as used herein, generally refers to any device for connecting two parts, for example parts that are of different dimensions, structure and/or functions. For example, while one part is hard to connect to another part, a suitable adapter may be used to connect these two or more parts.

The term "adhesive", as used herein, generally refers to a substance applied to one or both surfaces of two separate items that may bind them together, for example, a glue or a tape.

The term "area", as used herein, generally refers to a quantity that expresses the extent of a two-dimensional region.

The term "average diameter", as used herein, generally refers to an average possible chord of any circle, for example, the longest chord.

The term "average thickness", as used herein, generally refers to an average distance between opposite sides of one subject.

The term "biological sample", as used herein, generally refers to a sample collected from Study subjects and any tangible material directly or indirectly derived there from.

The term "blocking element", as used herein, generally refers to an element that may be used to block something to prevent leaking.

The term "bottom", as used herein, generally refers to a lowest part, point, or level of some object.

The term "cap", as used herein, generally refers to an overlaying or covering structure.

The term "conductive material", as used herein, generally refers to a material having a property of conducting electricity.

The term "container", as used herein, generally refers to any receptacle for holding a product.

The term "counter electrode", as used herein, generally refers to an electrode used in a three-electrode electrochemical cell for voltametric analysis or other reactions.

The term "DNA primer", as used herein, generally refers to a short nucleic acid utilized in the initiation of DNA synthesis.

The term "electrochemical signal", as used herein, generally refers to signal of electrical energy from chemical reactions.

The term "flow path", as used herein, generally refers to a route that air or liquid takes when flowing.

The term "fluid channel", as used herein, generally refers to a deeper part of a route that fluid takes when flowing.

The term "fluid fill electrodes", as used herein, generally refers to an electrode that indicate whether or not an area or a section is at least partially filled and/or covered by a fluid.

The term "fluid tight seal", as used herein, generally refers to a tight seal that prevents a leakage of a fluid.

The term "height", as used herein, generally refers to a measure of vertical distance.

The term "hydrophilic material", as used herein, generally refers to a material that is attracted to water.

The term "hydrophobic vent material", as used herein, generally refers to a material that is seemingly repelled from a mass of water used for vent.

The term "in fluidic communication with", as used herein, generally refers to that a fluid may flow between two or more parts.

The term "insulative area", as used herein, generally refers to an area that is not conductive.

The term "interior surface", as used herein, generally refers to a surface of an inside part of something.

The term "isothermal nucleic acid amplification", as used herein, generally refers to a nucleic acid amplification in which the temperature of the system remains constant or basically constant. For example, an isothermal nucleic acid amplification may be a RT-LAMP reaction.

The term "layer", as used herein, generally refers to something lying over or under something else.

The term "length", as used herein, generally refers to a measure of distance.

The term "living hinge", as used herein, generally refers to a flexure bearing that connects two or more parts.

The term "lyophilized reagent", as used herein, generally refers to a reagent that is lyophilized. For example, lyophilized reagent may be a bead or may be of any shape or form.

The term "mylar material", as used herein, generally refers to a polyester film, for example, a stretched polyester film.

The term "nucleic acid amplification enzyme", as used herein, generally refers to enzyme or enzymes used for nucleic acid amplification. For example, nucleic acid amplification enzyme may be a DNA polymerase.

The term "open end", as used herein, generally refers to an end of an object that may permitting an air or a fluid to flow in.

The term "opening", as used herein, generally refers to an aperture or gap. For example, the opening may be allowing access.

The term "outer base surface", as used herein, generally refers to a surface that is of the outer base of an object.

The term "outlet", as used herein, generally refers to a place or opening through which something may be let out.

The term "outwardly", as used herein, generally refers to toward the outside.

The term "PETE", as used herein, generally refers to polyethylene terephthalate. For example, the average repeating unit number may be more than 10 or 100.

The term "pierceable barrier", as used herein, generally refers to a barrier that may be provided for preventing fluid communication between the chambers or the passageways, and the barrier may be capable of being pierced.

The term "pierceable plastic film", as used herein, generally refers to a plastic film that may be capable of being pierced.

The term "piercing member", as used herein, generally refers to a member or a feature that is capable of piercing something. For example, a piercing member may have a blunt or curved upper edge or a pointing.

The term "polycarbonate", as used herein, generally refers to a polymer containing carbonate groups in their chemical structures. For example, the average repeating unit number may be more than 10 or 100.

The term "polyethylene", as used herein, generally refers to a polymer made by polymerizing ethylene. For example, the average repeating unit number may be more than 10 or 100.

The term "polyethylene terephthalate", as used herein, generally refers to a polymer synthesized from ethylene glycol and terephthalic acid. For example, the average repeating unit number may be more than 10 or 100.

The term "polypropylene", as used herein, generally refers to a polymer built up by the polymerization of propylene. For example, the average repeating unit number may be more than 10 or 100.

The term "polystyrene", as used herein, generally refers to a polymer produced by the polymerization of styrene. For example, the average repeating unit number may be more than 10 or 100.

The term "polysulfone", as used herein, generally refers to a polymer containing a sulfone group and alkyl- or aryl-groups. For example, the average repeating unit number may be more than 10 or 100.

The term "polytetrafluoroethylene", as used herein, generally refers to a polymer of tetrafluoroethylene. For example, the average repeating unit number may be more than 10 or 100.

The term "polyvinyl chloride", as used herein, generally refers to a polymer made from the polymerization of vinyl chloride. For example, the average repeating unit number may be more than 10 or 100.

The term "protruding element", as used herein, generally refers to an element extended beyond or above a surface.

The term "qualitative signal", as used herein, generally refers to a signal relating to, measuring, or measured by the quality.

The term "quantitative signal", as used herein, generally refers to a signal relating to, measuring, or measured by the quantity.

The term "reader", as used herein, generally refers to a device or a machine that may be capable of reading a signal.

The term "recess element", as used herein, generally refers to an element recessed below or under a surface.

The term "reference electrode", as used herein, generally refers to an electrode that may provide a standard for the electrochemical measurements.

The term "reservoir", as used herein, generally refers to a place where something may be kept in store.

The term "saliva", as used herein, generally refers to a watery liquid secreted into the mouth by glands. For example, saliva may be used as a sample.

The term "sample", as used herein, generally refers to a part of a subject. For example, a sample may be a saliva or a blood.

The term "sample receiving inlet", as used herein, generally refers to sample inlet for receiving a solid, a fluid or an air sample.

The term "sample receptacle", as used herein, generally refers to a receptacle that may receive and contain a sample.

The term "self-sealing", as used herein, generally refers to an element or an object, for example a vent, that may be capable of sealing itself. For example, sealed by a pressure or a moisture.

The term "side", as used herein, generally refers to a surface or a line that may be forming a border or face of an object.

The term "signal detection module", as used herein, generally refers to a device or a module that may be capable of a detection of a signal.

The term "silicone material", as used herein, generally refers to a polymer consist of chains made of alternating silicon and oxygen atom. For example, a silicone material may be used as an adhesive.

The term "snap feature", as used herein, generally refers to a feature that used to join two components. For example, a snap feature may be a protruding part or a recess part that connecting two components during a joining operation.

The term "subject", as used herein, generally refers to a person, an animal or a thing that is being discussed, described, or studied with.

The term "substrate", as used herein, generally refers to an underlying substance or layer.

The term "target", as used herein, generally refers to a thing that may be selected as an object of attention or detected. For example, a target may be a virus or a DNA or RNA of a virus.

The term "thermo control module", as used herein, generally refers to a module that may be used for regulating temperature. For example, a thermo control module may be an automatic thermo control module.

The term "top inner surface", as used herein, generally refers to a surface that is of the top inner of an object.

The term "twisting action", as used herein, generally refers to an action of turning, rotating, bending or curling.

The term "vent", as used herein, generally refers to an opening that may be used for the escape of a gas or liquid or for the relief of pressure.

The term "vertical plane", as used herein, generally refers to a plane that may pass through a vertical line.

The term "wall", as used herein, generally refers to a layer enclosing space. For example, a wall may be a wall of a container.

The term "width", as used herein, generally refers to a measurement or extent of something from side to side.

The term "working area", as used herein, generally refers to an area where the action of work is performing. For example, a working area may be an area for the detection of a target.

The term "working electrode", as used herein, generally refers to an electrode that may be used for directing the course of the electrochemical reaction. For example, a working electrode may be a gold.

Container

In one aspect, the present disclosure provides a container. The container may comprise a sample receptacle and a cap.

As illustrated in FIG. 1, the present disclosure provides a container 100, comprising a sample receptacle 110 and a cap 120. The cap 120 may comprise a reservoir 1201 for retaining a composition, a first piercing member 1202 and a first pierceable barrier 1203 for sealing said composition within said reservoir 1201; the sample receptacle 110 may comprise a first open end 1101 for receiving a sample, and one or more second piercing members 1102, said first open end 1101 may be configured for closure by said cap 120 and for receiving said composition; said first piercing member 1202 and said one or more second piercing members 1102 may be configured to disestablish the first pierceable barrier 1203 from opposite side of said first pierceable barrier 1203 when said first open end 1101 may be closed by said cap 120.

The present disclosure provides a container 100, wherein said first piercing member 1202 may extend downwardly toward said first open end 1101 of the sample receptacle 110 when said first open end 1101 is closed by said cap 120. For example, some of said first piercing member 1202 may extend downwardly toward said first open end 1101 of the sample receptacle 110.

The present disclosure provides a container 100, wherein said cap 120 may comprise a top inner surface 1204, and said first piercing member 1202 may extend from the top inner surface 1204 of said cap 120. For example, said first piercing member 1202 may extend from the side inner surface 1204 of said cap 120.

The present disclosure provides a container 100, wherein said first piercing member 1202 may extend approximately perpendicularly from said top inner surface 1204. For example, some of said first piercing member 1202 may extend approximately perpendicularly from said top inner surface 1204.

The present disclosure provides a container 100, wherein said first piercing member 1202 may comprise a blunt or curved upper edge. For example, wherein said first piercing member 1202 may comprise a feature other than a blunt or curved upper edge, for example, a pointed end. Wherein said first piercing member 1202 may be configured to maintain a suitable tension in the first pierceable barrier 1203 and pierce the first pierceable barrier 1203, when said first open end 1101 is closed by said cap 120.

The present disclosure provides a container 100, wherein said sample receptacle 110 may comprise an inner base surface 1103, and the width of said first open end 1101 may be greater than or equal to the width of said inner base surface 1103. For example, the width of said first open end 1101 may be 1% greater, 2% greater, 5% greater, 10% greater, 20% greater, 50% greater, 1 time greater, 2 times greater, or 3 times greater than or equal to the width of said inner base surface 1103.

The present disclosure provides a container 100, wherein said one or more second piercing members 1102 may extend upwardly toward said first open end 1101 of the sample receptacle 110.

The present disclosure provides a container 100, wherein said one or more second piercing members 1102 may extend from the inner base surface 1103 of said sample receptacle 110.

The present disclosure provides a container 100, wherein said one or more second piercing members 1102 may extend approximately perpendicularly from said inner base surface 1103 of said sample receptacle 110.

The present disclosure provides a container 100, wherein said sample receptacle 110 may comprise two of said second piercing members 1102 arranged opposite one another on either side of a vertical plane extending through the length of said sample receptacle 110.

The present disclosure provides a container 100, wherein said sample receptacle 110 may comprise two of said second piercing members 1102 configured to allow said first piercing member 1202 to be positioned between two of said second piercing members 1102 when said first open end 1101 may be closed by said cap 120. For example, the distance of two of said second piercing members 1102 may be larger or equal to the thickness of said first piercing member 1202. For example, the sum of the length of said second piercing members 1102 and said first piercing member 1202 may be larger than the depth of the reservoir 1201.For example, two of said second piercing members 1102 and said first piercing member 1202 may be configured to maintain a suitable tension in the first pierceable barrier 1203 and pierce the first pierceable barrier 1203, when said first open end 1101 may be closed by said cap 120.

The present disclosure provides a container 100, wherein each of said one or more second piercing members 1102 may comprise a blunt or curved upper edge. For example, wherein said one or more second piercing members 1102 may comprise a feature other than a blunt or curved upper edge, for example, a pointed end.

The present disclosure provides a container 100, wherein said first and second piercing members may be configured to disestablish said first pierceable barrier 1203 without a twisting action during closure of said cap 120.

The present disclosure provides a container 100, wherein said first pierceable barrier 1203 may comprise a pierceable plastic film or a foil film.

The present disclosure provides a container 100, wherein said first pierceable barrier 1203 comprises a pierceable film made from a material selected from the group consisting of polyethylene terephthalate (PETE), polycarbonate, polyethylene, and polyvinyl chloride (PVC).

The present disclosure provides a container 100, wherein said sample receptacle 110 may comprise two of said second piercing members 1102 configured to allow said first piercing member 1202 to be positioned between two of said second piercing members 1102 when said first open end 1101 may be closed by said cap 120, wherein said first and second piercing members may be configured to disestablish said first pierceable barrier 1203 without a twisting action during closure of said cap 120, wherein said first pierceable barrier 1203 comprises a pierceable film made from a material selected from the group consisting of polyethylene terephthalate (PETE), polycarbonate, polyethylene, and polyvinyl chloride (PVC).

The present disclosure provides a container 100, wherein said sample receptacle 110 may comprise an outlet 1104, and said outlet 1104 may be in fluidic communication with said sample receptacle 110.

The present disclosure provides a container 100, wherein said outlet 1104 may be on said inner base surface 1103 of said sample receptacle 110.

The present disclosure provides a container 100, wherein said outlet 1104 may be sealed by a second pierceable barrier 1105.

The present disclosure provides a container 100, wherein said second pierceable barrier 1105 may comprise a pierceable plastic film or a foil film.

The present disclosure provides a container 100, wherein said second pierceable barrier 1105 may comprises a pierceable film made from a material selected from the group consisting of polyethylene terephthalate (PETE), polycarbonate, polyethylene, and polyvinyl chloride (PVC).

The present disclosure provides a container 100, wherein said cap 120 may be attached to said sample receptacle 110 via a living hinge, or said cap 120 may be not attached to said sample receptacle 110.

The present disclosure provides a container 100, wherein said cap 120 may comprise a wall 1205 defining the outer perimeter of said reservoir 1201.

The present disclosure provides a container 100, wherein said wall 1205 may have an outer edge and said first pierceable barrier 1203 may be sealingly attached to said outer edge so as to cover said reservoir 1201. Wherein, first pierceable barrier 1203 may be sealingly attached to other part of said reservoir 1201, for example the inner surface or outer surface of said reservoir 1201, so as to cover said reservoir 1201.

The present disclosure provides a container 100, wherein said wall 1205 may nest within the first open end 1101 of said sample receptacle 110 to form a fluid tight seal when said first open end 1101 may be closed by said cap 120.

The present disclosure provides a container 100, wherein an outer surface of said wall 1205 may be made from or may be coated with an elastomeric material for sealingly engagement against an inner surface of said sample receptacle 110 when said first open end 1101 may be closed by said cap 120.

The present disclosure provides a container 100, wherein at least a portion of an interior surface 1106 of the sample receptacle 110, configured to be in contact with said wall 1205 of the cap 120 when the cap 120 is closed, may be made from or may be coated with an elastomeric material substantially coextensive with said elastomeric material of the outer surface of the wall 1205, for sealing the first open end 1101 against flow when the atmospheric pressure may be equal to or greater than the pressure in the container 100. For example, at least a portion of an interior surface 1106 of the sample receptacle 110 may be configured to be in contact with said wall 1205 of the cap 120 for sealing the first open end 1101 against flow of a gas or a fluid. For example, each portion of an interior surface 1106 of the sample receptacle 110 may be configured to be in contact with said wall 1205 of the cap 120 for sealing the first open end 1101 against flow of a gas or a fluid.

The present disclosure provides a container 100, wherein said elastomeric material may be independently selected from the group consisting of polytetrafluoroethylene (PTFE), polycarbonate (PCTE), polyethylene (PE) and polypropylene (PP).

The present disclosure provides a container 100, wherein the reservoir 1201 may be sized to accommodate no less than about 500 μL fluid. Wherein the reservoir may be sized to accommodate about 500 μL to about 3000 μL of said composition, for example, about 500 μL to about 3000 μL, about 700 μL to about 3000 μL, about 900 μL to about 3000 μL, about 1000 μL to about 3000 μL, about 1100 μL to about 3000 μL, about 1300 μL to about 3000 μL, about 1500 μL to about 3000 μL, about 1700 μL to about 3000 μL, about 1900 μL to about 3000 μL, about 2000 μL to about 3000 μL, about 2100 μL to about 3000 μL, about 2300 μL to about 3000 μL, about 2500 μL to about 3000 μL, about 2700 μL to about 3000 μL, about 2900 μL to about 3000 μL, about 500 μL to about 2500 μL, about 1000 μL to about 2500 μL, about 1500 μL to about 2500 μL, about 500 μL to about 2000 μL, about 1000 μL to about 2000 μL, about 1500 μL to about 2000 μL, about 500 μL to about 1500 μL, about 1000 μL to about 1500 μL or about 500 μL to about 1000 μL of said composition.

The present disclosure provides a container 100, wherein said sample receptacle 110 may be configured to receive about 0.5 ml to about 1.5 ml of said sample. Wherein said sample receptacle 110 may be configured to receive about 0.5 ml to about 1.5 ml, 0.7 ml to about 1.5 ml, 0.9 ml to about 1.5 ml, 1.0 ml to about 1.5 ml, 1.1 ml to about 1.5 ml, 1.3 ml to about 1.5 ml, 0.5 ml to about 1.0 ml, 0.7 ml to about 1.0 ml, or 0.9 ml to about 1.0 ml of said sample.

The present disclosure provides a container 100, wherein said sample may be a biological sample. Wherein said biological sample may be saliva. Wherein said biological sample may be blood.

The present disclosure provides a container 100, wherein said sample receptacle 110 may include an interior surface 1106 that may be sloped downward from said first open end 1101 toward said inner base surface 1103, wherein said interior surface 1106 may define a flow path for said composition following release of said composition from said reservoir 1201 when said first pierceable barrier 1203 may be disestablished by said first and second piercing members.

The present disclosure provides a container 100, wherein said cap 120 may further comprise said composition sealed within said reservoir 1201.

The present disclosure provides a container 100, wherein said composition may comprises a sample treatment buffer.

The present disclosure provides a container 100, wherein said composition may comprises the reagent selected from the group consisting of: redox reagent, .For example, a redox reagent may be a dithiothreitol (DTT); a nucleic acid may be RNA, or tRNA (transfer ribonucleic acid); a nonionic detergent may be a Tween, or Tween 20; a DNA intercalating redox reporter may be a methylene blue; a ribonuclease inhibitor may be a Murine RNase Inhibitor (NEB M0314), Protector RNase Inhibitor (Roche, RNAINH-RO) or a RNAsecure (Thermo Fisher Scientific, AM7005).

The present disclosure provides a container 100, wherein said composition may comprises the reagent selected from the group consisting of: dithiothreitol (DTT), tRNA, Tween 20, methylene blue, RNase Inhibitor—Murine (NEB M0314), Protector RNase Inhibitor (Roche, RNAINH-RO), and RNAsecure (Thermo Fisher Scientific, AM7005).

Figure 2:
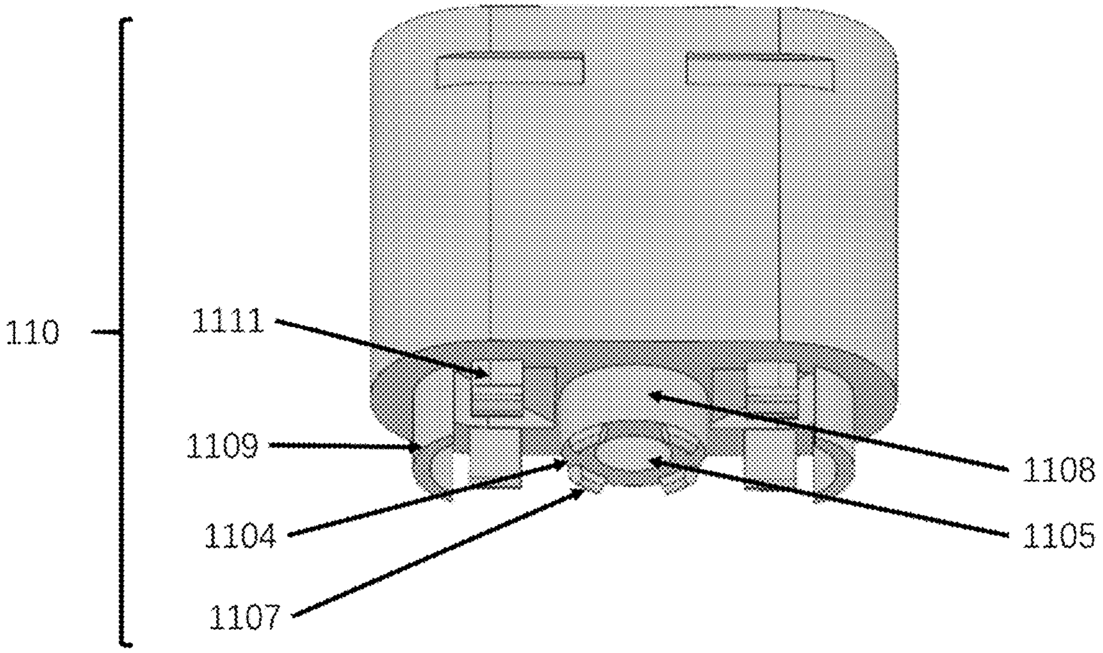
FIG. 2 illustrates a side view of an alternative sample receptacle according to an embodiment of the present disclosure.

As an alternative sample receptacle 110 illustrated in FIG. 2, the present disclosure provides a container 100, wherein said sample receptacle 110 may comprise one or more third piercing members 1107 located on an outer base surface of said sample receptacle 110, said one or more third piercing members 1107 may extend outwardly from said outer base surface. Wherein said sample receptacle 110 may comprise 1 to 50, 1 to 20, 1 to 10, 1 to 5, 1 to 4, 1 to 3 or 1 to 2 third piercing members 1107. Wherein said sample receptacle 110 may comprise 1, 2, 3, 4, or 5 third piercing members 1107. Wherein said one or more third piercing member 1107 may be arranged in a generally circular fashion on said outer surface of said extension. Wherein the distance of said one or more third piercing member 1107 may be basically the same. Said one or more third piercing members 1107 may extend outwardly from said first open 1101. Said one or more third piercing members 1107 may extend to a basically different direction of said second piercing members 1102. Said one or more third piercing members 1107 may extend outwardly from said first open 1101, and said second piercing members 1102 extend towards said first open 1101.

The present disclosure provides a container 100, wherein sample receptacle 110 may comprise an extension 1108, said extension 1108 may extend outwardly from said outer base surface of said sample receptacle 110 and an inner of said extension may be in fluidic communication with said first open 1101.

Figure 3:
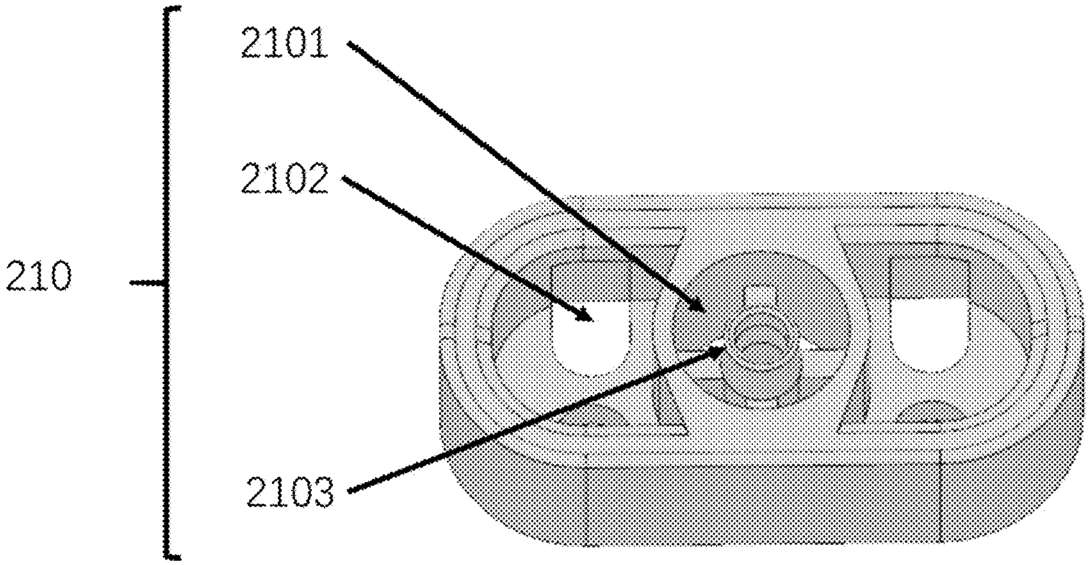
FIG. 3 illustrates a side view of an alternative adapter according to an embodiment of the present disclosure.

The present disclosure provides a container 100, wherein the diameter of an outer surface of said extension 1108 may be smaller or equal to the diameter of an inner surface of a sample receiving inlet 2101 of an adapter 210, as an alternative adapter 210 illustrated in FIG. 3. For example, the diameter of an inner surface of a sample receiving inlet 2101 of an adapter 210 may be 1% greater, 2% greater, 5% greater, 10% greater, 20% greater, 50% greater, 1 time greater, 2 times greater, or 3 times greater than the diameter of an outer surface of said extension 1108.

The present disclosure provides a container 100, wherein said outer surface of said extension 1108 may be made from or may be coated with an elastomeric material for sealingly engagement against said inner surface of said sample receiving inlet 2101 when said container 100 may be mounted on said adapter 210.

The present disclosure provides a container 100, wherein at least a portion of said inner surface of said sample receiving inlet 2101, configured to be in contact with said extension 1108 of said container 100 when said container 100 may be mounted on said adapter 210, may be made from or may be coated with an elastomeric material substantially coextensive with said elastomeric material of said outer surface of said extension 1108, to form a fluid tight seal when said container 100 may be mounted on said adapter 210. Each portion of said inner surface of said sample receiving inlet 2101 may be configured to be in contact with said extension 1108 of said container 100 when said container 100 may be mounted on said adapter 210, to form a fluid tight seal when said container 100 may be mounted on said adapter 210.

The present disclosure provides a container 100, wherein said one or more third piercing members 1107 may extend outwardly from an outer base surface of said extension 1108. Wherein said one or more third piercing members 1107 may extend outwardly from any surface, such as outer peripheral surface, of said extension 1108.

The present disclosure provides a container 100, wherein said one or more third piercing members 1107 may extend approximately perpendicularly from said outer base surface.

The present disclosure provides a container 100, wherein said one or more third piercing members 1107 may extend in a direction substantially oppositely to said one or more second piercing members 1102. Said one or more third piercing members 1107 may extend outwardly from said first open 1101, and said second piercing members 1102 may extend towards said first open 1101.

The present disclosure provides a container 100, wherein said one or more third piercing member 1107 may be arranged in a generally circular fashion on said outer surface of said extension.

The present disclosure provides a container 100, wherein said one or more third piercing members 1107 may be arranged surrounding said outlet 1104 of the sample receptable 110. Wherein said one or more third piercing member 1107 may be arranged in a generally circular fashion on said outer surface of said extension. Wherein said one or more third piercing member 1107 may be arranged in a generally polygon fashion on said outer surface of said extension. Wherein said one or more third piercing member 1107 may be arranged in a generally regular polygon fashion on said outer surface of said extension. Wherein said one or more third piercing member 1107 may be arranged in a generally regular triangle fashion on said outer surface of said extension. Wherein said one or more third piercing member 1107 may be arranged in a generally regular rectangle fashion on said outer surface of said extension.

The present disclosure provides a container 100, wherein said one or more third piercing members 1107 may be configured to disestablish a pierceable barrier of an adapter 210 when said container 100 is mounted on said adapter 210.

The present disclosure provides a container 100, wherein said one or more third piercing members 1107 may comprise a blunt or curved lower edge. Wherein said one or more third piercing members 1107 may comprises a feature other than a blunt or curved upper edge, for example, a pointed end.

The present disclosure provides a container 100, wherein said one or more third piercing members 1107 may have a height of no less than about 0.5 mm. For example, the height of said one or more third piercing members 1107 may be of 0.1 to 0.5 mm, 0.2 to 0.5 mm, 0.3 to 0.5 mm, or 0.4 to 0.5 mm.

The present disclosure provides a container 100, wherein said one or more third piercing member 1107 may extend downwardly toward a sample receiving inlet 2101 of an adapter 210 when said container 100 may be mounted on said adapter 210.

The present disclosure provides a container 100, wherein said one or more third piercing member 1107 may extend approximately perpendicularly downwardly toward said sample receiving inlet 2101 of an adapter 210.

The present disclosure provides a container 100, wherein said sample receptacle 110 may comprise one or more outer rings 1109, said one or more outer ring may extend outwardly from said outer base surface.

The present disclosure provides a container 100, wherein an outer surface of said one or more outer rings 1109 may be made from or may be coated with an elastomeric material for sealingly engagement against an inner surface of an adapter when said container 100 may be mounted on said adapter 210.

The present disclosure provides a container 100, wherein at least a portion of said inner surface of said adapter 210, configured to be in contact with said one or more outer rings 1109 of said container 100 when said container 100 may be mounted on said adapter 210, may be made from or may be coated with an elastomeric material substantially coextensive with said elastomeric material of said outer surface of said one or more outer rings 1109, to form a fluid tight seal when said container 100 may be mounted on said adapter 210. Each portion of said inner surface of said adapter 210 may be configured to be in contact with said one or more outer rings 1109 of said container 100 when said container 100 may be mounted on said adapter 210, to form a fluid tight seal when said container 100 may be mounted on said adapter 210.

The present disclosure provides a container 100, wherein said cap may comprise a first snap feature 1206 and said sample receptacle 110 may comprise a second snap feature 1110, said first snap feature 1206 and said second snap feature 1110 may be configured for said first open 1101 to be irreversibly closed by said cap 120. The join of said first open 1101 and said cap 120 may be separable or inseparable depending on the shape of snap feature; the force required to separate the components varies greatly according to the design.

FIGS. 17A-17E illustrate each view of another cap 120. The cap 120 may comprise a first snap feature 1206 and first snap feature 1206 has a shape of hook. Wherein, said first snap feature 1206 and said second snap feature of a sample receptacle may be configured to be irreversibly closed by said cap 120. Wherein, an audible CLICK may be made for positive user feedback when said sample receptacle is capping. When said sample receptacle is capping, a top-sealing 1207 may be positioned between the top surface of said sample receptacle and inner surface of said cap 120. Wherein said top-sealing 1207 may provide a leak-proof seal when said sample receptacle is capping. Said top-sealing 1207 may be made from or may be coated with an elastomeric material. Wherein, said top-sealing 1207 may be pressed when said sample receptacle is capping, which may generate positive pressure inside container 100.

FIGS. 18A-18E illustrate each view of another cap 120. The volume of said reservoir 1201 of a cap 120 may be about 1.5 mL or about 3 mL.

FIGS. 19A-19E illustrate each view of another sample receptacle 110. The sample receptacle 110 may comprise a second snap feature 1110. Wherein, said first snap feature 1206 and said second snap feature of a sample receptacle may be configured to be irreversibly closed by said cap 120. Wherein, an audible CLICK may be made for positive user feedback when said sample receptacle is capping. The second snap feature 1110 may be printed, such as to be black, for user checking the completion of capping. Wherein said sample receptacle 110 may comprise four of second piercing members 1102 configured to allow first piercing member 1202 to be positioned between two of second piercing members 1102 when said first open end 1101 may be closed by said cap 120. A fill line 1112 may be printed on the inner surface or outer surface of the sample receptacle 110, which may be used for guiding user depositing the requisite amount of sample in sample receptacle 110. Wherein said sample receptacle 110 may comprise a filter 1113, which may filter out debris that might otherwise interfere with the test. The filter 1113 may be made of a porous sintered HDPE material. The diameter of the filter 1113 may be 6 mm, and the thickness may be 3-5 mm. Wherein said sample receptacle 110 may comprise one or more guide ribs. The guide ribs of the sample receptacle 110 may be positioned on the inner surface of the sample receptacle 110. wherein ribs may guide the insertion of the cap 120 onto the sample receptacle 110. When said sample receptacle is capping, the top surface of said sample receptacle may be non-R-angle, which keeps the air pressure in the sample receptacle 110.

Figure 20:
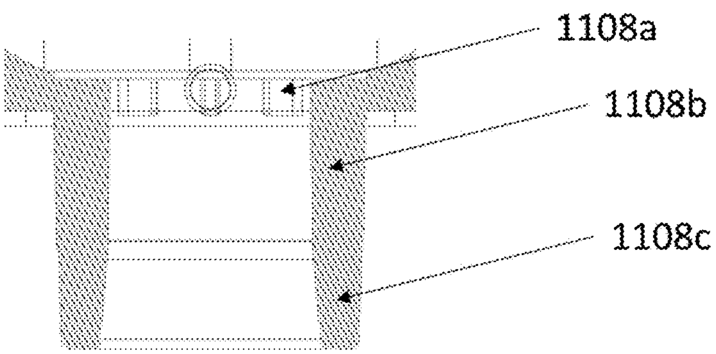
FIG. 20 illustrates longitudinal section view of another extension.
Figure 21A:
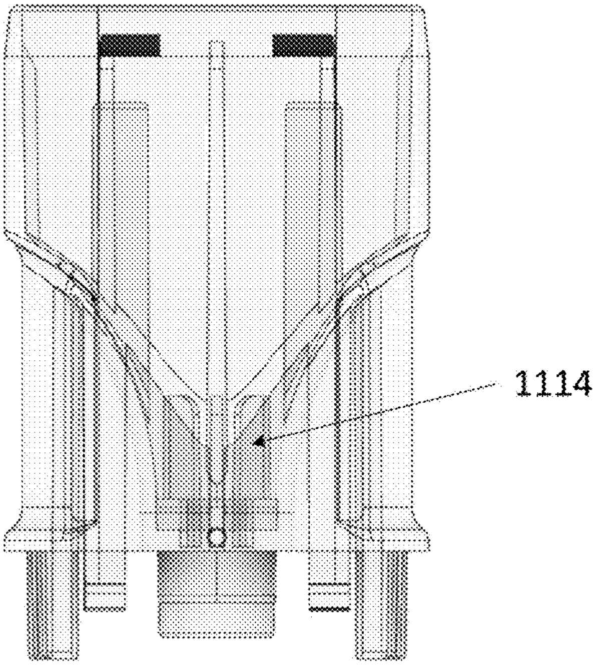
FIGS. 21A-21G illustrate each view of another sample receptacle.
Figure 21B:
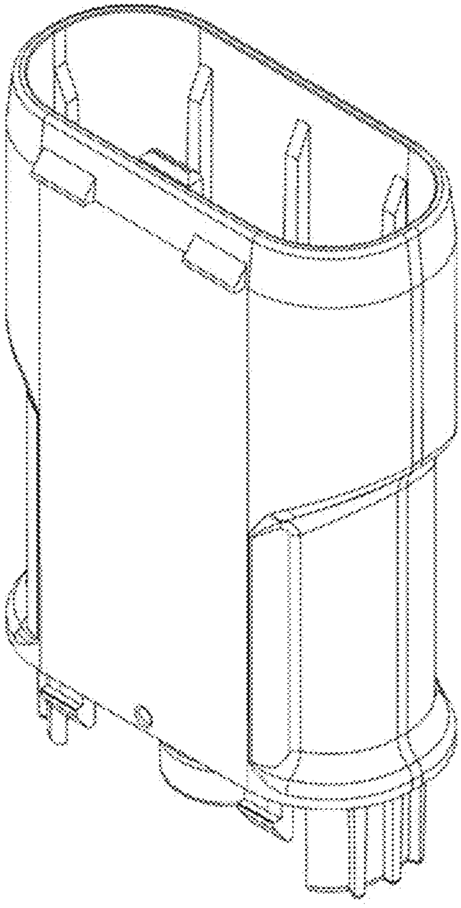
Figure 21C:
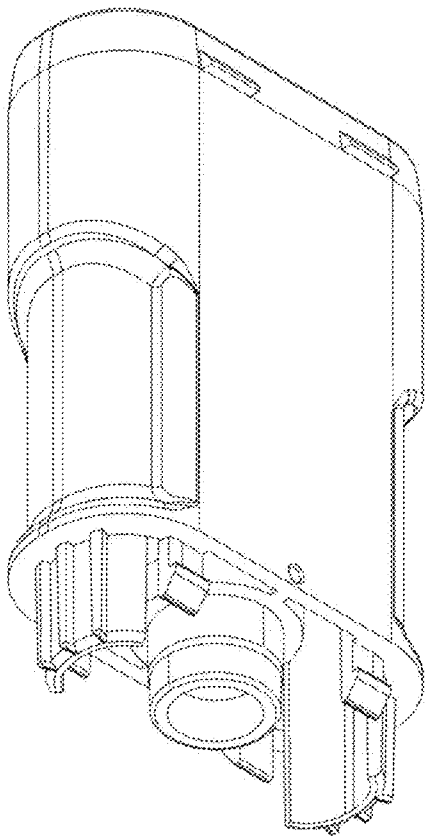
Figure 21D:
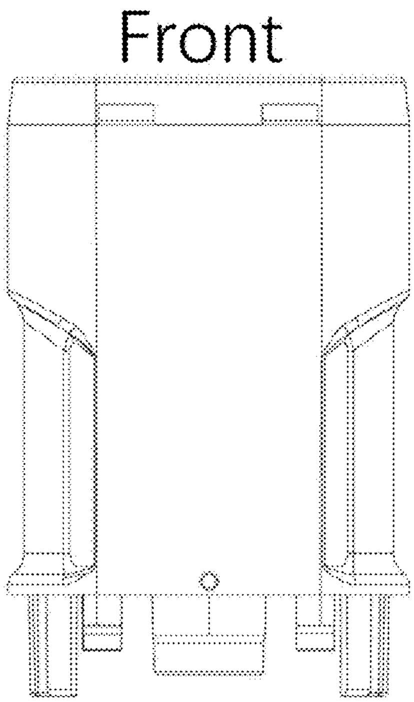
Figure 21E:
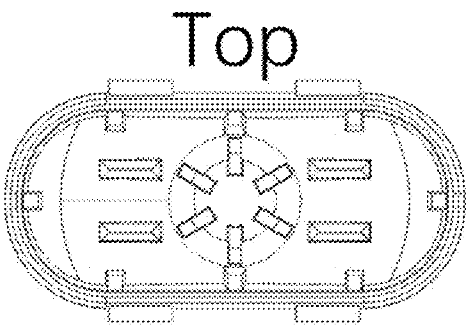
Figure 21F:
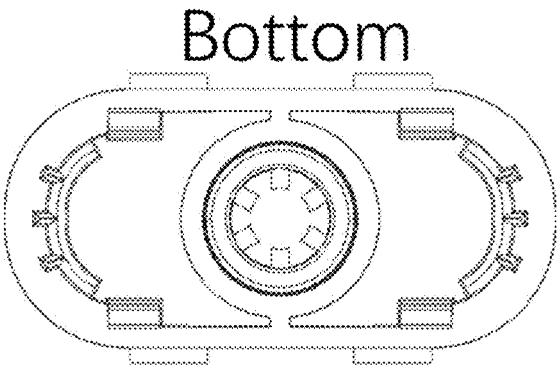
Figure 21G:
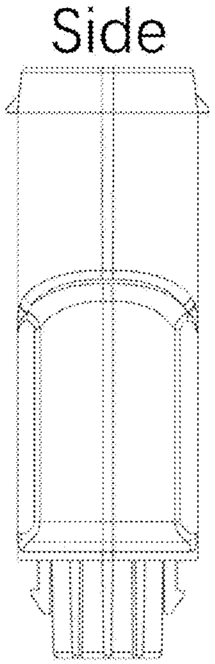
Figure 22A:
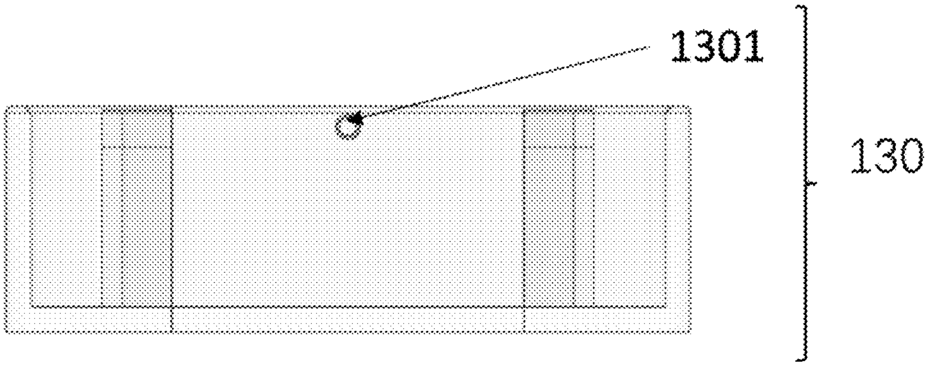
FIGS. 22A-22G illustrate each view of a protector.
Figure 22B:
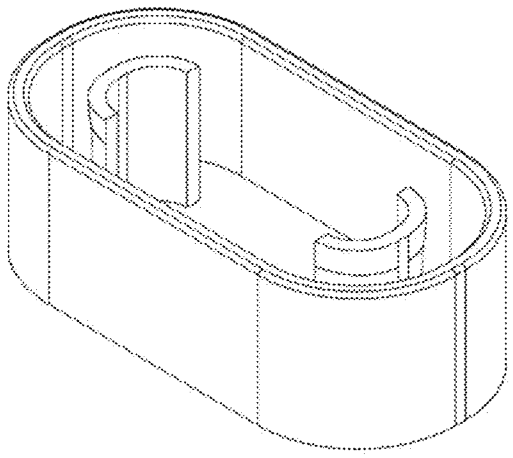
Figure 22C:
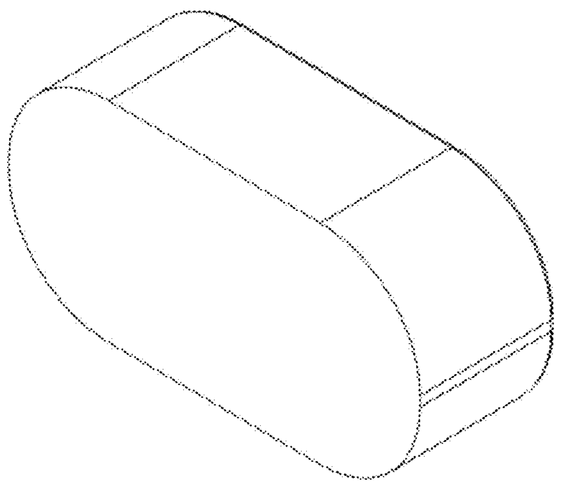
Figure 22D:
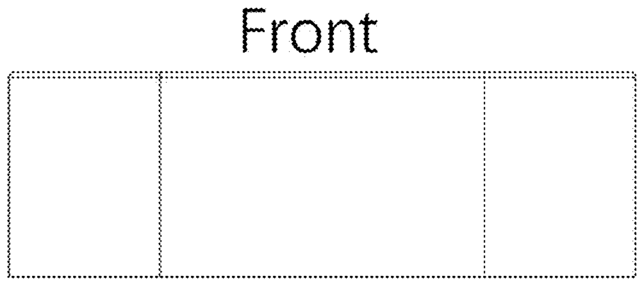
Figure 22E:
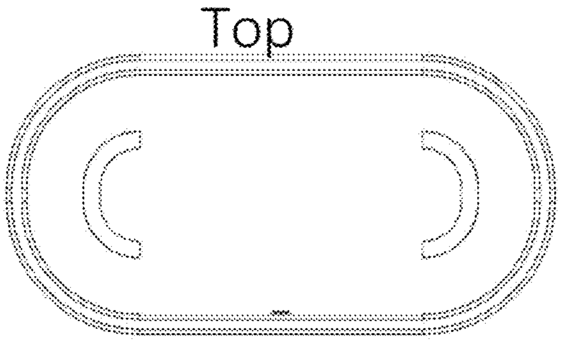
Figure 22F:
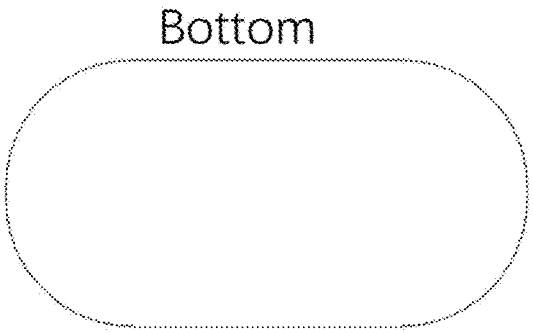
Figure 22G:
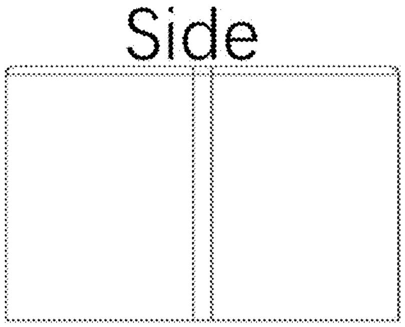
Figure 23A:
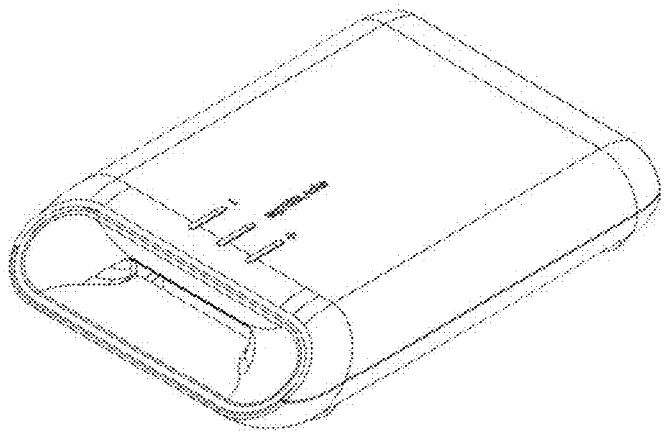
FIGS. 23A-23G illustrate each view of a reader.
Figure 23B:
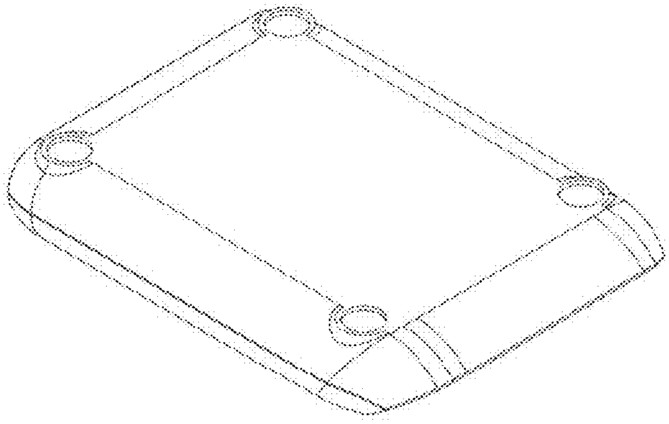
Figure 23C:
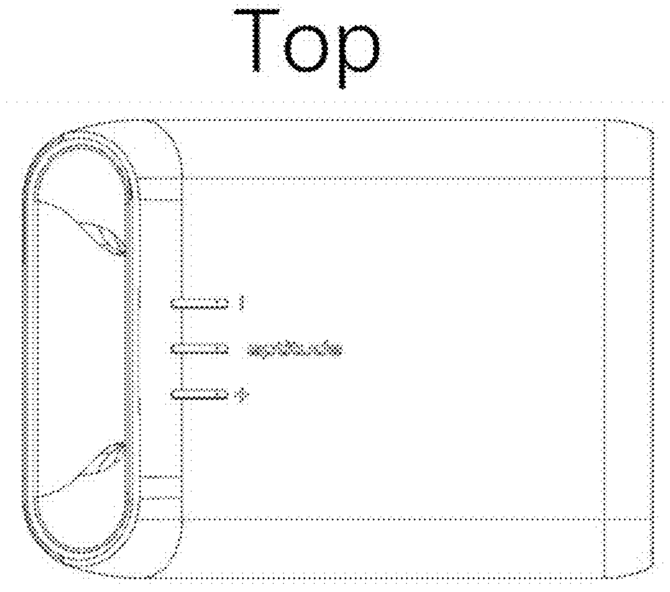
Figure 23D:
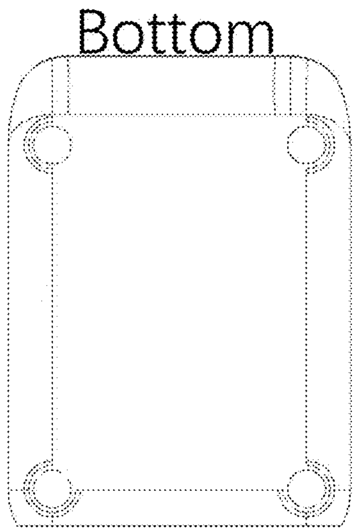
Figure 23E:
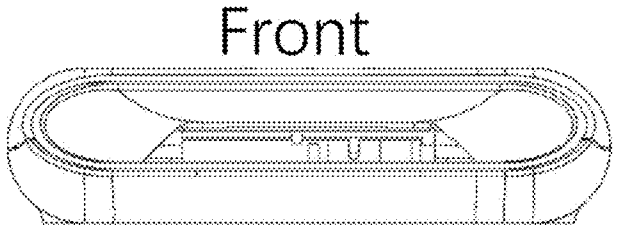
Figure 23F:
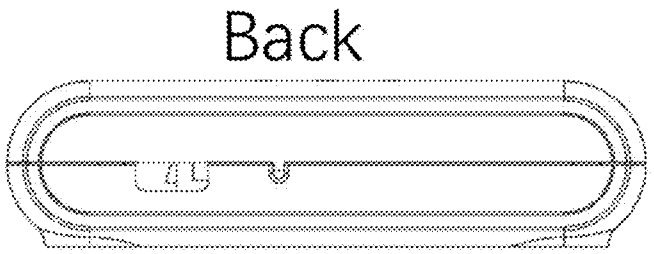
Figure 23G:
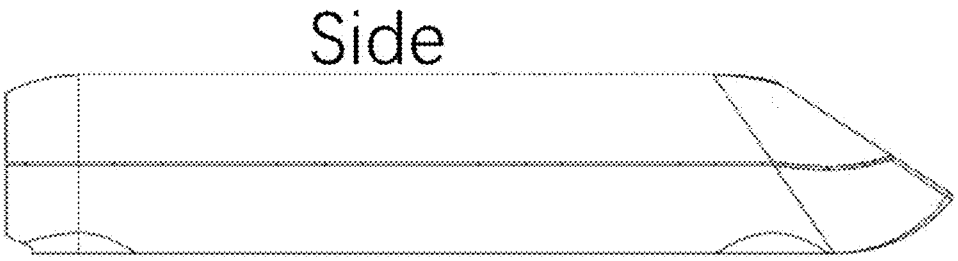

FIG. 20 illustrates longitudinal section view of another extension 1108. Wherein, said extension 1108 may extend outwardly from said outer base surface of said sample receptacle 110. Wherein about six filter stoppers 1108*a* may be positioned on the inner side of said extension 1108, which may be used to prevent filter 1113 being inside the sample receptacle 110. The extension 1108 may comprise two or more sections, the first section 1108*b* is the part near the bottom of the sample receptacle 110, and the second section 1108*c* is the part away from the bottom of the sample receptacle 110. The outer surface of the first section 1108*b* may be almost vertical with 0.5-degree draft angle. The diameter of outer surface of the second section 1108*c* may be smaller than the first section 1108*b*, and the outer surface of the second section 1108*c* may be with about 2-degree to 10-degree draft angle, wherein the diameter of the outer surface of the second section 1108*c* may be smaller when the part is away from the bottom of the sample receptacle 110. The inner surface of the first section 1108*b* may be almost vertical with 0.5-degree draft angle. The diameter of inner surface of the second section 1108*c* may be larger than the first section 1108*b*, which may guide the filter insertion.

FIGS. 21A-21G illustrate each view of another sample receptacle 110. The sample receptacle 110 may be used as a swab collector. The sample receptacle 110 may comprise one or more swab holder 1114. The number of the swab holder 1114 may be 1, 2, 3, 4, 5, 6 or 7.

FIGS. 22A-22G illustrate each view of a protector 130. The protector 130 may be used to snap reversibly onto a container 100 and protect the container 100 from contaminated. The protector 130 may comprise a snap feature 1301. Wherein the snap feature 1301 has a protrusion, which is easy to be clicked into the indent of the sample receptacle 110. Wherein, the protector 130 may be easy to be taken out from the sample receptacle 110. he protector 130 may comprise one or more extension, configured to be in contact with one or more outer rings 1109 of an outer base surface of a container 100 when said container 100 may be mounted on said protector 130.

The present disclosure provides a container 100, wherein said first snap feature 1206 comprises at least one protruding element and said second snap feature 1110 may comprise at least one recess element configured to irreversibly catch said at least one protruding element. Wherein said first snap feature 1206 may comprise at least one recess element and said second snap feature 1110 comprises at least one protruding element configured to irreversibly catch said at least one protruding element. For example, a protruding element may be a hook, a stud or a bead, which may be deflected briefly during a joining operation and catch in a depression in the mating component. The join of the catch may be separable or inseparable depending on the shape of snap feature; the force required to separate the components varies greatly according to the design.

The present disclosure provides a container 100, wherein said sample receptacle 110 may comprise one or more third snap features 1111, said one or more third snap features 1111 may be on bottom of said sample receptable 110.

The present disclosure provides a container 100, wherein said one or more third snap features 1111 and one or more snap features 2102 of an adapter 210, as an alternative adapter 210 illustrated in FIG. 3, may be configured for said container 100 to be irreversibly mounted on said adapter 210. The join of said container 100 and said adapter 210 may be separable or inseparable depending on the shape of snap feature; the force required to separate the components varies greatly according to the design.

The present disclosure provides a container 100, wherein said one or more third snap features 1111 may comprise at least one protruding element, and said one or more snap features 2102 of said adapter 210 may comprise at least one recess element configured to irreversibly catch said at least one protruding element. Wherein said one or more third snap features 1111 may comprise at least one recess element, and said one or more snap features 2102 of said adapter 210 comprise at least one protruding element configured to irreversibly catch said at least one protruding element. The join of said third snap features 1111 and said snap features 2102 may be separable or inseparable depending on the shape of snap feature; the force required to separate the components varies greatly according to the design.

The present disclosure provides a container 100, wherein said container 100 and said adapter 210 may form a tight seal when said container 100 may be mounted on said adapter 210.

The present disclosure provides a container 100, wherein said one or more third snap features 1111 may be arranged opposite one another on either side of said outer base surface of said sample receptable 110.

The present disclosure provides a container 100, said one or more third snap features 1111 may have a height of about 2 mm to 5 mm. For example, said one or more third snap features 1111 may have a height of about 2 mm to 5 mm, 3 mm to 5 mm, 4 mm to 5 mm, 2 mm to 4 mm, 3 mm to 4 mm or 2 mm to 3 mm.

The present disclosure provides a container 100, wherein said one or more third snap features 1111 may comprise at least one protruding element or at least one recess element.

The present disclosure provides a container 100, wherein said sample receptacle 110 may have a height of no less than about 10 mm. The present disclosure provides a container 100, wherein said sample receptacle may have a height of about 10 mm to about 500 mm. For example, said sample receptacle 110 may have a height of no less than about 10 mm, no less than about 50 mm, no less than about 100 mm, no less than about 150 mm, no less than about 200 mm, no less than about 230 mm, no less than about 240 mm, no less than about 250 mm, no less than about 260 mm, no less than about 300 mm, no less than about 350 mm, no less than about 400 mm, no less than about 450 mm, or no less than about 500 mm. For example, the height of said sample receptacle 110 may be measured from the bottom of said sample receptable 110 to the top of the cap 120. For example, the height of said sample receptacle 110 may be measured from the bottom of said sample receptable 110 to the top of said sample receptable 110. For example, the height of said sample receptacle 110 may be measured from the bottom of said sample receptable 110 to the top of the cap 120, when said sample receptable 110 may be fully closed by the cap 120.

The present disclosure provides a container 100, wherein said sample receptacle 110 may have a height of about 250 mm. For example, said sample receptacle 110 may have a height of about 10 mm, about 30 mm, about 50 mm, about 100 mm, about 150 mm, about 200 mm, about 500 mm, about 750 mm, or about 1000 mm.

The present disclosure provides a container 100, wherein said inner base surface of said sample receptacle 110 may have an area of about 200 $mm^2$ to about 600 $mm^2$. For example, said inner base surface of said sample receptacle 110 may have an area of about 200 $mm^2$ to about 600 $mm^2$, about 300 $mm^2$ to about 600 $mm^2$, about 400 $mm^2$ to about 600 $mm^2$, about 500 $mm^2$ to about 600 $mm^2$, about 200 $mm^2$ to about 500 $mm^2$, about 300 $mm^2$ to about 500 $mm^2$, about 400 $mm^2$ to about 500 $mm^2$, about 200 $mm^2$ to about 400 $mm^2$, about 300 $mm^2$ to about 400 $mm^2$, or about 200 $mm^2$ to about 300 $mm^2$.

The present disclosure provides a container 100, comprising a sample receptacle 110 and a cap 120, wherein said cap 120 may further comprise said composition sealed within said reservoir 1201, said cap may comprise a first snap feature 1206 and said sample receptacle 110 may comprise a second snap feature 1110, said first snap feature 1206 and said second snap feature 1110 may be configured for said first open 1101 to be irreversibly closed by said cap 120, said sample receptacle 110 may have a height of about 250 mm and said inner base surface of said sample receptacle 110 may have an area of about 200 $mm^2$ to about 600 $mm^2$.

The present disclosure provides a container 100, comprising a sample receptacle 110 and a cap 120, wherein said sample receptacle 110 may comprise two of second piercing members 1102 configured to allow first piercing member 1202 to be positioned between two of second piercing members 1102 when said first open end 1101 may be closed by said cap 120, said first pierceable barrier 1203 may comprise a pierceable plastic film or a foil film, said outlet 1104 may be sealed by a second pierceable barrier 1105, said cap 120 may further comprise said composition sealed within said reservoir 1201, one or more third piercing members 1107 may be configured to disestablish a pierceable barrier of an adapter 210 when said container 100 is mounted on said adapter 210, said sample receptacle 110 may have a height of about 250 mm and said inner base surface of said sample receptacle 110 may have an area of about 200 $mm^2$ to about 600 $mm^2$.

The present disclosure provides a container 100, comprising a sample receptacle 110 and a cap 120, wherein said sample receptacle 110 may comprise two of second piercing members 1102 configured to allow first piercing member 1202 to be positioned between two of second piercing members 1102 when said first open end 1101 may be closed by said cap 120, said first pierceable barrier 1203 may comprise a pierceable plastic film or a foil film, said outlet 1104 may be sealed by a second pierceable barrier 1105, said cap 120 may further comprise said composition sealed within said reservoir 1201, sample receptacle 110 may comprise an extension 1108, said one or more third piercing members 1107 may extend outwardly from an outer base surface of said extension 1108, said one or more third piercing members 1107 may be configured to disestablish a pierceable barrier of an adapter 210 when said container 100 is mounted on said adapter 210, said cap may comprise a first snap feature 1206 and said sample receptacle 110 may comprise a second snap feature 1110, said first snap feature 1206 and said second snap feature 1110 may be configured for said first open 1101 to be irreversibly closed by said cap 120, said sample receptacle 110 may have a height of about 250 mm and said inner base surface of said sample receptacle 110 may have an area of about 200 $mm^2$ to about 600 $mm^2$.

Figure 6:
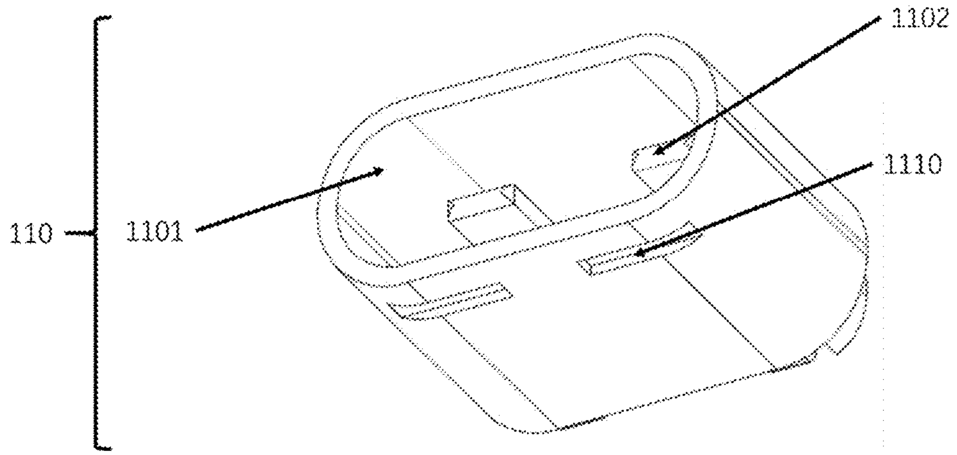
FIG. 6 illustrates an aerial view of an alternative sample receptacle according to an embodiment of the present disclosure.
Figure 7:
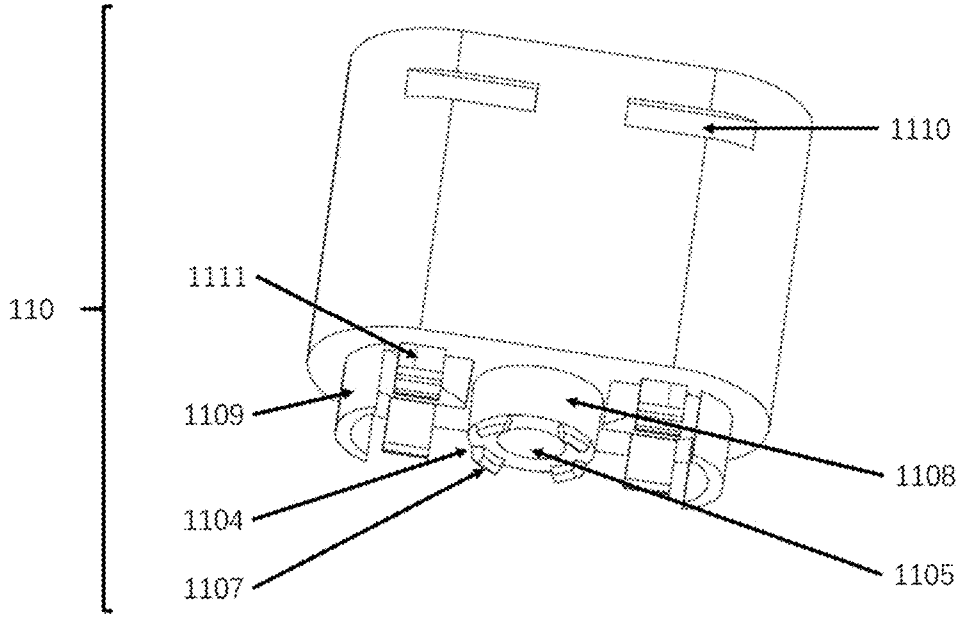
FIG. 7 illustrates an underside view of an alternative sample receptacle according to an embodiment of the present disclosure.
Figure 8:
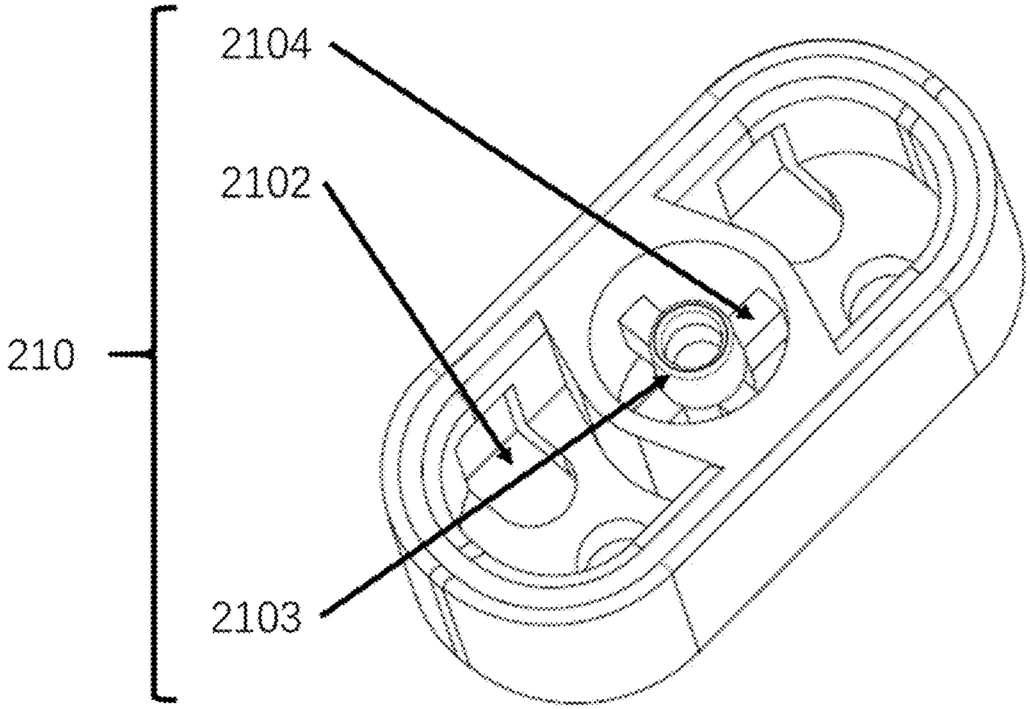
FIG. 8 illustrates an aerial view of an alternative adapter according to an embodiment of the present disclosure.
Figure 9:
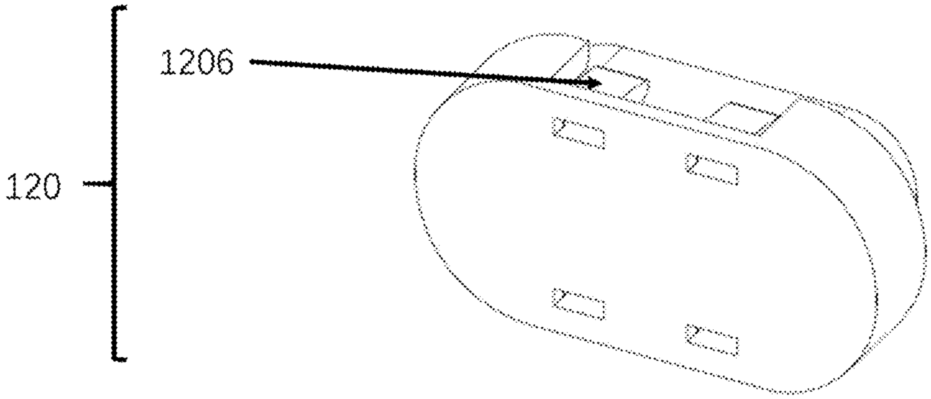
FIG. 9 illustrates an aerial view of an alternative cap according to an embodiment of the present disclosure.
Figure 10:
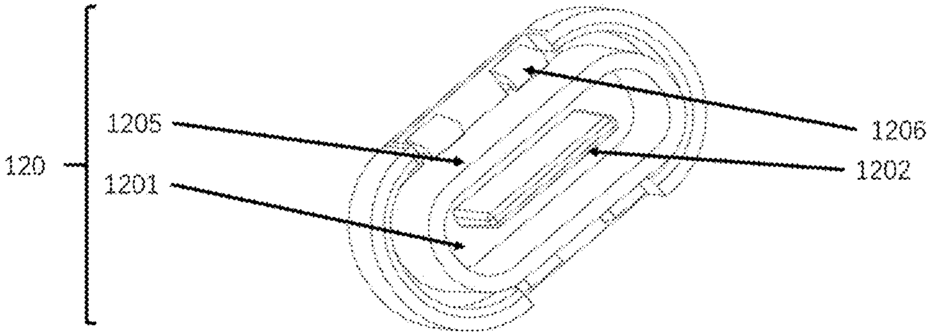
FIG. 10 illustrates an underside view of an alternative cap according to an embodiment of the present disclosure.
Figure 11:
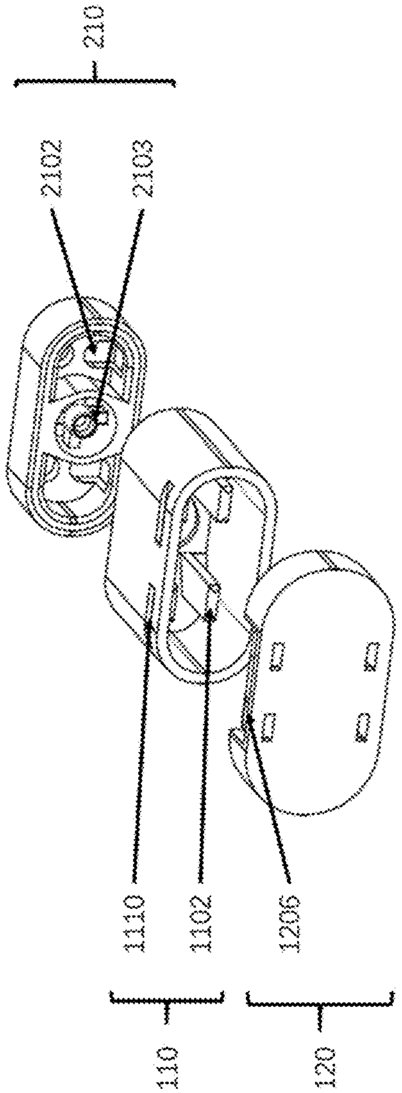
FIG. 11 illustrates an aerial view of an alternative uncoupled components of a container and an alternative adapter according to an embodiment of the present disclosure.
Figure 12:
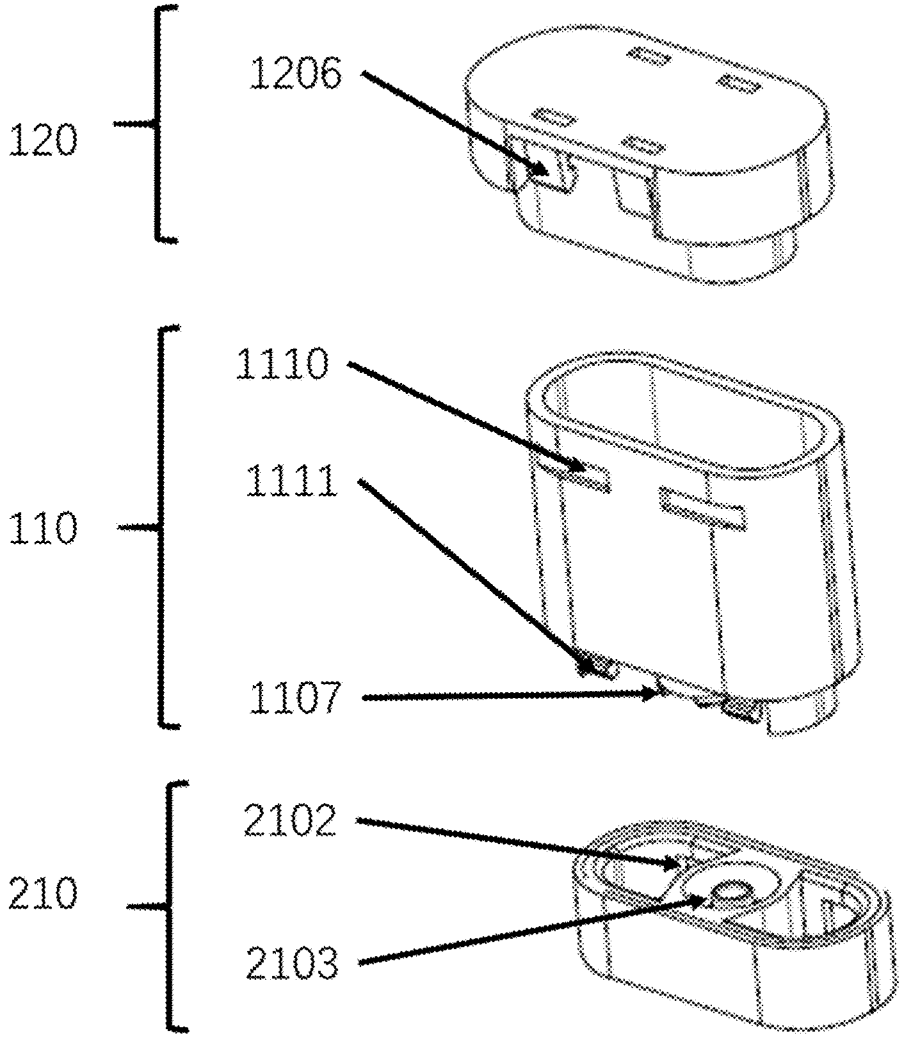
FIG. 12 illustrates a perspective view of an alternative uncoupled components of a container and an alternative adapter according to an embodiment of the present disclosure.

The present disclosure provides a container 100, comprising a sample receptacle 110 and a cap 120, wherein said sample receptacle 110 may comprise two of said second piercing members 1102 configured to allow said first piercing member 1202 to be positioned between two of said second piercing members 1102 when said first open end 1101 may be closed by said cap 120, said first pierceable barrier 1203 may comprise a pierceable plastic film or a foil film, said outlet 1104 may be sealed by a second pierceable barrier 1105, at least a portion of an interior surface 1106 of the sample receptacle 110, configured to be in contact with said wall 1205 of the cap 120 when the cap 120 is closed, may be made from or may be coated with an elastomeric material substantially coextensive with said elastomeric material of the outer surface of the wall 1205, for sealing the first open end 1101 against flow when the atmospheric pressure may be equal to or greater than the pressure in the container 100, said cap 120 may further comprise said composition sealed within said reservoir 1201, at least a portion of said inner surface of said sample receiving inlet, configured to be in contact with said extension of said container when said container is mounted on said adapter, is made from or is coated with an elastomeric material substantially coextensive with said elastomeric material of said outer surface of said extension, to form a fluid tight seal when said container is mounted on said adapter, sample receptacle 110 may comprise an extension 1108, said one or more third piercing members 1107 may extend outwardly from an outer base surface of said extension 1108, said one or more third piercing members 1107 may be configured to disestablish a pierceable barrier of an adapter 210 when said container 100 is mounted on said adapter 210, at least a portion of said inner surface of said adapter 210, configured to be in contact with said one or more outer rings 1109 of said container 100 when said container 100 may be mounted on said adapter 210, may be made from or may be coated with an elastomeric material substantially coextensive with said elastomeric material of said outer surface of said one or more outer rings 1109, to form a fluid tight seal when said container 100 may be mounted on said adapter 210, said cap may comprise a first snap feature 1206 and said sample receptacle 110 may comprise a second snap feature 1110, said first snap feature 1206 and said second snap feature 1110 may be configured for said first open 1101 to be irreversibly closed by said cap 120, said sample receptacle 110 may have a height of about 250 mm and said inner base surface of said sample receptacle 110 may have an area of about 200 $mm^2$ to about 600 $mm^2$. An alternative sample receptacle 110 may be illustrated in FIG. 6 and FIG. 7, an alternative adapter 210 may be illustrated in FIG. 8, an alternative cap 120 may be illustrated in FIG. 9 and FIG. 10, and an alternative container 100 and an alternative adapter 210 may be illustrated in FIG. 11 and FIG. 12.

Device

Figure 4:
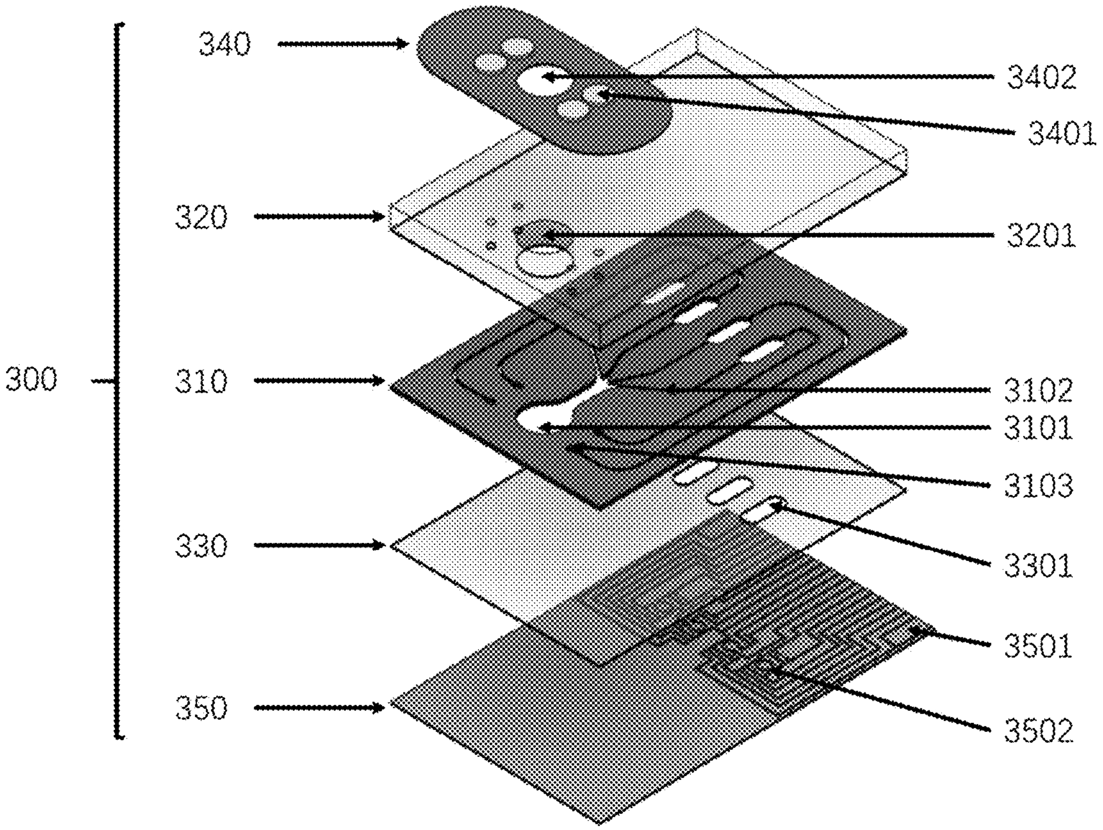
FIG. 4 illustrates a view of uncoupled device according to an embodiment of the present disclosure.

As illustrated in FIG. 4, the present disclosure provides a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, wherein said first layer 310 may have an average thickness of about 0.1 mm to about 0.3 mm. For example, said first layer 310 may have an average thickness of about 0.1 mm to about 0.3 mm, about 0.1 mm to about 0.2 mm, or about 0.2 mm to about 0.3 mm. Wherein said at least one fluid channel 3102 may be configured to be completely filled with about 20 μL to about 150 μL fluid. For example, said at least one fluid channel 3102 may be configured to be completely filled with about 20 μL to about 150 μL fluid, about 30 μL to about 150 μL fluid, about 50 μL to about 150 μL fluid, about 70 μL to about 150 μL fluid, about 100 μL to about 150 μL fluid, about 120 μL to about 150 μL fluid, about 140 μL to about 150 μL fluid, about 20 μL to about 140 μL fluid, about 30 μL to about 140 μL fluid, about 50 μL to about 140 μL fluid, about 70 μL to about 140 μL fluid, about 100 μL to about 140 μL fluid, about 120 μL to about 140 μL fluid, about 20 μL to about 100 μL fluid, about 30 μL to about 100 μL fluid, about 50 μL to about 100 μL fluid, about 70 μL to about 100 μL fluid, about 20 μL to about 50 μL fluid, about 30 μL to about 50 μL fluid, or about 20 μL to about 30 μL fluid. For example, that said at least one fluid channel 3102 may be configured to be completely filled with certain fluid may mean that said fluid channel 3102 may be configured to be filled from the sample receiving inlet 3101 to said vent 3103. For example, that said at least one fluid channel 3102 may be configured to be completely filled with certain fluid may mean that said fluid channel 3102 may be configured to be filled from the sample receiving inlet 3101 to halfway of said fluid channel 3102, for example the opening 3301 of a third layer 330.

The present disclosure provides a device 300, wherein said at least one fluid channel 3102 may comprise two or more fluid channels 3102 substantially equidistant from said sample receiving inlet 3101.

The present disclosure provides a device 300, wherein said at least one fluid channel 3102 may comprise two or more fluid channels 3102 with substantially equal channel width.

The present disclosure provides a device 300, wherein pore size of said vent 3103 may have an average diameter of about 0.1 μm to about 10 μm. For example, pore size of said vent 3103 may have an average diameter of about 0.1 μm to about 10 μm, about 0.2 μm to about 10 μm, about 0.5 μm to about 10 μm, about 1 μm to about 10 μm, about 5 μm to about 10 μm, or about 7 μm to about 10 μm. For example, pore size of said vent 3103 may have an average diameter of about 0.1 μm, about 0.3 μm, about 0.5 μm, about 1 μm, about 2 μm, about 5 μm, about 7 μm, or about 10 μm.

The present disclosure provides a device 300, wherein said vent 3103 may be a self-sealing vent. For example, the material for sealing the vent 3103 may be self-sealing.

The present disclosure provides a device 300, wherein said hydrophobic vent material may be selected from the group consisting of: polytetrafluoroethylene (PTFE), polycarbonate (PCTE), polyethylene (PE) and polypropylene (PP).

The present disclosure provides a device 300, wherein side walls of the at least one fluid channel 3102 may be not coated with a hydrophilic material.

Figure 5:
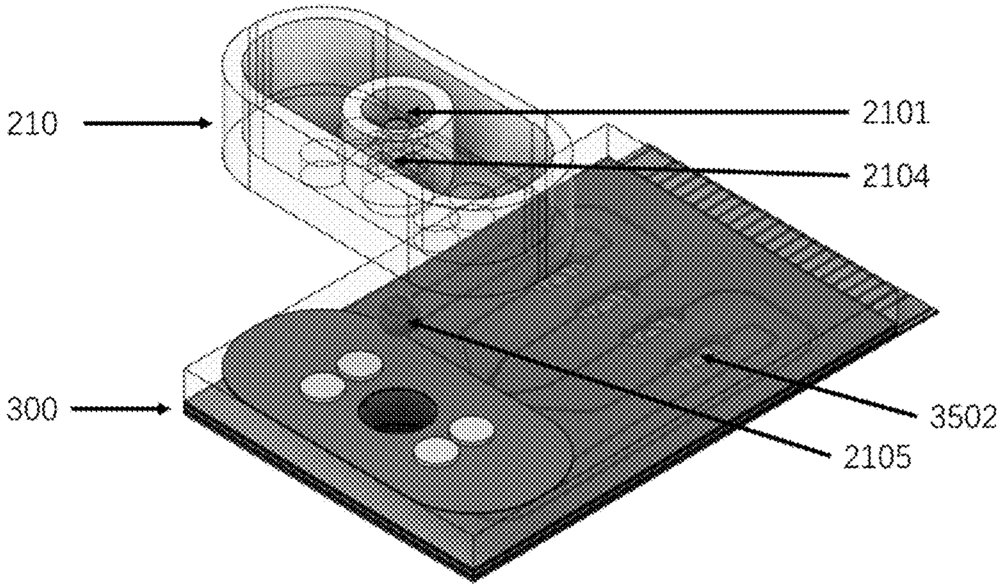
FIG. 5 illustrates a perspective view of partly coupled device and an adapter according to an embodiment of the present disclosure.

The present disclosure provides a device 300, wherein said sample receiving inlet 3101 may comprise a lyophilized reagent 2105, as illustrated in FIG. 5.

The present disclosure provides a device 300, wherein said lyophilized reagent 2105 may comprise an assay reagent.

The present disclosure provides a device 300, wherein said assay reagent may comprise a nucleic acid amplification enzyme and a DNA primer.

The present disclosure provides a device 300, wherein a height of each fluid channel 3102 may be about 0.1 mm to about 1.5 mm. For example, height of each fluid channel 3102 may be about 0.1 mm to about 1.5 mm, about 0.5 mm to about 1.5 mm, about 1.0 mm to about 1.5 mm, about 0.1 mm to about 1.0 mm, about 0.5 mm to about 1.0 mm, or about 0.1 mm to about 0.5 mm.

The present disclosure provides a device 300, wherein a width of each fluid channel 3102 may be about 0.3 mm to about 1 mm. For example, width of each fluid channel 3102 may be about 0.3 mm to about 1 mm, about 0.5 mm to about 1 mm, about 0.7 mm to about 1 mm, about 0.3 mm to about 0.7 mm, about 0.5 mm to about 0.7 mm, or about 0.3 mm to about 0.5 m.

The present disclosure provides a device 300, wherein a length of each fluid channel 3102 may be about 50 mm to about 150 mm. For example, length of each fluid channel 3102 may be about 50 mm to about 150 mm, about 100 mm to about 150 mm, or about 50 mm to about 100 mm.

The present disclosure provides a device 300, wherein a height of each fluid channel 3102 may be about 0.1 mm to about 1.5 mm, a width of each fluid channel 3102 may be about 0.3 mm to about 1 mm and a length of each fluid channel 3102 may be about 50 mm to about 150 mm.

The present disclosure provides a device 300, wherein said first layer 310 may be made of a polycarbonate material, an acrylic material or a mylar material.

The present disclosure provides a device 300, said device 300 further may comprise a second layer 320 with at least one side coated with a hydrophilic material, and when said second layer 320 is operably coupled with said first layer 310, said side coated with the hydrophilic material faces and/or may be in contact with the first layer 310. For example, the side of said second layer 320 coated with a hydrophilic material may indicate the side that may be contact with the first layer 310.

The present disclosure provides a device 300, said side may be coated with said hydrophilic material via an acrylic material or a silicone material.

The present disclosure provides a device 300, wherein said second layer 320 may comprise a sample receiving inlet 3201, and when said second layer 320 may be operably coupled with said first layer 310, said sample receiving inlet 3201 in the second layer 320 may be vertically aligned to said sample receiving inlet 3101 in the first layer 310. For example, when said second layer 320 may be operably coupled with said first layer 310, at least a portion of said sample receiving inlet 3201 in the second layer 320 may be vertically aligned to said sample receiving inlet 3101 in the first layer 310, so that said sample receiving inlet 3201 in the second layer 320 may be in fluidic communication with said sample receiving inlet 3101 in the first layer 310.

The present disclosure provides a device 300, wherein said second layer 320 may be made of a polycarbonate material, an acrylic material or a mylar material.

The present disclosure provides a device 300, wherein said second layer 320 may have an average thickness of about 1 mm to about 4 mm. For example, said second layer 320 may have an average thickness of about 1 mm to about 4 mm, about 2 mm to about 4 mm, about 3 mm to about 4 mm, about 1 mm to about 3 mm, 2 mm to about 3 mm, or about 1 mm to about 2 mm.

The present disclosure provides a device 300, wherein said second layer 320 may be bound to said first layer 310 with an adhesive.

The present disclosure provides a device 300, wherein said adhesive may comprise an acrylic material or a silicone material.

The present disclosure provides a device 300, wherein said device 300 may further comprise a third layer 330 with at least one side coated with a hydrophilic material, and when said third layer 330 is operably coupled with said first layer 310, said side coated with the hydrophilic material faces and/or may be in contact with the first layer 310. For example, the side of said third layer 330 coated with a hydrophilic material may indicate the side that may be contact with the first layer 310.

The present disclosure provides a device 300, wherein said third layer 330 may have an average thickness of about 0.1 mm to about 0.3 mm. For example, said third layer 330 may have an average thickness of about 1 mm to about 4 mm, about 2 mm to about 4 mm, about 3 mm to about 4 mm, about 1 mm to about 3 mm, 2 mm to about 3 mm, or about 1 mm to about 2 mm.

The present disclosure provides a device 300, wherein said third layer 330 may be bound to said first layer 310 with an adhesive.

The present disclosure provides a device 300, wherein said adhesive may comprise an acrylic material or a silicone material. For example, said adhesive may be an adhesive of a tape, the adhesive of the tape may comprise an acrylic material or a silicone material, and the carrier material of the tape may be selected from various materials, e.g., a polyester film. Examples may be 3M 1513, 3M 1524A, 3M 9965, 3M 1522, 3M 1522 H, Vancive MED 1832, Vancive MED 6361U, Adhesives Research 90445 or Adhesives Research 92712. Examples may be Adhesive Research 90880, or Adhesive Research 8026.

The present disclosure provides a device 300, wherein said third layer 330 may comprise at least one opening 3301, when said third layer 330 may be operably coupled with said first layer 310, each of said at least one opening 3301 may be aligned to and in fluid communication with a fluid channel in the first layer 310. For example, one of said at least one opening 3301 may be aligned to and in fluid communication with a fluid channel in the first layer 310. For example, 2, 3, 4 or 5 of said at least one opening 3301 may be aligned to and in fluid communication with a fluid channel in the first layer 310.

The present disclosure provides a device 300, wherein said third layer 330 may comprise two or more said openings 3301, and when said third layer 330 may be operably coupled with said first layer 310, none of the openings 3301 may be aligned to the same fluid channel 3102 with another opening 3301.

The present disclosure provides a device 300, wherein said third layer 330 may be made of a hydrophilic material.

The present disclosure provides a device 300, wherein said hydrophilic material may be polyester. A polyester may be selected from the group consisting of 3M 9984, 3M 9971, 3M 9962, 3M 9960, Kemafoil HNVV, and Kemafoil HNW-W. A polyester film may have a thickness of 23 mm to 350 mm; a polyester film may have a color of white, clear or translucent.

The present disclosure provides a device 300, wherein said device 300 may further comprise a fourth layer 340, and the fourth layer 340 may comprise at least one vent 3401 sealed by a hydrophobic vent material, when said device 300 may be assembled, said terminus of each fluid channel 3102 in said first layer 310 may be in fluid communication with said at least one vent 3401 of the fourth layer 340.

The present disclosure provides a device 300, wherein said fourth layer 340 may have a thickness of about 0.1 mm to about 0.3 mm. For example, said fourth layer 340 may have an average thickness of about 0.1 mm to about 0.4 mm, about 0.2 mm to about 0.4 mm, about 0.3 mm to about 0.4 mm, about 0.1 mm to about 0.3 mm, 0.2 mm to about 0.3 mm, or about 0.1 mm to about 0.2 mm.

The present disclosure provides a device 300, wherein said fourth layer 340 may be bound to said second layer 320 with an adhesive, or said fourth layer 340 may be an adhesive.

The present disclosure provides a device 300, wherein said adhesive may comprise an acrylic material or a silicone material.

The present disclosure provides a device 300, wherein said fourth layer 340 may be made of an acrylic material or a silicone material.

The present disclosure provides a device 300, wherein said fourth layer 340 may comprise a sample receiving inlet 3402, and when said fourth layer 340 may be operably coupled with said second layer 320, said sample receiving inlet 3402 in the fourth layer 340 may be vertically aligned to said sample receiving inlet in the second layer 320. For example, when said second layer 320 may be operably coupled with said fourth layer 340, at least a portion of said sample receiving inlet 3201 in the second layer 320 may be vertically aligned to said sample receiving inlet 3401 in the fourth layer 340, so that said sample receiving inlet 3201 in the second layer 320 may be in fluidic communication with said sample receiving inlet 3401 in the fourth layer 340.

The present disclosure provides a device 300, wherein said device 300 further may comprise a fifth layer 350, said fifth layer 350 may comprise a substrate coated with a layer of conductive material, and said conductive material may be ablated to form insulative areas on said fifth layer 350.

The present disclosure provides a device 300, wherein said conductive material may be gold. For example, said conductive material may be a bare gold, or a gold coated with certain material.

The present disclosure provides a device 300, wherein said substrate may be made from a material selected from the group consisting of polyethylene terephthalate (PETE), acrylonitrile butadiene styrene (ABS), polystyrene, polycarbonate, an acrylic, polyethylene terephthalate (PETG), polysulfone, and polyvinyl chloride (PVC).

The present disclosure provides a device 300, wherein said fifth layer 350 may comprise two symmetrically positioned insertion monitoring electrodes 3501, and when said device 300 is assembled, said insertion monitoring electrodes 3501 may be exposed and not covered by any other layer of said device 350. For example, said insertion monitoring electrodes 3501 may be an electrode embraced by an insulative area. For example, said insertion monitoring electrodes 3501 may be a conductive area embraced by an insulative area.

The present disclosure provides a device 300, wherein said two insertion monitoring electrodes 3501 may be substantially identical, for example of shape or of area.

The present disclosure provides a device 300, wherein the length of said insertion monitoring electrode 3501 may be about 2 mm to about 4 mm. For example, the length of said insertion monitoring electrode 3501 may be about 1 mm to about 4 mm, about 2 mm to about 4 mm, about 3 mm to about 4 mm, about 1 mm to about 3 mm, 2 mm to about 3 mm, or about 1 mm to about 2 mm.

The present disclosure provides a device 300, wherein the width of said insertion monitoring electrode may be about 1 mm to about 3 mm. For example, the width of said insertion monitoring electrode 3501 may be about 1 mm to about 4 mm, about 2 mm to about 4 mm, about 3 mm to about 4 mm, about 1 mm to about 3 mm, 2 mm to about 3 mm, or about 1 mm to about 2 mm.

The present disclosure provides a device 300, wherein said insertion monitoring electrode 3501 may be located in a corner of said fifth layer 350, for example, each corner of the fifth layer 350.

The present disclosure provides a device 300, wherein said fifth layer 350 may comprise at least one working area 3502, said working area 3502 may comprise a working electrode, a counter electrode, a reference electrode and at least two fluid fill electrodes. For example, said fifth layer 350 may comprise at least one, at least 2, at least 3, at least 4 or at least 5 working areas 3502. For example, said fifth layer 350 may comprise 1, 2, 3, 4 or 5 working areas 3502.

The present disclosure provides a device 300, wherein said counter electrode may embrace said working electrode.

The present disclosure provides a device 300, wherein at least one of said fluid fill electrodes may be positioned prior to said working electrode and at least one of said fluid fill electrodes may be positioned after said working electrode along the direction of the current flow.

The present disclosure provides a device 300, wherein said fifth layer 350 may have an average thickness of about 0.1 mm to about 0.3 mm. For example, said fifth layer 350 may have an average thickness of about 0.1 mm to about 0.4 mm, about 0.2 mm to about 0.4 mm, about 0.3 mm to about 0.4 mm, about 0.1 mm to about 0.3 mm, 0.2 mm to about 0.3 mm, or about 0.1 mm to about 0.2 mm.

The present disclosure provides a device 300, wherein said fifth layer 350 may be bound to said third layer with an adhesive.

The present disclosure provides a device 300, wherein said adhesive may comprise an acrylic material or a silicone material.

The present disclosure provides a device 300, wherein when said third layer 330 is operably coupled with said fifth layer 350, said opening 3301 in said third layer 330 may be aligned to and in fluid communication with said working area 3502 in the fifth layer 350.

The present disclosure provides a device 300, wherein when said third layer 330 may be operably coupled with said fifth layer 350, said working area 3502 may be not covered by said third layer 330.

The present disclosure provides a device 300, wherein when said device 300 may be assembled, said working area 3502 of said fifth layer 350 may be in fluid communication with said fluid channel 3102 of said first layer 310.

The present disclosure provides a device 300, wherein said device 300 further may comprise an adapter 210 for operably coupling to a container 100.

The present disclosure provides a device 300, wherein said container 100 may comprise the container 100 according to any one of the present disclosures.

The present disclosure provides a device 300, wherein said adapter 210 may comprise a sample receiving inlet 2101 configured to be in fluid communication with said sample receiving inlet 3101 of said first layer 310 of an assembled device 300.

The present disclosure provides a device 300, wherein said sample receiving inlet 2101 of said adapter 210 may be sealed by a pierceable barrier.

The present disclosure provides a device 300, wherein said pierceable barrier may comprise a pierceable plastic films or a foil film.

The present disclosure provides a device 300, wherein said first pierceable barrier may comprise a pierceable film made from a material selected from the group consisting of polyethylene terephthalate (PETE), polycarbonate, polyethylene, and polyvinyl chloride (PVC).

The present disclosure provides a device 300, wherein said sample receiving inlet 2101 of said adapter 210 may comprise a blocking element 2104 having a bottom configured to prevent said lyophilized reagent 2105 from leaving said device 300, as illustrated in FIG. 5.

The present disclosure provides a device 300, wherein the bottom of said blocking element 2104 may have a width greater than that of the lyophilized reagent 2105.

The present disclosure provides a device 300, wherein said blocking element 2104 may comprise at least one piercing member 2103 extending upwardly toward said pierceable barrier.

The present disclosure provides a device 300, wherein said piercing member 2103 may be configured to disestablish a pierceable barrier of a container 100 and a sample receptacle 110 of said container 100 may be in fluidic communication with said sample receiving inlet 2101 of said device 300, when said container may be mounted on said device 300.

The present disclosure provides a device 300, wherein said container 100 may comprise one or more piercing member 1107, and said piercing member 2103 of said device 300 may be allowed to be positioned between said piercing member 1107 of said container 100 when said container 100 may be mounted on said device 300.

The present disclosure provides a device 300, wherein said one or more piercing member 2103 may have a height of less than 5 mm. For example, said one or more piercing member 2103 may have a height of less than 5 mm, less than 4 mm, less than 3 mm, less than 2 mm, less than 1 mm, or less than 0.5 mm.

The present disclosure provides a device 300, wherein said piercing member 1107 of said container 100 may be configured to disestablish said pierceable barrier of said device 300, said piercing member 2103 of said device 300 may be configured to disestablish a pierceable barrier of said container 100 and a sample receptacle 110 of said container 100 may be in fluidic communication with said sample receiving inlet 2101 of said adapter 210, when said container 100 may be mounted on said device 300.

The present disclosure provides a device 300, wherein said piercing member 2103 may comprise a blunt or curved upper edge. Wherein said piercing member 2103 may comprise a pointed ending.

The present disclosure provides a device 300, wherein said adapter 210 may comprise one or more snap features 2102.

The present disclosure provides a device 300, wherein said one or more snap features 2102 of said adapter 210 may comprise at least one protruding element or at least one recess element.

The present disclosure provides a device 300, wherein said one or more snap features 2102 of said adapter 210 and one or more snap features 1111 of a container 100 may be configured for said container 100 to be irreversibly mounted on said device 300. The join of said snap features 1111 of a container 100 and said snap features 2102 of said adapter 210 may be separable or inseparable depending on the shape of snap feature; the force required to separate the components may vary greatly according to the design.

The present disclosure provides a device 300, wherein said one or more snap features 1111 of said container 100 may comprise at least one protruding element, and said one or more snap features 2102 of said device 300 may comprise at least one recess element configured to irreversibly catch said at least one protruding element.

The present disclosure provides a device 300, wherein at least a portion of the inner surface of the adapter 210, configured to be in contact with one or more outer rings 1109 of an outer base surface of a container 100 when said container 100 is mounted on said device 300, may be made from or may be coated with an elastomeric material substantially coextensive with said elastomeric material of the outer surface of said outer rings 1109, to form a fluid tight seal when said container 100 may be mounted on said adapter 210.

The present disclosure provides a device 300, wherein a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, said at least one fluid channel 3102 may be configured to be completely filled with about 20 μL to about 150 μL fluid, the material for sealing the vent 3103 may be self-sealing, said sample receiving inlet 3101 may comprise a lyophilized reagent 2105, a height of each fluid channel 3102 may be about 0.1 mm to about 1.5 mm, a width of each fluid channel 3102 may be about 0.3 mm to about 1 mm, a length of each fluid channel 3102 may be about 50 mm to about 150 mm, said device 300 further may comprise a fifth layer 350, said fifth layer 350 may comprise a substrate coated with a layer of conductive material, and said conductive material may be ablated to form insulative areas on said fifth layer 350, said fifth layer 350 may comprise two symmetrically positioned insertion monitoring electrodes 3501, and when said device 300 is assembled, said insertion monitoring electrodes 3501 may be exposed and not covered by any other layer of said device 350, said fifth layer 350 may comprise at least one working area 3502, said working area 3502 may comprise a working electrode, a counter electrode, a reference electrode and at least two fluid fill electrodes, at least one of said fluid fill electrodes may be positioned prior to said working electrode and at least one of said fluid fill electrodes may be positioned after said working electrode along the direction of the current flow.

The present disclosure provides a device 300, wherein said device 300 further may comprise a fifth layer 350, said fifth layer 350 may comprise a substrate coated with a layer of conductive material, and said conductive material may be ablated to form insulative areas on said fifth layer 350, said fifth layer 350 may comprise two symmetrically positioned insertion monitoring electrodes 3501, and when said device

300 is assembled, said insertion monitoring electrodes 3501 may be exposed and not covered by any other layer of said device 350, said fifth layer 350 may comprise at least one working area 3502, said working area 3502 may comprise a working electrode, a counter electrode, a reference electrode and at least two fluid fill electrodes, at least one of said fluid fill electrodes may be positioned prior to said working electrode and at least one of said fluid fill electrodes may be positioned after said working electrode along the direction of the current flow.

The present disclosure provides a device 300, wherein a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, said at least one fluid channel 3102 may be configured to be completely filled with about 20 μL to about 150 μL fluid, the material for sealing the vent 3103 may be self-sealing, said sample receiving inlet 3101 may comprise a lyophilized reagent 2105, a height of each fluid channel 3102 may be about 0.1 mm to about 1.5 mm, a width of each fluid channel 3102 may be about 0.3 mm to about 1 mm, a length of each fluid channel 3102 may be about 50 mm to about 150 mm.

The present disclosure provides a device 300, wherein a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, said at least one fluid channel 3102 may be configured to be completely filled with about 20 μL to about 150 μL fluid, the material for sealing the vent 3103 may be self-sealing, said sample receiving inlet 3101 may comprise a lyophilized reagent 2105, a height of each fluid channel 3102 may be about 0.1 mm to about 1.5 mm, a width of each fluid channel 3102 may be about 0.3 mm to about 1 mm, a length of each fluid channel 3102 may be about 50 mm to about 150 mm, said device 300 further may comprise a fifth layer 350, said fifth layer 350 may comprise a substrate coated with a layer of conductive material, and said conductive material may be ablated to form insulative areas on said fifth layer 350, said fifth layer 350 may comprise two symmetrically positioned insertion monitoring electrodes 3501, and when said device 300 is assembled, said insertion monitoring electrodes 3501 may be exposed and not covered by any other layer of said device 350, said fifth layer 350 may comprise at least one working area 3502, said working area 3502 may comprise a working electrode, a counter electrode, a reference electrode and at least two fluid fill electrodes, at least one of said fluid fill electrodes may be positioned prior to said working electrode and at least one of said fluid fill electrodes may be positioned after said working electrode along the direction of the current flow, when a third layer 330 is operably coupled with said fifth layer 350, an opening 3301 in a third layer 330 may be aligned to and in fluid communication with said working area 3502 in the fifth layer 350, said device 300 further may comprise an adapter 210 for operably coupling to a container 100, said adapter 210 may comprise a sample receiving inlet 2101 configured to be in fluid communication with said sample receiving inlet 3101 of said first layer 310 of an assembled device 300, said sample receiving inlet 2101 of said adapter 210 may be sealed by a pierceable barrier, said container 100 may comprise one or more piercing member 1107, and said piercing member 2103 of said device 300 may be allowed to be positioned between said piercing member 1107 of said container 100 when said container 100 may be mounted on said device 300.

The present disclosure provides a device 300, wherein a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, said at least one fluid channel 3102 may be configured to be completely filled with about 20 μL to about 150 μL fluid, the material for sealing the vent 3103 may be self-sealing, said sample receiving inlet 3101 may comprise a lyophilized reagent 2105, a height of each fluid channel 3102 may be about 0.1 mm to about 1.5 mm, a width of each fluid channel 3102 may be about 0.3 mm to about 1 mm, a length of each fluid channel 3102 may be about 50 mm to about 150 mm, said device 300 further may comprise a fifth layer 350, said fifth layer 350 may comprise a substrate coated with a layer of conductive material, and said conductive material may be ablated to form insulative areas on said fifth layer 350, said fifth layer 350 may comprise two symmetrically positioned insertion monitoring electrodes 3501, and when said device 300 is assembled, said insertion monitoring electrodes 3501 may be exposed and not covered by any other layer of said device 350, said fifth layer 350 may comprise at least one working area 3502, said working area 3502 may comprise a working electrode, a counter electrode, a reference electrode and at least two fluid fill electrodes, at least one of said fluid fill electrodes may be positioned prior to said working electrode and at least one of said fluid fill electrodes may be positioned after said working electrode along the direction of the current flow, when a third layer 330 is operably coupled with said fifth layer 350, an opening 3301 in a third layer 330 may be aligned to and in fluid communication with said working area 3502 in the fifth layer 350, said device 300 further may comprise an adapter 210 for operably coupling to a container 100, said adapter 210 may comprise a sample receiving inlet 2101 configured to be in fluid communication with said sample receiving inlet 3101 of said first layer 310 of an assembled device 300, said sample receiving inlet 2101 of said adapter 210 may be sealed by a pierceable barrier, said sample receiving inlet 2101 of said adapter 210 may comprise a blocking element 2104 having a bottom configured to prevent said lyophilized reagent 2105 from leaving said device 300, said container 100 may comprise one or more piercing member 1107, and said piercing member 2103 of said device 300 may be allowed to be positioned between said piercing member 1107 of said container 100 when said container 100 may be mounted on said device 300, said adapter 210 may comprise one or more snap features 2102, one or more snap features 2102 of said adapter 210 and one or more snap features 1111 of a container 100 may be configured for said container 100 to be irreversibly mounted on said device 300, at least a portion of the inner surface of the adapter 210, configured to be in contact with one or more outer rings 1109 of an outer base surface of a container 100 when said container 100 is mounted on said device 300, may be made from or may be coated with an elastomeric material substantially coextensive with said elastomeric material of the outer surface of said outer rings 1109, to form a fluid tight seal when said container 100 may be mounted on said adapter 210.

The present disclosure provides a device 300, wherein a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, said at least one fluid channel 3102 may be configured to be completely filled with about 20 μL to about 150 μL fluid, the material for sealing the vent 3103 may be self-sealing, said sample receiving inlet 3101 may comprise a lyophilized reagent 2105, a height of each fluid channel 3102 may be about 0.1 mm to about 1.5 mm, a width of each fluid channel 3102 may be about 0.3 mm to about 1 mm, a length of each fluid channel 3102 may be about 50 mm to about 150 mm, said device 300 further may comprise a second layer 320 with at least one side coated with a hydrophilic material, when said second layer 320 is operably coupled with said first layer 310, said side coated with the hydrophilic material faces and/or may be in contact with the first layer 310, said second layer 320 may comprise a sample receiving inlet 3201, and when said second layer 320 may be operably coupled with said first layer 310, said sample receiving inlet 3201 in the second layer 320 may be vertically aligned to said sample receiving inlet 3101 in the first layer 310, said device 300 may further comprise a third layer 330 with at least one side coated with a hydrophilic material, and when said third layer 330 is operably coupled with said first layer 310, said side coated with the hydrophilic material faces and/or may be in contact with the first layer 310, said third layer 330 may comprise at least one opening 3301, when said third layer 330 is operably coupled with said first layer 310, each of said at least one opening 3301 may be aligned to and in fluid communication with a fluid channel in the first layer 310, said device 300 may further comprise a fourth layer 340, and the fourth layer 340 may comprise at least one vent 3401 sealed by a hydrophobic vent material, when said device 300 may be assembled, said terminus of each fluid channel 3102 in said first layer 310 may be in fluid communication with said at least one vent 3401 of the fourth layer 340, said device 300 further may comprise a fifth layer 350, said fifth layer 350 may comprise a substrate coated with a layer of conductive material, and said conductive material may be ablated to form insulative areas on said fifth layer 350, said fifth layer 350 may comprise two symmetrically positioned insertion monitoring electrodes 3501, and when said device 300 is assembled, said insertion monitoring electrodes 3501 may be exposed and not covered by any other layer of said device 350, said fifth layer 350 may comprise at least one working area 3502, said working area 3502 may comprise a working electrode, a counter electrode, a reference electrode and at least two fluid fill electrodes, at least one of said fluid fill electrodes may be positioned prior to said working electrode and at least one of said fluid fill electrodes may be positioned after said working electrode along the direction of the current flow, when said third layer 330 is operably coupled with said fifth layer 350, said opening 3301 in said third layer 330 may be aligned to and in fluid communication with said working area 3502 in the fifth layer 350, said device 300 further may comprise an adapter 210 for operably coupling to a container 100, said adapter 210 may comprise a sample receiving inlet 2101 configured to be in fluid communication with said sample receiving inlet 3101 of said first layer 310 of an assembled device 300, said sample receiving inlet 2101 of said adapter 210 may be sealed by a pierceable barrier, said sample receiving inlet 2101 of said adapter 210 may comprise a blocking element 2104 having a bottom configured to prevent said lyophilized reagent 2105 from leaving said device 300, said container 100 may comprise one or more piercing member 1107, and said piercing member 2103 of said device 300 may be allowed to be positioned between said piercing member 1107 of said container 100 when said container 100 may be mounted on said device 300, said adapter 210 may comprise one or more snap features 2102, one or more snap features 2102 of said adapter 210 and one or more snap features 1111 of a container 100 may be configured for said container 100 to be irreversibly mounted on said device 300, at least a portion of the inner surface of the adapter 210, configured to be in contact with one or more outer rings 1109 of an outer base surface of a container 100 when said container 100 is mounted on said device 300, may be made from or may be coated with an elastomeric material substantially coextensive with said elastomeric material of the outer surface of said outer rings 1109, to form a fluid tight seal when said container 100 may be mounted on said adapter 210.

Figure 14A:
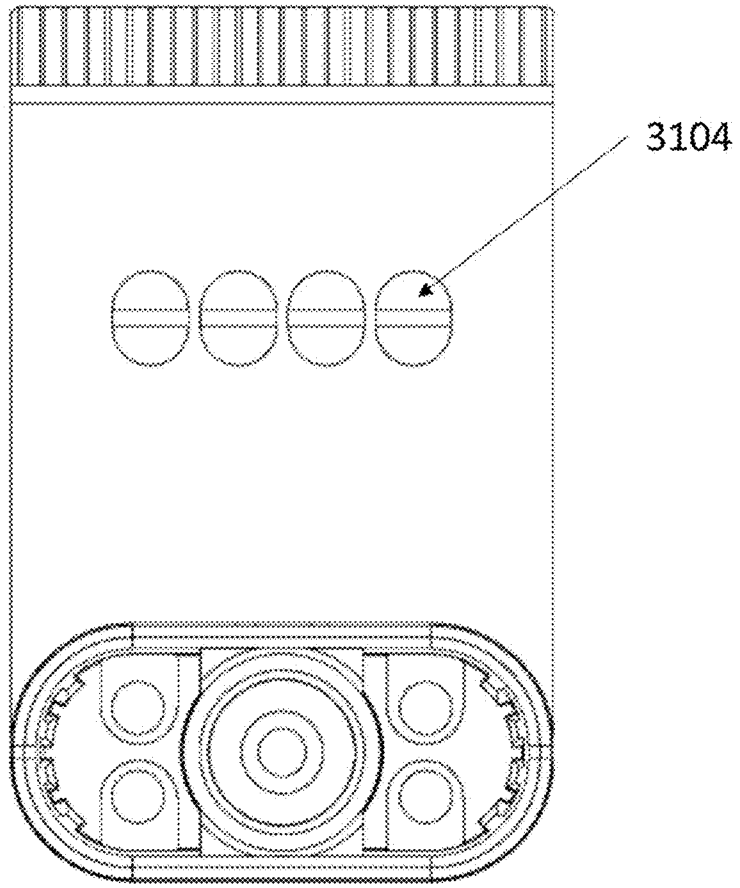
FIGS. 14A-14B illustrate top visible view and top see-through view of another present device.
Figure 14B:
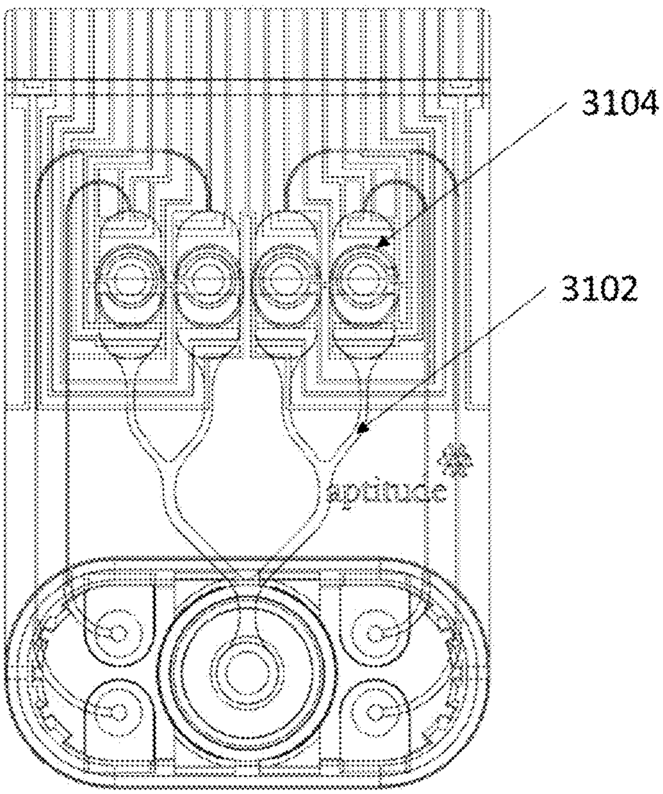
Figure 15A:
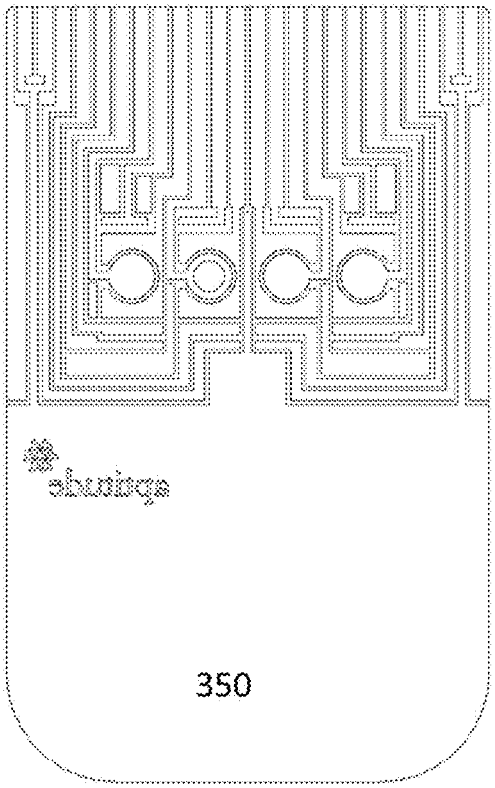
FIGS. 15A-15D illustrate each layer of another present device.
Figure 15B:
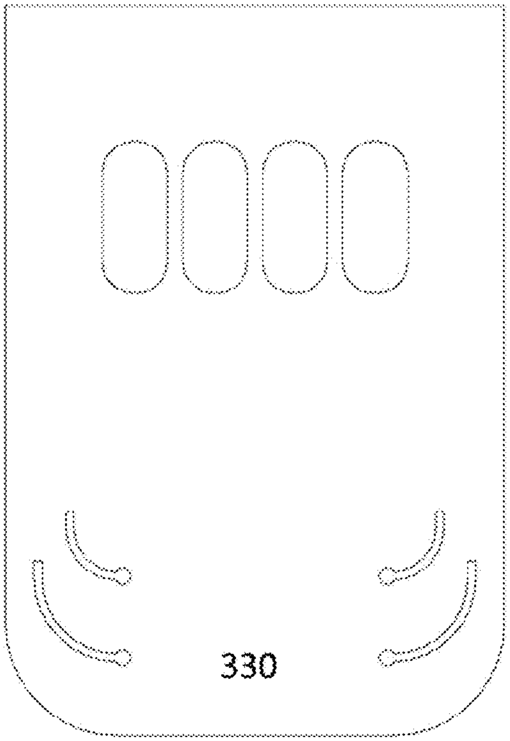
Figure 15C:
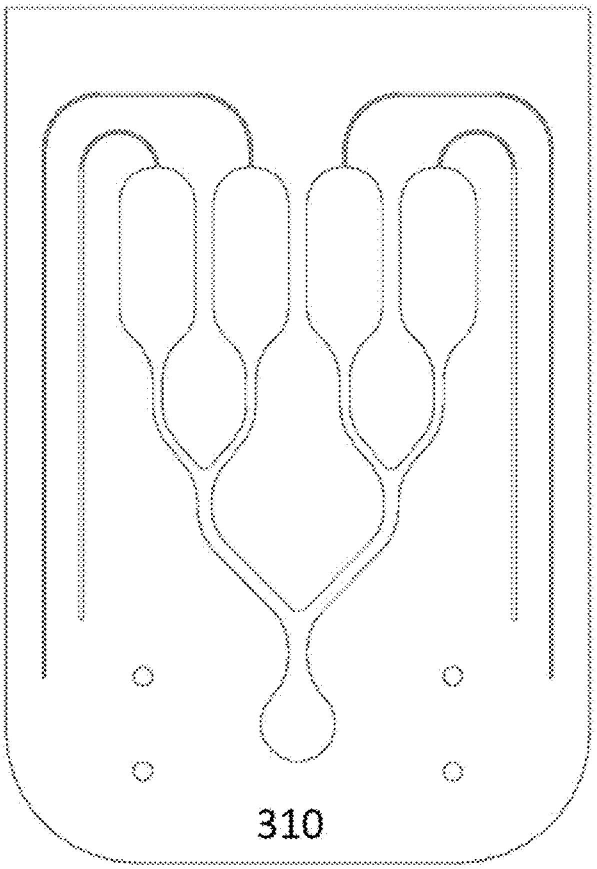
Figure 15D:
Figure 16A:
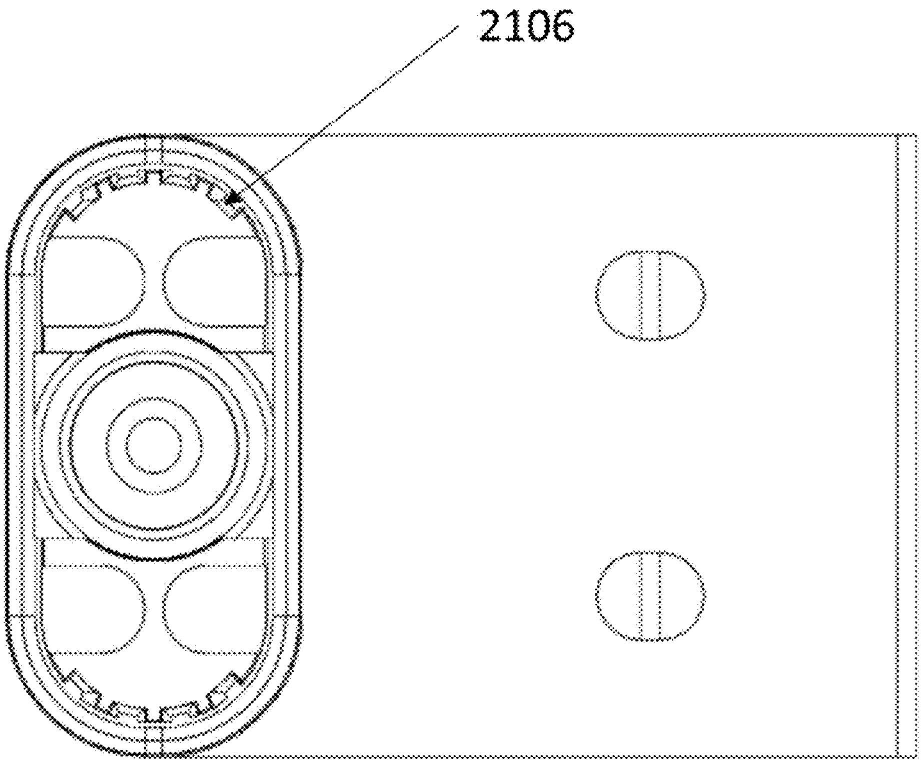
FIGS. 16A-16H illustrate each view of another present device.
Figure 16B:
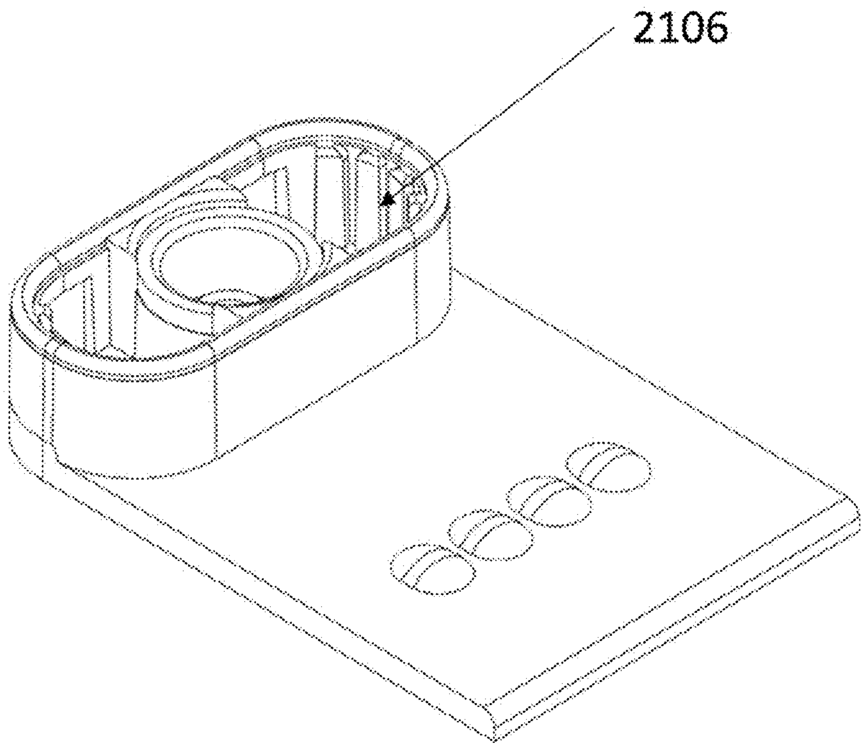
Figure 16C:
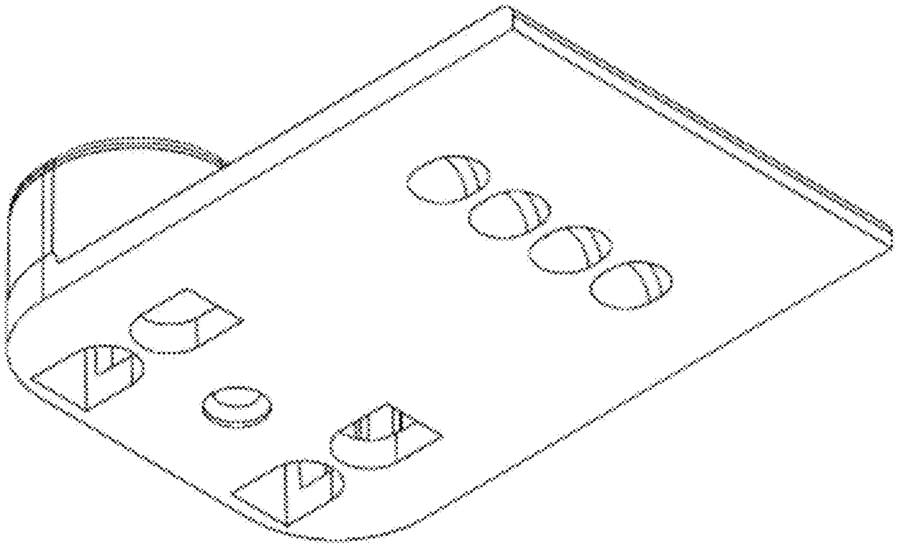
Figure 16D:
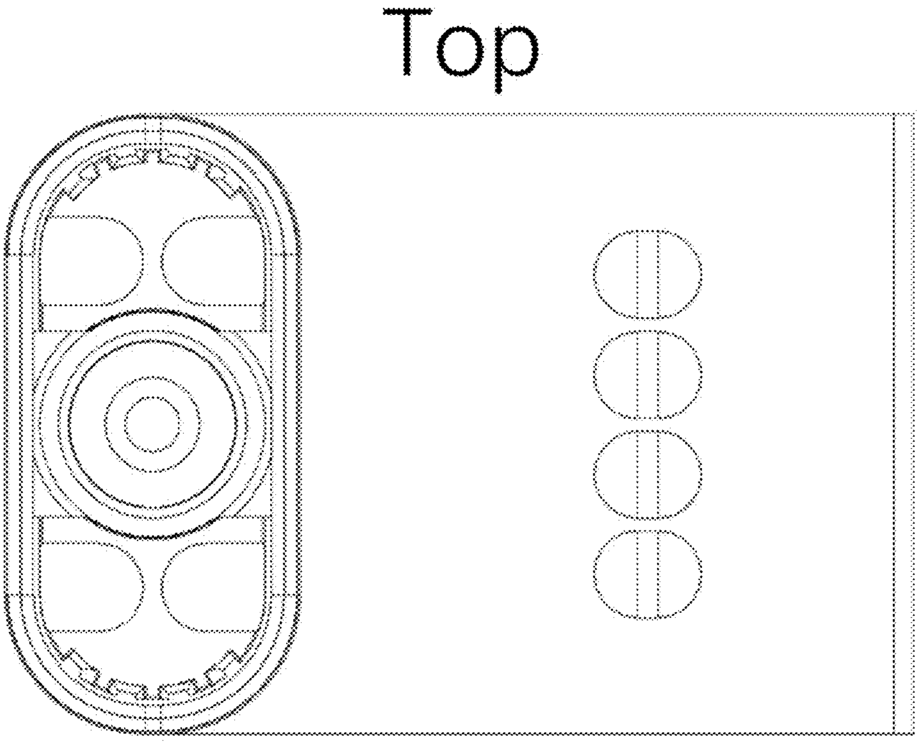
Figure 16E:
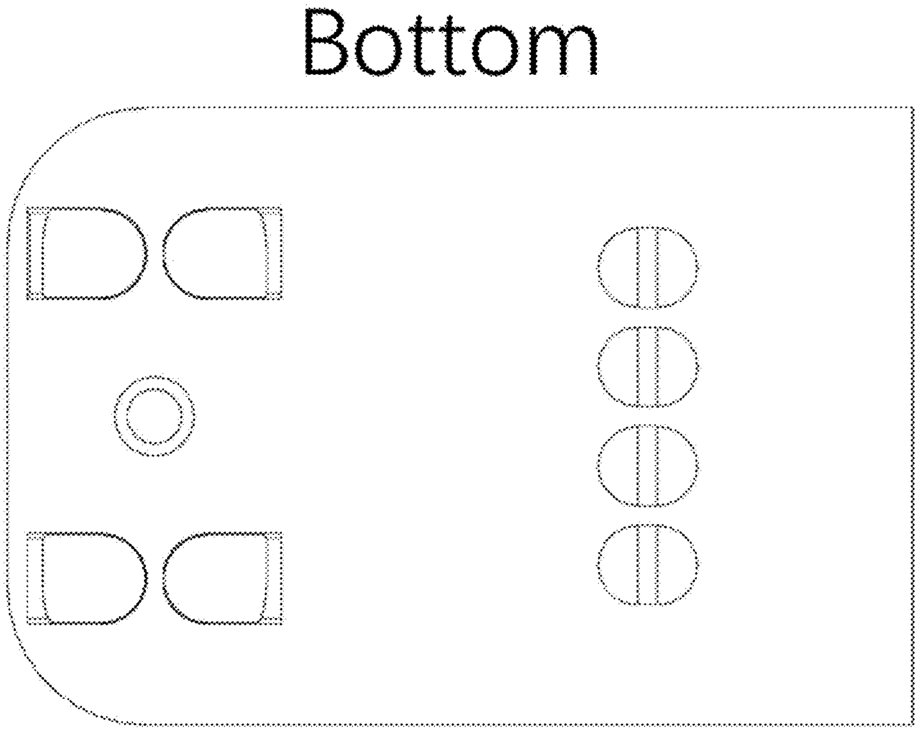
Figure 16F:
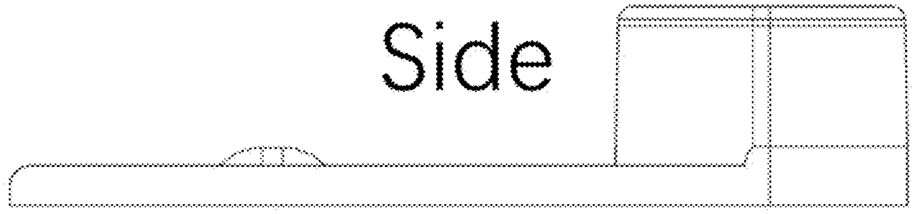
Figure 16G:
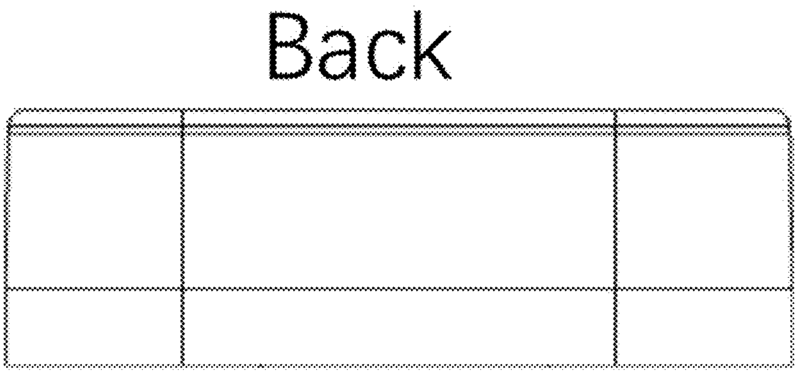
Figure 16H:
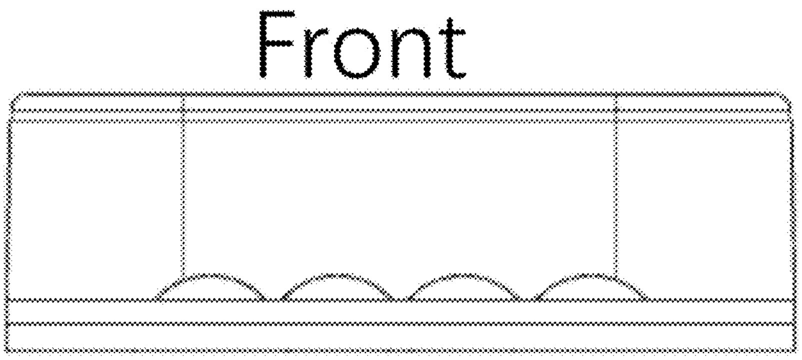
Figure 17A:
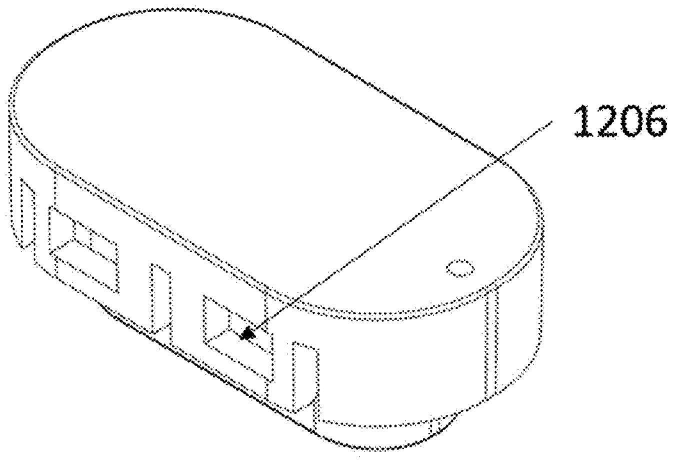
FIGS. 17A-17F illustrate each view of another cap.
Figure 17B:
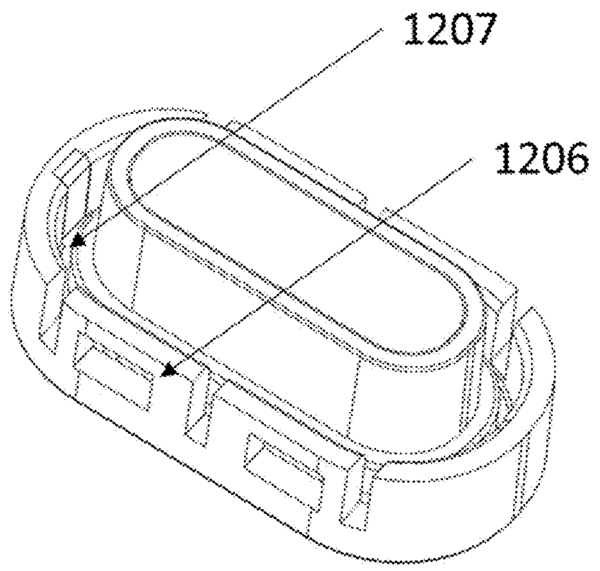
Figure 17C:
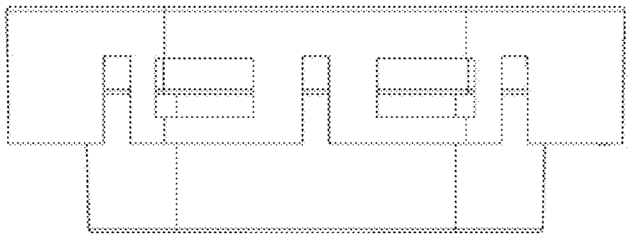
Figure 17D:
Figure 17E:
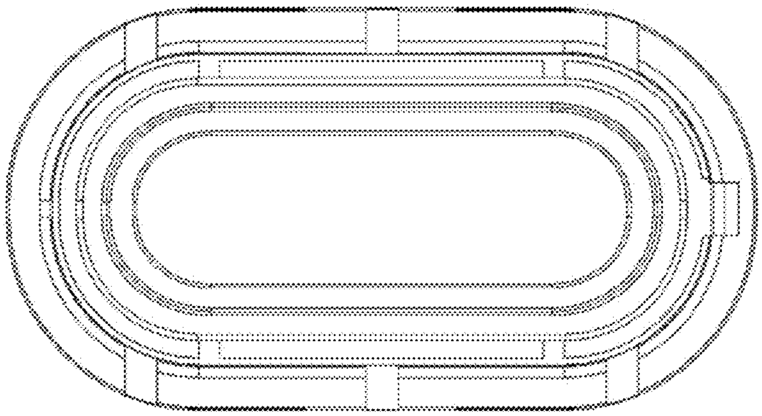
Figure 17F:
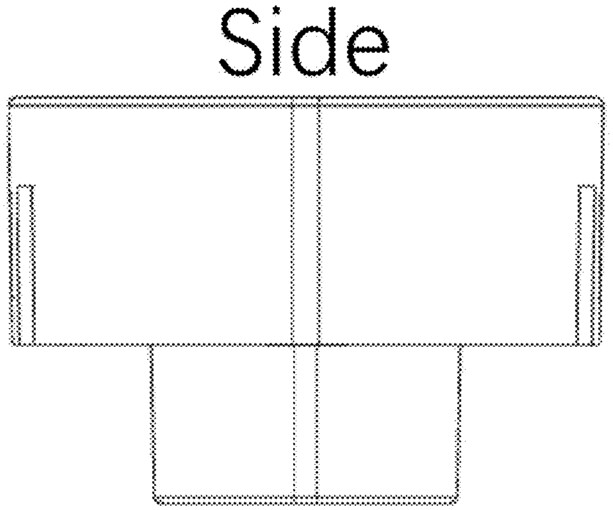
Figure 18A:
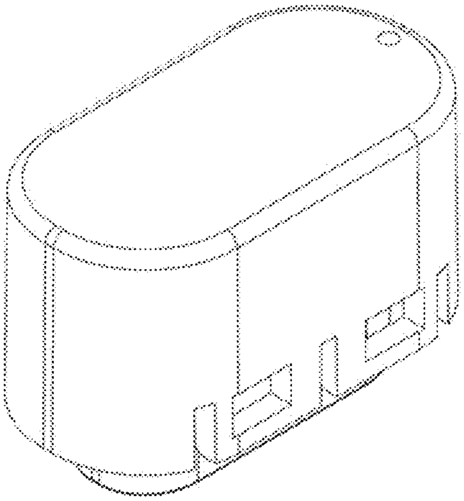
FIGS. 18A-18F illustrate each view of another cap.
Figure 18B:
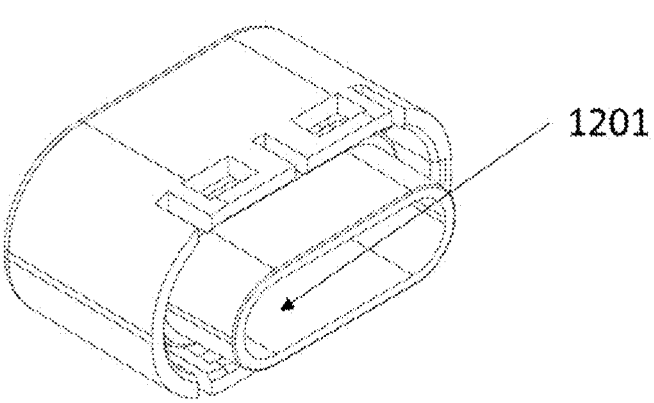
Figure 18C:
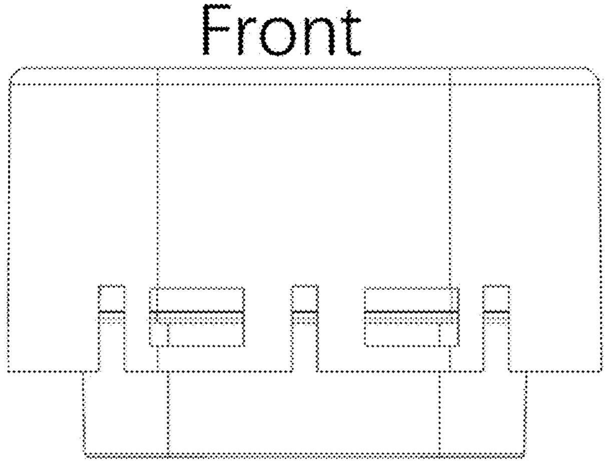
Figure 18D:
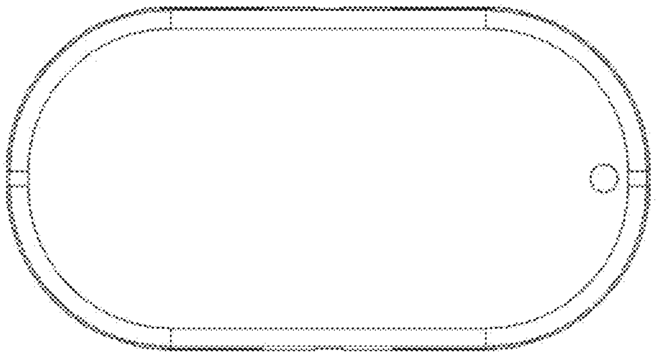
Figure 18E:
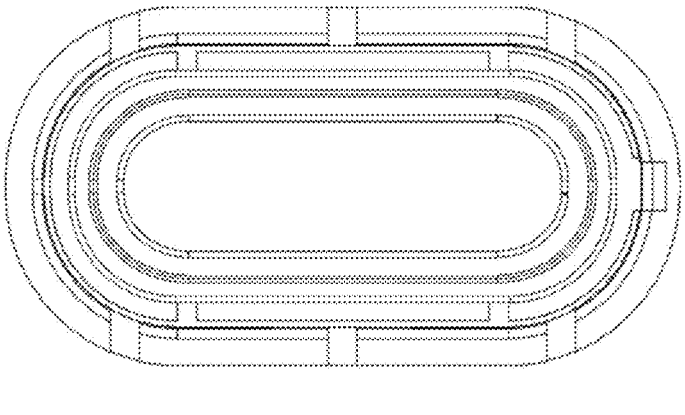
Figure 18F:
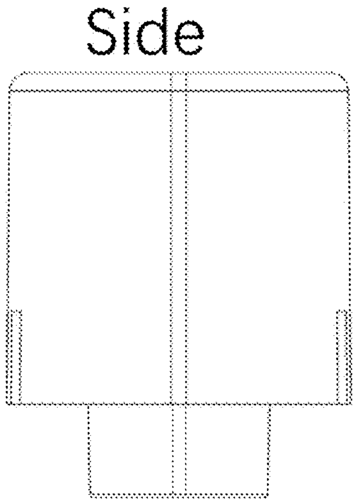
Figure 19A:
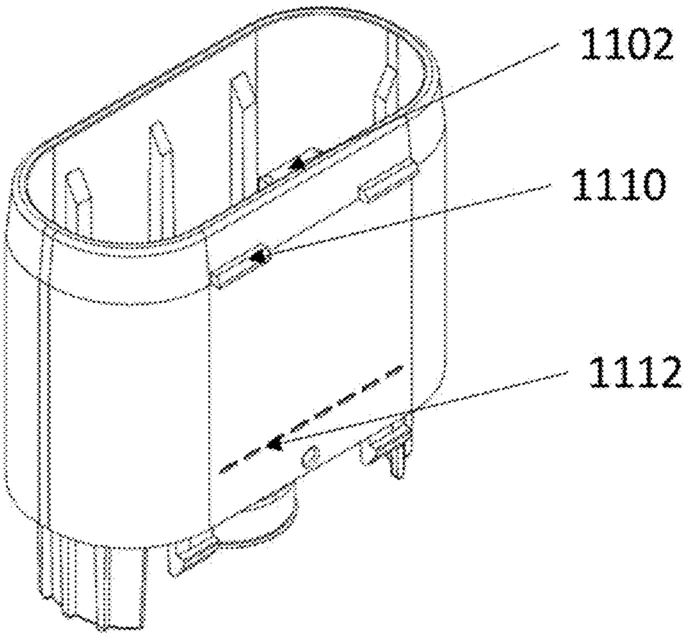
FIGS. 19A-19F illustrate each view of another sample receptacle.
Figure 19B:
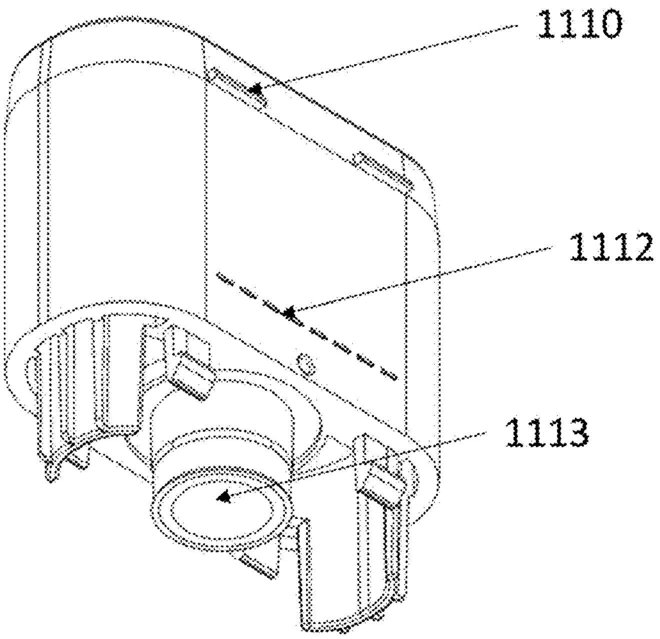
Figure 19C:
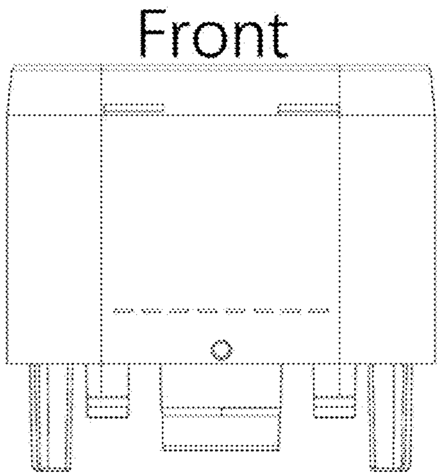
Figure 19D:
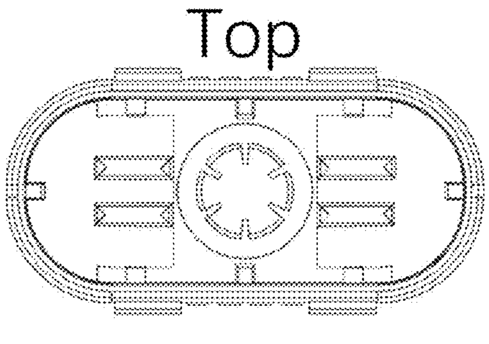
Figure 19E:
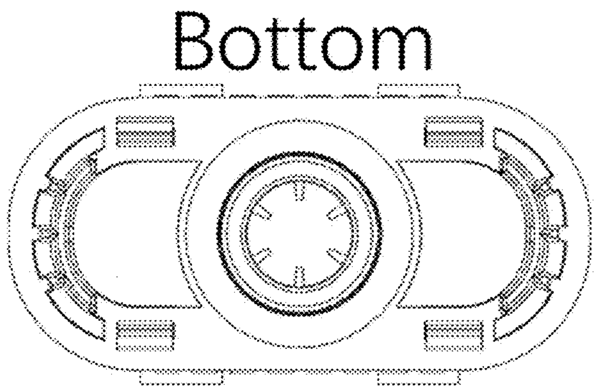
Figure 19F:
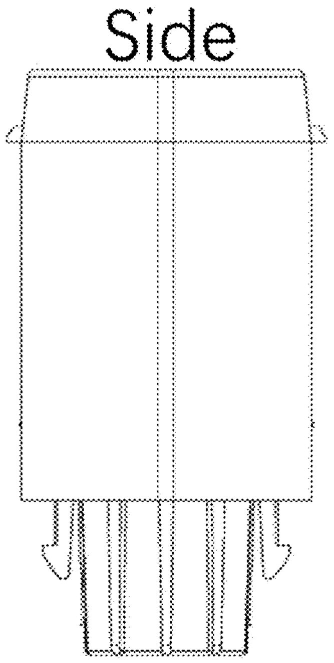

FIGS. 14A-14B illustrate top visible view and top see-through view of another present device. The device 300 may comprise at least one reaction chamber 3104. Wherein the reaction chamber 3104 may be the shape of a doom. Wherein lyophilized reagent may be present in the chamber 3104. Said lyophilized reagent may comprise a nucleic acid amplification enzyme and a DNA primer for LAMP reaction. Wherein, each of the reaction chamber 3104 may be independent. Wherein, the lyophilized reagent in one reaction chamber 3104 may be different from the lyophilized reagent in another reaction chamber 3104. The device 300 may comprise at least one fluid channel 3102 in fluidic communication with said reaction chamber 3104. Wherein the diameter of the outlet fluid channel 3102 from the chamber 3104 is smaller than the diameter of the lyophilized reagent. Wherein the lyophilized reagent may not be washed out of the reaction chamber 3104.

FIGS. 15A-15D illustrate each layer of another present device. The device 300 may comprise a fifth layer 350, said fifth layer 350 may comprise a substrate coated with a layer of conductive material, and said conductive material may be ablated to form insulative areas on said fifth layer 350. Wherein said fifth layer 350 may comprise at least one insertion monitoring electrodes 3501. Electrical short of insertion monitoring electrodes 3501 triggers sensor insertion detection which may automatically initiate test protocol. The combination of the outer pins of the fifth layer 350 may be used to identify sensor type and may automatically initiate one or more test-specific protocol. The device 300 may comprise a third layer 330 with at least one side coated with a hydrophilic material, and said third layer 330 is operably coupled with said fifth layer 350. The device 300 may comprise a first layer 310, said first layer 310 may comprise at least one fluid channel 3102. The device 300 may further comprise a fourth layer 340, and the fourth layer 340 may comprise at least one vent 3401 sealed by a hydrophobic vent material.

FIGS. 16A-16H illustrate each view of another present device. The device 300 may comprise an adapter 210. An exterior ring may be positioned between an adapter 210 and a container 100. Wherein, when said container is mounted on said device 300, the exterior ring may seal the fluidic system. The adapter 210 may comprise one or more ribs 2106, wherein the ribs 2106 may guide the insertion of the container 100 into the adapter 210. The ribs 2106 may be on the inner face of the adapter 210. The ribs 2106 may be configured to adapt to the ribs on the container 100. For example, the distance of the ribs 2106 may be the same as or slightly larger than the thickness of ribs on the container 100.

System

The present disclosure provides a system. The system may comprise the container according to any one of the present disclosures. Wherein said container 100 may comprise a sample receptacle 110 and a cap 120, wherein: the cap 120 may comprise a reservoir 1201 for retaining a composition, a first piercing member 1202 and a first pierceable barrier 1203 for sealing said composition within said reservoir 1201; the sample receptacle 110 may comprise a first open end 1101 for receiving a sample, and one or more second piercing members 1102, said first open end 1101 may be configured for closure by said cap 120 and for receiving said composition; said first piercing member 1202 and said one or more second piercing members 1102 may be configured to disestablish the first pierceable barrier 1203 from opposite side of said first pierceable barrier 1203 when said first open end 1101 may be closed by said cap 120. Wherein said cap 120 further may comprise said composition sealed within said reservoir 1201.

The present disclosure provides a system, comprising a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material.

The present disclosure provides a system, said system may comprise a container 100, comprising a sample receptacle 110 and a cap 120, wherein: the cap 120 may comprise a reservoir 1201 for retaining a composition, a first piercing member 1202 and a first pierceable barrier 1203 for sealing said composition within said reservoir 1201; the sample receptacle 110 may comprise a first open end 1101 for receiving a sample, and one or more second piercing members 1102, said first open end 1101 may be configured for closure by said cap 120 and for receiving said composition; said first piercing member 1202 and said one or more second piercing members 1102 may be configured to disestablish the first pierceable barrier 1203 from opposite side of said first pierceable barrier 1203 when said first open end 1101 may be closed by said cap 120, and said system may comprise a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, wherein said device 300 further may comprise a fifth layer 350, wherein said fifth layer 350 may comprise at least one working area 3502, wherein said device 300 further may comprise an adapter 210 for operably coupling to a container 100.

The present disclosure provides a system, said system may comprise a container 100, comprising a sample receptacle 110 and a cap 120, wherein: the cap 120 may comprise a reservoir 1201 for retaining a composition, a first piercing member 1202 and a first pierceable barrier 1203 for sealing said composition within said reservoir 1201; the sample receptacle 110 may comprise a first open end 1101 for receiving a sample, and one or more second piercing members 1102, said first open end 1101 may be configured for closure by said cap 120 and for receiving said composition; said first piercing member 1202 and said one or more second piercing members 1102 may be configured to disestablish the first pierceable barrier 1203 from opposite side of said first pierceable barrier 1203 when said first open end 1101 may be closed by said cap 120, wherein said sample receptacle 110 may comprise an outlet 1104, and said outlet 1104 may be in fluidic communication with said sample receptacle 110, wherein the reservoir 1201 may be sized to accommodate no less than about 500 μL fluid, and said system may comprise a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, wherein said device 300 further may comprise a fifth layer 350, said fifth layer 350 may comprise a substrate coated with a layer of conductive material, and said conductive material may be ablated to form insulative areas on said fifth layer 350, wherein said fifth layer 350 may comprise at least one working area 3502, said working area 3502 may comprise a working electrode, a counter electrode, a reference electrode and at least two fluid fill electrodes, wherein said device 300 further may comprise an adapter 210 for operably coupling to a container 100.

The present disclosure provides a system, said system may comprise a container 100, comprising a sample receptacle 110 and a cap 120, wherein: the cap 120 may comprise a reservoir 1201 for retaining a composition, a first piercing member 1202 and a first pierceable barrier 1203 for sealing said composition within said reservoir 1201; the sample receptacle 110 may comprise a first open end 1101 for receiving a sample, and one or more second piercing members 1102, said first open end 1101 may be configured for closure by said cap 120 and for receiving said composition; said first piercing member 1202 and said one or more second piercing members 1102 may be configured to disestablish the first pierceable barrier 1203 from opposite side of said first pierceable barrier 1203 when said first open end 1101 may be closed by said cap 120, wherein said cap 120 may comprise a top inner surface 1204, and said first piercing member 1202 may extend from the top inner surface 1204 of said cap 120, wherein said one or more second piercing members 1102 extend from the inner base surface 1103 of said sample receptacle 110, wherein said sample receptacle 110 may comprise two of said second piercing members 1102 configured to allow said first piercing member 1202 to be positioned between two of said second piercing members 1102 when said first open end 1101 may be closed by said cap 120, wherein said sample receptacle 110 may comprise an outlet 1104, and said outlet 1104 may be in fluidic communication with said sample receptacle 110, wherein said outlet 1104 may be sealed by a second pierceable barrier 1105, wherein at least a portion of an interior surface 1106 of the sample receptacle 110, configured to be in contact with said wall 1205 of the cap 120 when the cap 120 may be closed, may be made from or may be coated with an elastomeric material substantially coextensive with said elastomeric material of the outer surface of the wall 1205, for sealing the first open end 1101 against flow when the atmospheric pressure may be equal to or greater than the pressure in the container 100, wherein the reservoir 1201 may be sized to accommodate no less than about 500 μL fluid, and said system may comprise a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, wherein said first layer 310 may have an average thickness of about 0.1 mm to about 0.3 mm, wherein said at least one fluid channel 3102 may comprise two or more fluid channels 3102 substantially equidistant from said sample receiving inlet 3101, wherein pore size of said vent 3103 may have an average diameter of about 0.1 μm to about 10 μm, wherein said sample receiving inlet 3101 may comprise a lyophilized reagent 2105, wherein a width of each fluid channel 3102 may be about 0.3 mm to about 1 mm, wherein said device 300 further may comprise a fifth layer 350, said fifth layer 350 may comprise a substrate coated with a layer of conductive material, and said conductive material may be ablated to form insulative areas on said fifth layer 350, wherein said fifth layer 350 may comprise two symmetrically positioned insertion monitoring electrodes 3501, and when said device 300 may be assembled, said insertion monitoring electrodes 3501 may be exposed and not covered by any other layer of said device 350, wherein said fifth layer 350 may comprise at least one working area 3502, said working area 3502 may comprise a working electrode, a counter electrode, a reference electrode and at least two fluid fill electrodes, wherein said device 300 further may comprise an adapter 210 for operably coupling to a container 100.

The present disclosure provides a system, said system may comprise a container 100, comprising a sample receptacle 110 and a cap 120, wherein: the cap 120 may comprise a reservoir 1201 for retaining a composition, a first piercing member 1202 and a first pierceable barrier 1203 for sealing said composition within said reservoir 1201; the sample receptacle 110 may comprise a first open end 1101 for receiving a sample, and one or more second piercing members 1102, said first open end 1101 may be configured for closure by said cap 120 and for receiving said composition; said first piercing member 1202 and said one or more second piercing members 1102 may be configured to disestablish the first pierceable barrier 1203 from opposite side of said first pierceable barrier 1203 when said first open end 1101 may be closed by said cap 120, wherein said cap 120 may comprise a top inner surface 1204, and said first piercing member 1202 may extend from the top inner surface 1204 of said cap 120, wherein said one or more second piercing members 1102 extend from the inner base surface 1103 of said sample receptacle 110, wherein said sample receptacle 110 may comprise two of said second piercing members 1102 configured to allow said first piercing member 1202 to be positioned between two of said second piercing members 1102 when said first open end 1101 may be closed by said cap 120, wherein said sample receptacle 110 may comprise an outlet 1104, and said outlet 1104 may be in fluidic communication with said sample receptacle 110, wherein said outlet 1104 may be sealed by a second pierceable barrier 1105, wherein at least a portion of an interior surface 1106 of the sample receptacle 110, configured to be in contact with said wall 1205 of the cap 120 when the cap 120 may be closed, may be made from or may be coated with an elastomeric material substantially coextensive with said elastomeric material of the outer surface of the wall 1205, for sealing the first open end 1101 against flow when the atmospheric pressure may be equal to or greater than the pressure in the container 100, wherein the reservoir 1201 may be sized to accommodate no less than about 500 μL fluid, wherein said sample receptacle 110 may comprise one or more outer rings 1109, said one or more outer ring may extend outwardly from said outer base surface, wherein at least a portion of said inner surface of said adapter 210, configured to be in contact with said one or more outer rings 1109 of said container 100 when said container 100 may be mounted on said adapter 210, may be made from or may be coated with an elastomeric material substantially coextensive with said elastomeric material of said outer surface of said one or more outer rings 1109, to form a fluid tight seal when said container 100 may be mounted on said adapter 210, and said system may comprise a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, wherein said first layer 310 may have an average thickness of about 0.1 mm to about 0.3 mm, wherein said at least one fluid channel 3102 may comprise two or more fluid channels 3102 substantially equidistant from said sample receiving inlet 3101, wherein pore size of said vent 3103 may have an average diameter of about 0.1 μm to about 10 μm, wherein said sample receiving inlet 3101 may comprise a lyophilized reagent 2105, wherein a width of each fluid channel 3102 may be about 0.3 mm to about 1 mm, wherein said device 300 further may comprise a second layer 320 with at least one side coated with a hydrophilic material, and when said second layer 320 may be operably coupled with said first layer 310, said side coated with the hydrophilic material faces and/or may be in contact with the first layer 310, wherein said device 300 further may comprise a third layer 330 with at least one side coated with a hydrophilic material, and when said third layer 330 may be operably coupled with said first layer 310, said side coated with the hydrophilic material faces and/or may be in contact with the first layer 310, wherein said device 300 further may comprise a fourth layer 340, and the fourth layer 340 may comprise at least one vent 3401 sealed by a hydrophobic vent material, when said device 300 may be assembled, said terminus of each fluid channel 3102 in said first layer 310 may be in fluid communication with said at least one vent 3401 of the fourth layer 340, wherein said device 300 further may comprise a fifth layer 350, said fifth layer 350 may comprise a substrate coated with a layer of conductive material, and said conductive material may be ablated to form insulative areas on said fifth layer 350, wherein said fifth layer 350 may comprise two symmetrically positioned insertion monitoring electrodes 3501, and when said device 300 may be assembled, said insertion monitoring electrodes 3501 may be exposed and not covered by any other layer of said device 350, wherein said fifth layer 350 may comprise at least one working area 3502, said working area 3502 may comprise a working electrode, a counter electrode, a reference electrode and at least two fluid fill electrodes, wherein said device 300 further may comprise an adapter 210 for operably coupling to a container 100.

The present disclosure provides a system, said system may comprise a container 100, comprising a sample receptacle 110 and a cap 120, wherein: the cap 120 may comprise a reservoir 1201 for retaining a composition, a first piercing member 1202 and a first pierceable barrier 1203 for sealing said composition within said reservoir 1201; the sample receptacle 110 may comprise a first open end 1101 for receiving a sample, and one or more second piercing members 1102, said first open end 1101 may be configured for closure by said cap 120 and for receiving said composition; said first piercing member 1202 and said one or more second piercing members 1102 may be configured to disestablish the first pierceable barrier 1203 from opposite side of said first pierceable barrier 1203 when said first open end 1101 may be closed by said cap 120, wherein said cap 120 may comprise a top inner surface 1204, and said first piercing member 1202 may extend from the top inner surface 1204 of said cap 120, wherein said one or more second piercing members 1102 extend from the inner base surface 1103 of said sample receptacle 110, wherein said sample receptacle 110 may comprise two of said second piercing members 1102 configured to allow said first piercing member 1202 to be positioned between two of said second piercing members 1102 when said first open end 1101 may be closed by said cap 120, wherein said sample receptacle 110 may comprise an outlet 1104, and said outlet 1104 may be in fluidic communication with said sample receptacle 110, wherein said outlet 1104 may be sealed by a second pierceable barrier 1105, wherein at least a portion of an interior surface 1106 of the sample receptacle 110, configured to be in contact with said wall 1205 of the cap 120 when the cap 120 may be closed, may be made from or may be coated with an elastomeric material substantially coextensive with said elastomeric material of the outer surface of the wall 1205, for sealing the first open end 1101 against flow when the atmospheric pressure may be equal to or greater than the pressure in the container 100, wherein the reservoir 1201 may be sized to accommodate no less than about 500 μL fluid, wherein sample receptacle 110 may comprise an extension 1108, said extension 1108 may extend outwardly from said outer base surface of said sample receptacle 110 and an inner of said extension may be in fluidic communication with said first open 1101, wherein at least a portion of said inner surface of said sample receiving inlet 2101, configured to be in contact with said extension 1108 of said container 100 when said container 100 may be mounted on said adapter 210, may be made from or may be coated with an elastomeric material substantially coextensive with said elastomeric material of said outer surface of said extension 1108, to form a fluid tight seal when said container 100 may be mounted on said adapter 210, wherein said sample receptacle 110 may comprise one or more outer rings 1109, said one or more outer ring may extend outwardly from said outer base surface, wherein at least a portion of said inner surface of said adapter 210, configured to be in contact with said one or more outer rings 1109 of said container 100 when said container 100 may be mounted on said adapter 210, may be made from or may be coated with an elastomeric material substantially coextensive with said elastomeric material of said outer surface of said one or more outer rings 1109, to form a fluid tight seal when said container 100 may be mounted on said adapter 210, and said system may comprise a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, wherein said first layer 310 may have an average thickness of about 0.1 mm to about 0.3 mm, wherein said at least one fluid channel 3102 may comprise two or more fluid channels 3102 substantially equidistant from said sample receiving inlet 3101, wherein pore size of said vent 3103 may have an average diameter of about 0.1 μm to about 10 μm, wherein said sample receiving inlet 3101 may comprise a lyophilized reagent 2105, wherein a width of each fluid channel 3102 may be about 0.3 mm to about 1 mm, wherein said device 300 further may comprise a second layer 320 with at least one side coated with a hydrophilic material, and when said second layer 320 may be operably coupled with said first layer 310, said side coated with the hydrophilic material faces and/or may be in contact with the first layer 310, wherein said device 300 further may comprise a third layer

330 with at least one side coated with a hydrophilic material, and when said third layer 330 may be operably coupled with said first layer 310, said side coated with the hydrophilic material faces and/or may be in contact with the first layer 310, wherein said device 300 further may comprise a fourth layer 340, and the fourth layer 340 may comprise at least one vent 3401 sealed by a hydrophobic vent material, when said device 300 may be assembled, said terminus of each fluid channel 3102 in said first layer 310 may be in fluid communication with said at least one vent 3401 of the fourth layer 340, wherein said device 300 further may comprise a fifth layer 350, said fifth layer 350 may comprise a substrate coated with a layer of conductive material, and said conductive material may be ablated to form insulative areas on said fifth layer 350, wherein said fifth layer 350 may comprise two symmetrically positioned insertion monitoring electrodes 3501, and when said device 300 may be assembled, said insertion monitoring electrodes 3501 may be exposed and not covered by any other layer of said device 350, wherein said fifth layer 350 may comprise at least one working area 3502, said working area 3502 may comprise a working electrode, a counter electrode, a reference electrode and at least two fluid fill electrodes, wherein said device 300 further may comprise an adapter 210 for operably coupling to a container 100, wherein said sample receiving inlet 2101 of said adapter 210 may comprise a blocking element 2104 having a bottom configured to prevent said lyophilized reagent 2105 from leaving said device 300.

The present disclosure provides a system, said system may comprise a container 100, comprising a sample receptacle 110 and a cap 120, wherein: the cap 120 may comprise a reservoir 1201 for retaining a composition, a first piercing member 1202 and a first pierceable barrier 1203 for sealing said composition within said reservoir 1201; the sample receptacle 110 may comprise a first open end 1101 for receiving a sample, and one or more second piercing members 1102, said first open end 1101 may be configured for closure by said cap 120 and for receiving said composition; said first piercing member 1202 and said one or more second piercing members 1102 may be configured to disestablish the first pierceable barrier 1203 from opposite side of said first pierceable barrier 1203 when said first open end 1101 may be closed by said cap 120, wherein said cap 120 may comprise a top inner surface 1204, and said first piercing member 1202 may extend from the top inner surface 1204 of said cap 120, wherein said one or more second piercing members 1102 extend from the inner base surface 1103 of said sample receptacle 110, wherein said sample receptacle 110 may comprise two of said second piercing members 1102 configured to allow said first piercing member 1202 to be positioned between two of said second piercing members 1102 when said first open end 1101 may be closed by said cap 120, wherein said sample receptacle 110 may comprise an outlet 1104, and said outlet 1104 may be in fluidic communication with said sample receptacle 110, wherein said outlet 1104 may be sealed by a second pierceable barrier 1105, wherein at least a portion of an interior surface 1106 of the sample receptacle 110, configured to be in contact with said wall 1205 of the cap 120 when the cap 120 may be closed, may be made from or may be coated with an elastomeric material substantially coextensive with said elastomeric material of the outer surface of the wall 1205, for sealing the first open end 1101 against flow when the atmospheric pressure may be equal to or greater than the pressure in the container 100, wherein the reservoir 1201 may be sized to accommodate no less than about 500 μL fluid, wherein said sample receptacle 110 may comprise one or more third piercing members 1107 located on an outer base surface of said sample receptacle 110, said one or more third piercing members 1107 extend outwardly from said outer base surface, wherein sample receptacle 110 may comprise an extension 1108, said extension 1108 may extend outwardly from said outer base surface of said sample receptacle 110 and an inner of said extension may be in fluidic communication with said first open 1101, wherein at least a portion of said inner surface of said sample receiving inlet 2101, configured to be in contact with said extension 1108 of said container 100 when said container 100 may be mounted on said adapter 210, may be made from or may be coated with an elastomeric material substantially coextensive with said elastomeric material of said outer surface of said extension 1108, to form a fluid tight seal when said container 100 may be mounted on said adapter 210, wherein said sample receptacle 110 may comprise one or more outer rings 1109, said one or more outer ring may extend outwardly from said outer base surface, wherein at least a portion of said inner surface of said adapter 210, configured to be in contact with said one or more outer rings 1109 of said container 100 when said container 100 may be mounted on said adapter 210, may be made from or may be coated with an elastomeric material substantially coextensive with said elastomeric material of said outer surface of said one or more outer rings 1109, to form a fluid tight seal when said container 100 may be mounted on said adapter 210, and said system may comprise a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, wherein said first layer 310 may have an average thickness of about 0.1 mm to about 0.3 mm, wherein said at least one fluid channel 3102 may comprise two or more fluid channels 3102 substantially equidistant from said sample receiving inlet 3101, wherein pore size of said vent 3103 may have an average diameter of about 0.1 μm to about 10 μm, wherein said sample receiving inlet 3101 may comprise a lyophilized reagent 2105, wherein a width of each fluid channel 3102 may be about 0.3 mm to about 1 mm, wherein said device 300 further may comprise a second layer 320 with at least one side coated with a hydrophilic material, and when said second layer 320 may be operably coupled with said first layer 310, said side coated with the hydrophilic material faces and/or may be in contact with the first layer 310, wherein said device 300 further may comprise a third layer 330 with at least one side coated with a hydrophilic material, and when said third layer 330 may be operably coupled with said first layer 310, said side coated with the hydrophilic material faces and/or may be in contact with the first layer 310, wherein said device 300 further may comprise a fourth layer 340, and the fourth layer 340 may comprise at least one vent 3401 sealed by a hydrophobic vent material, when said device 300 may be assembled, said terminus of each fluid channel 3102 in said first layer 310 may be in fluid communication with said at least one vent 3401 of the fourth layer 340, wherein said device 300 further may comprise a fifth layer 350, said fifth layer 350 may comprise a substrate coated with a layer of conductive material, and said conductive material may be ablated to form insulative areas on said fifth layer 350, wherein said fifth layer 350 may comprise two symmetrically positioned insertion monitoring electrodes 3501, and when said device 300 may be assembled, said insertion monitoring electrodes 3501 may be exposed and not covered by any other layer of said device 350, wherein said fifth layer 350 may comprise at least one working area 3502, said working area 3502 may comprise a working electrode, a counter electrode, a reference electrode and at least two fluid fill electrodes, wherein said device 300 further may comprise an adapter 210 for operably coupling to a container 100, wherein said sample receiving inlet 2101 of said adapter 210 may comprise a blocking element 2104 having a bottom configured to prevent said lyophilized reagent 2105 from leaving said device 300, wherein said blocking element 2104 may comprise at least one piercing member 2103 extending upwardly toward said pierceable barrier, wherein said container 100 may comprise one or more piercing member 1107, and said piercing member 2103 of said device 300 may be allowed to be positioned between said piercing member 1107 of said container 100 when said container 100 may be mounted on said device 300.

The present disclosure provides a system, said system may comprise a container 100, comprising a sample receptacle 110 and a cap 120, wherein: the cap 120 may comprise a reservoir 1201 for retaining a composition, a first piercing member 1202 and a first pierceable barrier 1203 for sealing said composition within said reservoir 1201; the sample receptacle 110 may comprise a first open end 1101 for receiving a sample, and one or more second piercing members 1102, said first open end 1101 may be configured for closure by said cap 120 and for receiving said composition; said first piercing member 1202 and said one or more second piercing members 1102 may be configured to disestablish the first pierceable barrier 1203 from opposite side of said first pierceable barrier 1203 when said first open end 1101 may be closed by said cap 120, wherein said cap 120 may comprise a top inner surface 1204, and said first piercing member 1202 may extend from the top inner surface 1204 of said cap 120, wherein said one or more second piercing members 1102 extend from the inner base surface 1103 of said sample receptacle 110, wherein said sample receptacle 110 may comprise two of said second piercing members 1102 configured to allow said first piercing member 1202 to be positioned between two of said second piercing members 1102 when said first open end 1101 may be closed by said cap 120, wherein said sample receptacle 110 may comprise an outlet 1104, and said outlet 1104 may be in fluidic communication with said sample receptacle 110, wherein said outlet 1104 may be sealed by a second pierceable barrier 1105, wherein at least a portion of an interior surface 1106 of the sample receptacle 110, configured to be in contact with said wall 1205 of the cap 120 when the cap 120 may be closed, may be made from or may be coated with an elastomeric material substantially coextensive with said elastomeric material of the outer surface of the wall 1205, for sealing the first open end 1101 against flow when the atmospheric pressure may be equal to or greater than the pressure in the container 100, wherein the reservoir 1201 may be sized to accommodate no less than about 500 μL fluid, wherein said sample receptacle 110 may comprise one or more third piercing members 1107 located on an outer base surface of said sample receptacle 110, said one or more third piercing members 1107 extend outwardly from said outer base surface, wherein sample receptacle 110 may comprise an extension 1108, said extension 1108 may extend outwardly from said outer base surface of said sample receptacle 110 and an inner of said extension may be in fluidic communication with said first open 1101, wherein at least a portion of said inner surface of said sample receiving inlet 2101, configured to be in contact with said extension 1108 of said container 100 when said container 100 may be mounted on said adapter 210, may be made from or may be coated with an elastomeric material substantially coextensive with said elastomeric material of said outer surface of said extension 1108, to form a fluid tight seal when said container 100 may be mounted on said adapter 210, wherein said sample receptacle 110 may comprise one or more outer rings 1109, said one or more outer ring may extend outwardly from said outer base surface, wherein at least a portion of said inner surface of said adapter 210, configured to be in contact with said one or more outer rings 1109 of said container 100 when said container 100 may be mounted on said adapter 210, may be made from or may be coated with an elastomeric material substantially coextensive with said elastomeric material of said outer surface of said one or more outer rings 1109, to form a fluid tight seal when said container 100 may be mounted on said adapter 210, wherein said cap may comprise a first snap feature 1206 and said sample receptacle 110 may comprise a second snap feature 1110, said first snap feature 1206 and said second snap feature 1110 may be configured for said first open 1101 to be irreversibly closed by said cap 120, wherein said sample receptacle may have a height of about 10 mm to about 500 mm; and said system may comprise a device 300 comprising a first layer 310, said first layer 310 may comprise a sample receiving inlet 3101, and at least one fluid channel 3102 extending from and in fluidic communication with said sample receiving inlet 3101, the terminus of each fluid channel may be in fluid communication with a vent 3103 sealed by a hydrophobic vent material, wherein said first layer 310 may have an average thickness of about 0.1 mm to about 0.3 mm, wherein said at least one fluid channel 3102 may comprise two or more fluid channels 3102 substantially equidistant from said sample receiving inlet 3101, wherein pore size of said vent 3103 may have an average diameter of about 0.1 μm to about 10 μm, wherein said sample receiving inlet 3101 may comprise a lyophilized reagent 2105, wherein a width of each fluid channel 3102 may be about 0.3 mm to about 1 mm, wherein said device 300 further may comprise a second layer 320 with at least one side coated with a hydrophilic material, and when said second layer 320 may be operably coupled with said first layer 310, said side coated with the hydrophilic material faces and/or may be in contact with the first layer 310, wherein said device 300 further may comprise a third layer 330 with at least one side coated with a hydrophilic material, and when said third layer 330 may be operably coupled with said first layer 310, said side coated with the hydrophilic material faces and/or may be in contact with the first layer 310, wherein said device 300 further may comprise a fourth layer 340, and the fourth layer 340 may comprise at least one vent 3401 sealed by a hydrophobic vent material, when said device 300 may be assembled, said terminus of each fluid channel 3102 in said first layer 310 may be in fluid communication with said at least one vent 3401 of the fourth layer 340, wherein said device 300 further may comprise a fifth layer 350, said fifth layer 350 may comprise a substrate coated with a layer of conductive material, and said conductive material may be ablated to form insulative areas on said fifth layer 350, wherein said fifth layer 350 may comprise two symmetrically positioned insertion monitoring electrodes 3501, and when said device 300 may be assembled, said insertion monitoring electrodes 3501 may be exposed and not covered by any other layer of said device 350, wherein said fifth layer 350 may comprise at least one working area 3502, said working area 3502 may comprise a working electrode, a counter electrode, a reference electrode and at least two fluid fill electrodes, wherein said device 300 further may comprise an adapter 210 for operably coupling to a container 100, wherein said sample receiving inlet 2101 of said adapter 210 may comprise a blocking element 2104 having a bottom configured to prevent said lyophilized reagent 2105 from leaving said device 300, wherein said blocking element 2104 may comprise at least one piercing member 2103 extending upwardly toward said pierceable barrier, wherein said container 100 may comprise one or more piercing member 1107, and said piercing member 2103 of said device 300 may be allowed to be positioned between said piercing member 1107 of said container 100 when said container 100 may be mounted on said device 300, wherein said one or more snap features 2102 of said adapter 210 and one or more snap features 1111 of a container 100 may be configured for said container 100 to be irreversibly mounted on said device 300, wherein at least a portion of the inner surface of the adapter 210, configured to be in contact with one or more outer rings 1109 of an outer base surface of a container 100 when said container 100 may be mounted on said device 300, may be made from or may be coated with an elastomeric material substantially coextensive with said elastomeric material of the outer surface of said outer rings 1109, to form a fluid tight seal when said container 100 may be mounted on said adapter 210.

Figure 13:
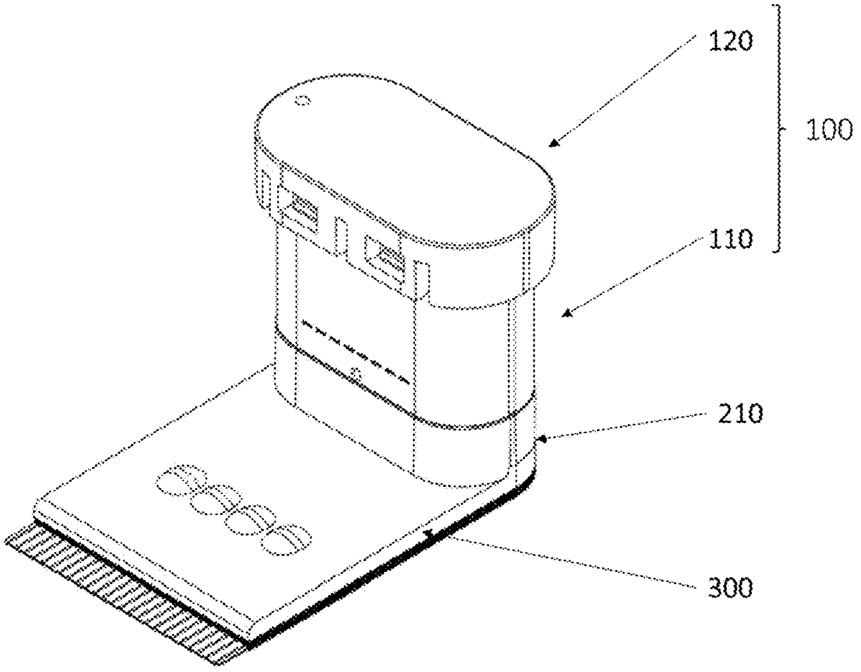
FIG. 13 illustrates an overview of another present system.

FIG. 13 illustrates an overview of the present system. The system may comprise the container 100 and a device 300. Wherein said container 100 may comprise a sample receptacle 110 and a cap 120. Wherein said device 300 may further comprise an adapter 210 for operably coupling to a container 100.

FIGS. 23A-23G illustrate each view of a reader. The reader may comprise a thermo control module, a signal detection module, one or more lights, and one or more enclosures.

Figure 24A:
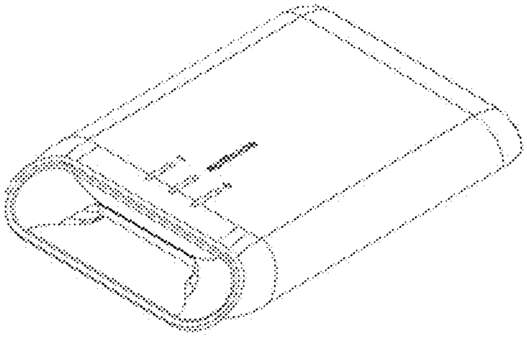
FIGS. 24A-24N illustrate each view of one or more enclosures.
Figure 24B:
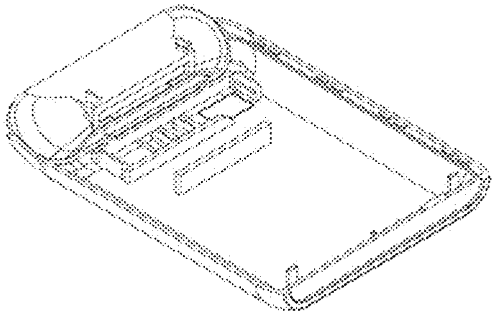
Figure 24C:
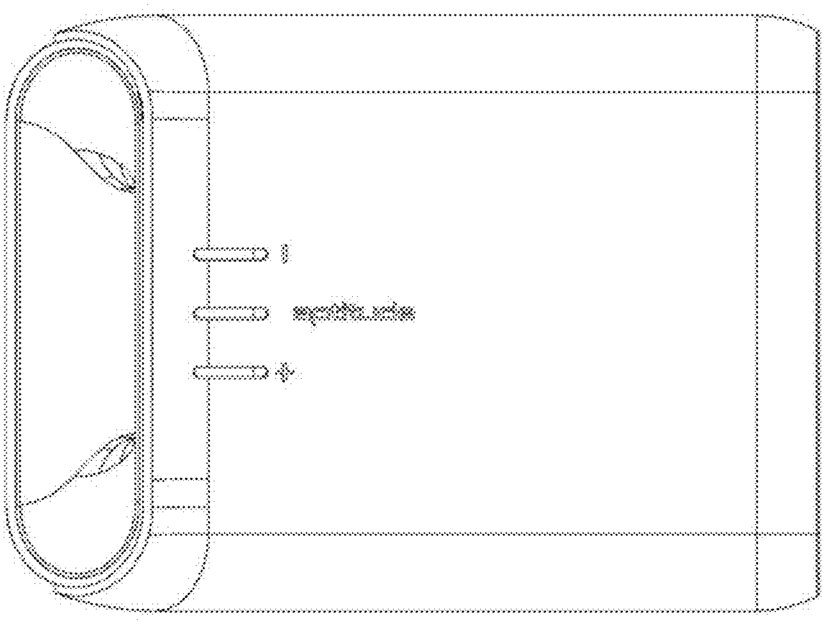
Figure 24D:
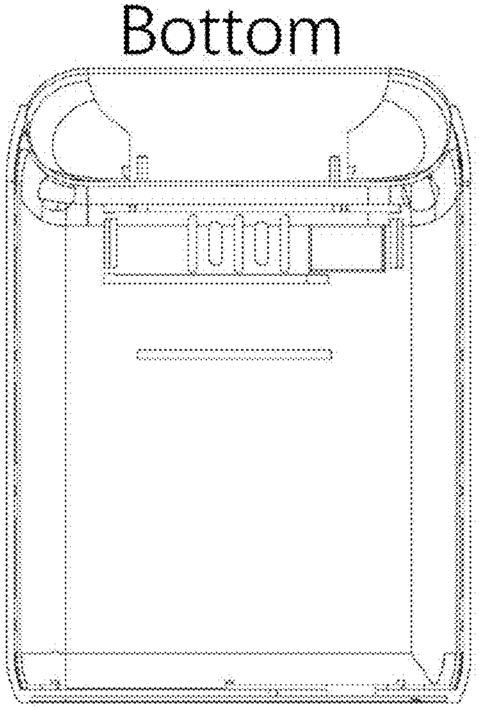
Figure 24E:
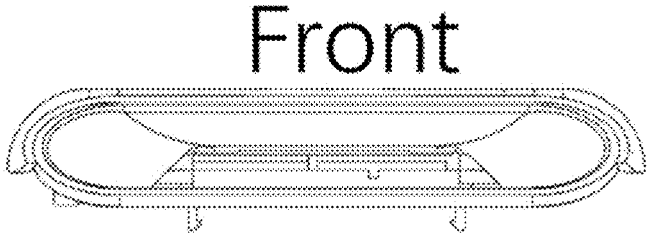
Figure 24F:
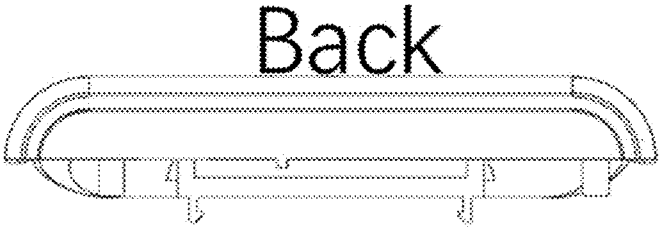
Figure 24G:
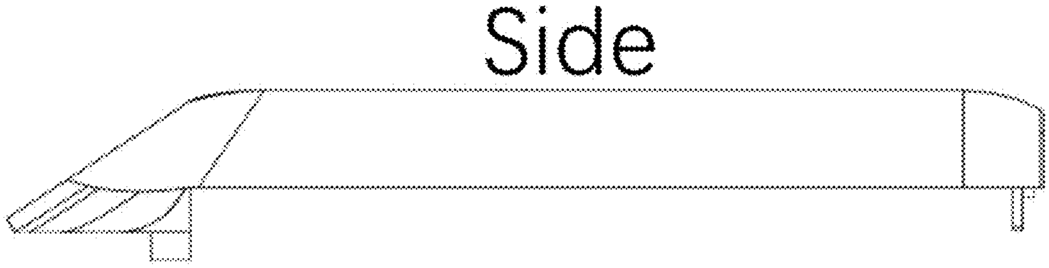
Figure 24H:
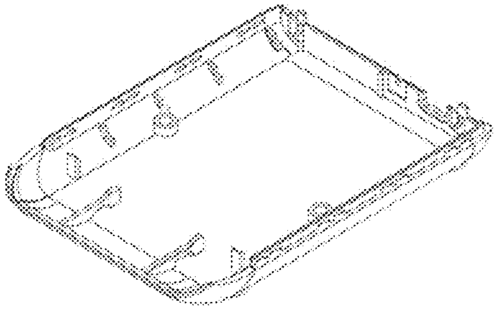
Figure 24I:
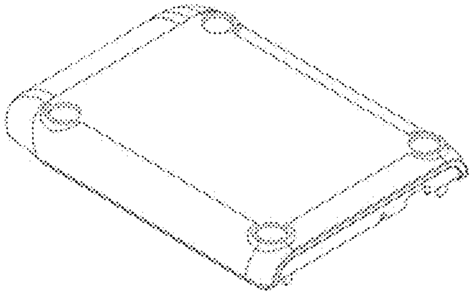
Figure 24J:
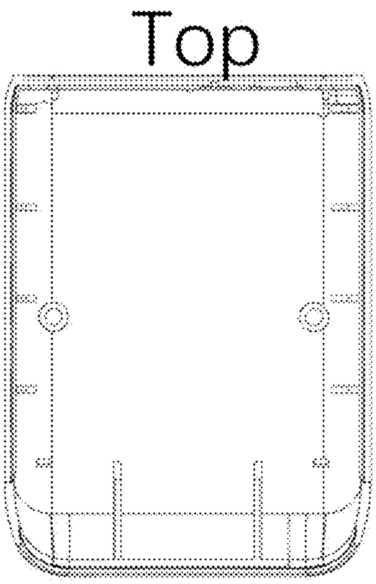
Figure 24K:
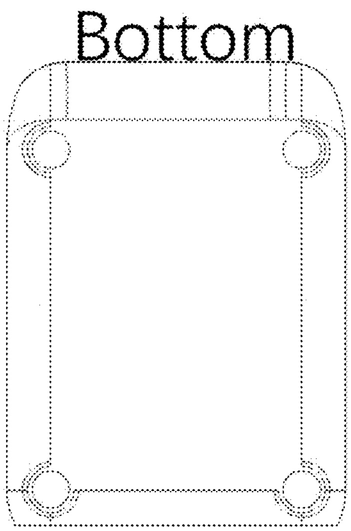
Figure 24L:
Figure 24M:
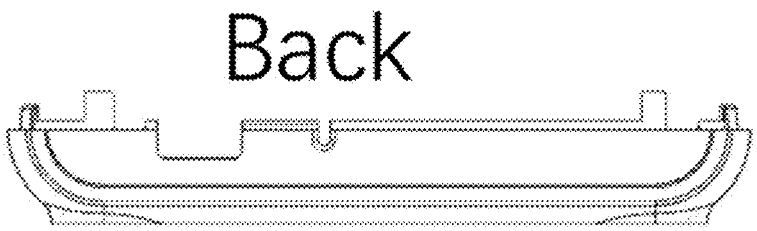
Figure 24N:
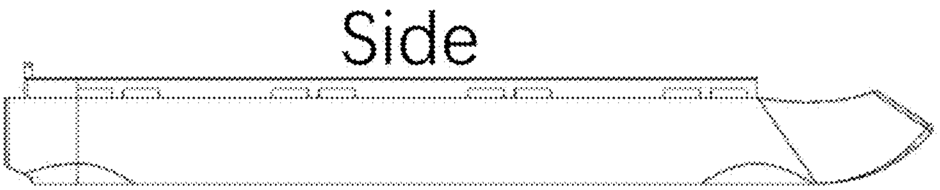

FIGS. 24A-24N illustrate each view of one or more enclosures. The reader may comprise one or more lights, which may be used to indicate the test status and/or test results. The reader may comprise electronics that enable: electrochemical monitoring of the reaction, temperature control for optimal reaction conditions, and/or data interpretation for calling positive/negative. The reader may be powered by cable and be wirelessly connecting to other devices and remote database. Reader may have an opening that guides the sensor into the proper position for simple, reliable electrical contact. Reader may be constructed from chemically resistant material for easy cleaning. The two enclosures may be snapped for assembly. The enclosures may comprise rib and/or lock to hold the PCB. The enclosures may comprise notches to hold the PCB.

Figure 25A:
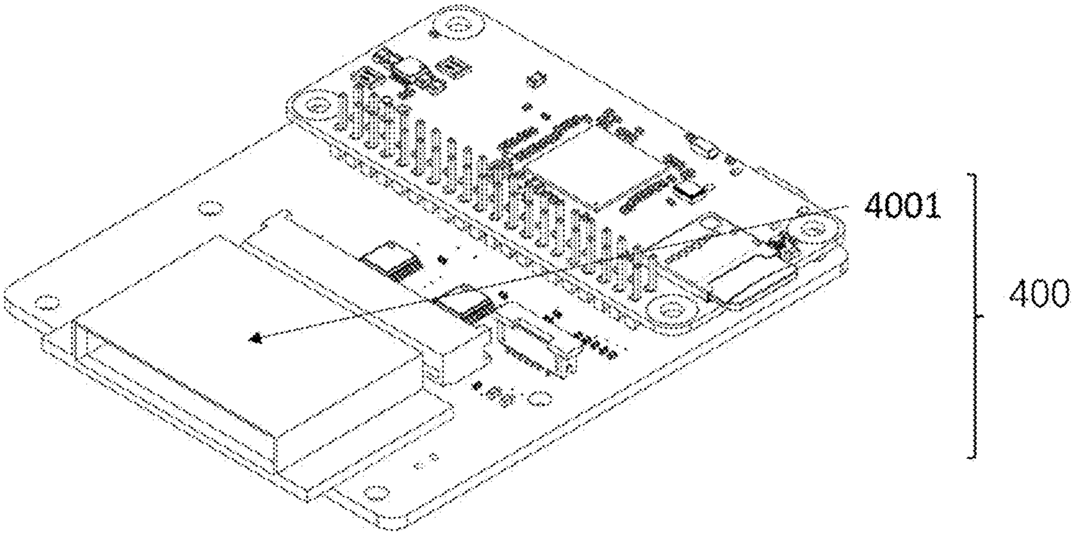
FIGS. 25A-25B illustrate the present main PCB of the reader.
Figure 25B:
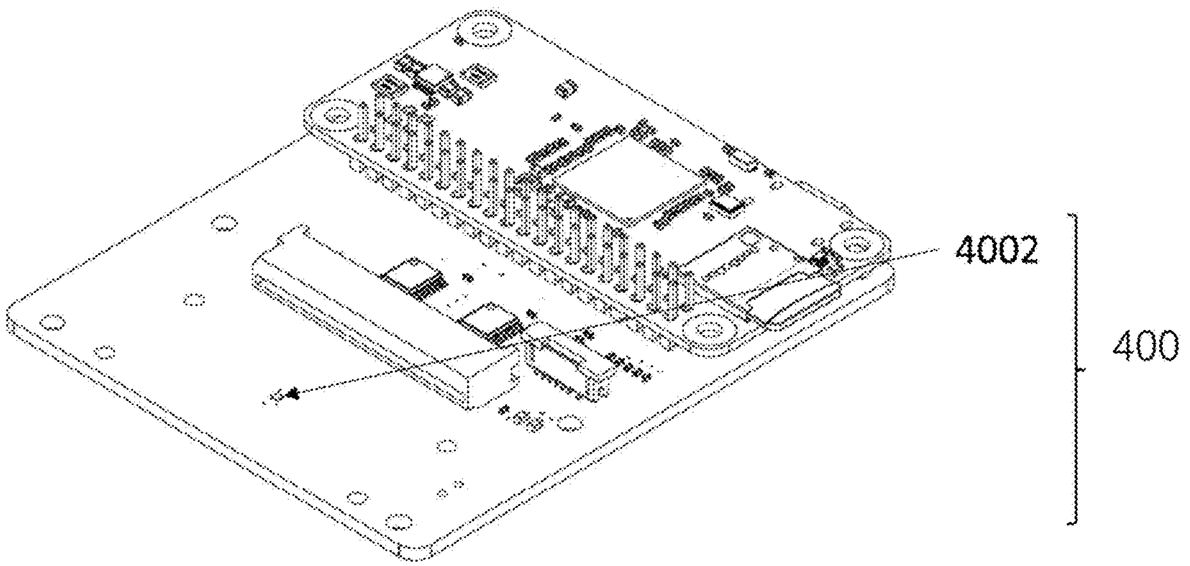

FIGS. 25A-25B illustrate the present main PCB 400 of the reader. The main PCB 400 may comprise an Aluminum heating block (AHB) 4001 for local heating. The main PCB 400 may comprise an Aluminum heating block (AHB) 4001 for uniform local heating. The main PCB 400 may comprise the top layer copper wire as the resistive heating element. The main PCB 400 may comprise temperature sensor 4002 embedded under AHB 4001 for temperature sensing. When the device 300 is inserted into the reader, the reaction chamber 3104 may be covered by the Aluminum heating block 4001. The reaction chamber 3104 may be positioned under the Aluminum heating block 4001 for uniform local heating.

The present disclosure provides a system, said system further may comprise a thermo control module.

The present disclosure provides a system, wherein said thermo control module may be configured to perform isothermal nucleic acid amplification.

The present disclosure provides a system, wherein said thermo control module may be configured to maintain a temperature of about 55° C. to about 75° C. For example, said thermo control module may be configured to maintain a temperature of about 55° C. to about 75° C., about 55° C. to about 70° C., about 55° C. to about 65° C., about 55° C. to about 60° C., about 60° C. to about 75° C., about 60° C. to about 70° C., about 60° C. to about 65° C., about 65° C. to about 75° C., about 65° C. to about 70° C., or about 70° C. to about 75° C. For example, said thermo control module may be configured to maintain a temperature of about 55° C., about 60° C., about 65° C., about 70° C., or about 75° C.

The present disclosure provides a system, the system further may comprise a signal detection module.

The present disclosure provides a system, wherein said signal may be an electrochemical signal.

The present disclosure provides a system, wherein said signal may be a qualitative signal and/or a quantitative signal. For example, the signal of a current.

A container of the present disclosure may be used for processing and/or modifying a biological sample (e.g., diluting, mixing or reacting).

A container in the present disclosure may be for performing biological assays by modifying properties of biological samples and detecting these modified properties. As used herein, a "biological sample" may be a sample containing a quantity of organic material, e.g., one or more organic molecules, such as one or more nucleic acids e.g., DNA and/or RNA or portions thereof, which may be taken from a subject. As such, a "biological sample assay" may be test on a biological sample which may be performed to evaluate one or more characteristics of the sample. In some aspects a biological sample may be a nucleic acid amplification sample, which may be a sample including or suspected of including one or more nucleic acids or portions thereof which can be amplified.

A biological sample may be provided by a subject and include one or more cells, such as tissue cells of the subject. As used herein, the term "tissue" generally refers to one or more aggregates of cells in a subject (e.g., a living organism, such as a mammal, such as a human) that may have a similar function and structure or to a plurality of different types of such aggregates. Tissue may include, for example, organ tissue, muscle tissue (e.g., cardiac muscle; smooth muscle; and/or skeletal muscle), connective tissue, nervous tissue and/or epithelial tissue. Tissue may, in some versions, include cells from the inside of a subject's cheek and/or cells in a subject's saliva.

As noted above, a biological sample may be provided by a subject. A subject may be a "mammal" or a "mammalian" subject, where these terms may be used broadly to describe organisms which may be within the class mammalia, including the orders carnivore (e.g., dogs and cats), rodentia (e.g., mice, guinea pigs, and rats), and primates (e.g., humans, chimpanzees, and monkeys). The subject may be a human. The term "humans" may include human subjects of both genders and at any stage of development (e.g., fetal, neonates, infant, juvenile, adolescent, and adult), where the human subject may be a juvenile, adolescent or adult. While the devices and methods described herein may be applied in association with a human subject, it may be to be understood that the subject devices and methods may also be applied in association with other subjects, that is, on "non-human subjects".

A biological sample, as referred to herein, may in some versions be a prepared biological sample. A prepared biological assay sample may be a biological assay sample which may have been processed for example by exposing the sample to a preparation solution, such as a solution including a lysing agent, such as a detergent. Accordingly, a biological sample may be a lysate. Such preparation may enable the prepared biological sample to react, for example, with assay reagents and/or a property modifying reagent upon exposure thereto. The exposure may include lysing cells of the sample with a lysing agent of the preparation solution and/or extracting nucleic acids therefrom. Such extracted nucleic acids may be released into a resulting prepared sample solution. A step of extracting genomic deoxyribonucleic acid (DNA) from a biological sample may be included. Where desired, the preparation solution may be a nucleic acid amplification preparation solution and exposure to the solution prepares nucleic acids of the sample for amplification, e.g., isothermal amplification.

Methods

The present disclosure provides a method for collecting and/or storing a sample, comprising using the container of the present disclosure.

The present disclosure provides a method for determining the presence and/or amount of a target in a sample, comprising using the container of the present disclosure, the device of the present disclosure, and/or the system of the present disclosure.

The present disclosure provides a method for preparing a sample derived from a subject, comprising: I) introducing the sample into a sample receptacle 110 through a first open end 1101 of said sample receptable 110; II) closing said first open end 1101 irreversibly by attaching a cap 120 to said sample receptable 110; III) said cap 120 may comprise a reservoir 1201 for retaining a composition, a first piercing member 1202 and a first pierceable barrier 1203 for sealing said composition within said reservoir 1201; IV) said sample receptacle 110 may comprise one or more second piercing members 1102; and V) when the first open end 1101 of the sample receptacle 110 may be closed by said cap 120, said first piercing member 1202 and said one or more second piercing members 1102 effect a force to disestablish the first pierceable barrier 1203 from opposite side of said first pierceable barrier 1203.

The method may further comprise mixing the composition released from the cap 120 and the sample within said irreversibly closed sample receptable 110.

Wherein said first piercing member 1202 may extend downwardly toward said first open end 1101 of the sample receptacle 110 when said first open end 1101 may be closed by said cap 120.

The method may further comprise using the container of the present disclosure.

The present disclosure provides a method for determining the presence and/or amount of a target in a sample, the method may comprise: I) preparing the sample using the container of any one of the present disclosures, II) mounting the container comprising the prepared sample on the device of any one of the present disclosures; and III) inserting said device into a reader comprising a thermo control module and a signal detection module.

Wherein said first piercing member 1202 may extend downwardly toward said first open end 1101 of the sample receptacle 110 when said first open end 1101 may be closed by said cap 120.

EXAMPLES

The following examples are set forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., s or sec, second(s); min or minute(s); h or hr., hour(s); and the like.

Example 1

A user deposits saliva directly into the opening of the sample receptacle 110 device up to the fill line (approximately 750 μL). The user then inserts the provided cap 120, which contains the dilution buffer (1.5 mL), into the sample receptacle 110 which brings the buffer seal into contact with the piercing features. The user continues to apply pressure to/insert the cap which pierces the seal and triggers the buffer to automatically flow into the sample receptacle 110 and dilute the sample. When fully inserted, the cap snaps onto sample receptacle 110 (irreversibly) and a seal is formed to prevent sample leakage. The user may then shake or invert the container 100 to mix the sample.

Example 2

The user mates the container 100 with the adapter 210 on top of the device 300. As the user inserts the container 100 into the adapter 210, the first contact between the piercing features 1107 on the bottom of the sample receptacle 110 and the foil seal on the adapter inlet is made. Continued insertion/applied pressure breaks this seal and then allows the contact between the piercing feature 2103 inside the sample receiving inlet 2101 of an adapter 210 and the foil seal of the outlet 1104 of the sample receptable 110. Continued insertion/applied pressure pierces this foil and triggers the fluid inside of the sample receptable 110 to automatically flow into the sample receiving inlet 2101 of an adapter 210. This fluid flow is driven by gravity and the fluid height within the sample receptable 110. Noted that successful fluid flow requires that 0.75 mL of liquid is provided. When fully inserted, the container 100 snaps irreversibly onto the adapter 210 and forms a liquid seal at the joining interfaces.

As fluid flows out of the sample receptable 110 and into the sample receiving inlet 2101 of an adapter 210, fluid comes into contact with the lyophilized reagent 2105 which immediately dissolves. The lyophilized reagent 2105 contains all necessary reagents to perform the RT-LAMP reaction as well as an electrochemical reporter. The fluid continues to flow into the device 300 and carries an equal amount of dissolved master mix into each reaction chamber where each chamber's dried primer is resuspended. The fluid continues to flow towards the vent 3103 of first layer 310 of the device 300; and when the fluid contacts the self-sealing membranes placed at the terminus of each fluid channel 3102, all liquid flow is halted and the device 300 is ready to be inserted into a reader for measurement.

Example 3

While powered on and ready to accept a new device 300 for measurement, the reader continuously scans the insertion monitoring electrodes 3501 to detect an electrical short which is provided once the device 300 is fully inserted. Once insertion is detected, the reader will then scan the fluid fill electrodes at the entrance and exit of each working area 3502 to ensure that each working area 3502 is completely filled with fluid. The scan method for this process is square wave voltammetry and a positive fluid fill trigger is denoted by an increase in baseline current above a defined threshold.

Once a positive fluid fill trigger is observed by the reader, the measurement will start automatically. This process begins by heating the device 300 platform, and thus the device 300, to 65° C. which initiates the RT-LAMP reaction. When the test target is present in the reaction chamber, the RT-LAMP reaction produces a significant amount of double-stranded DNA which sequesters the electrochemical reporter via intercalation. When intercalated with dsDNA, the electrochemical reporter is hindered in producing signal current which is monitored via square wave voltammetry. In a sample with the target present, the result observed is a decrease in peak current relative to a negative control. If the target is not present in the sample, then peak current remains unchanged and matches that of the negative control.

Once the test protocol is complete, the reader will notify the user via LED lights on the reader itself as well as through a mobile application and/or web-based application. The user can remove the device 300 and dispose of it. The reader is then ready to accept a new device 300.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A container, comprising a sample receptacle and a cap, wherein:

the cap comprises a reservoir for retaining a composition, a first piercing member and a first pierceable barrier for sealing said composition within said reservoir;

the sample receptacle comprises a first open end for receiving a sample, and one or more second piercing members, said first open end is configured for closure by said cap and for receiving said composition;

said first piercing member and said one or more second piercing members are configured to disestablish the first pierceable barrier from opposite side of said first pierceable barrier when said first open end is closed by said cap;

wherein said cap comprises a wall defining the outer perimeter of said reservoir, wherein an outer surface of said wall is made from or is coated with an elastomeric material for sealingly engagement against an inner surface of said sample receptacle when said first open end is closed by said cap;

wherein at least a portion of an interior surface of the sample receptable, configured to be in contact with said wall of the cap when the cap is closed, is made from or is coated with an elastomeric material substantially coextensive with said elastomeric material of the outer surface of the wall; and wherein pressure inside said container is greater than atmospheric pressure when said first open end is closed and pressed by said cap.

2. The container according to claim 1, wherein said sample receptacle comprises two of said second piercing members configured to allow said first piercing member to be positioned between two of said second piercing members when said first open end is closed by said cap.

3. The container according to claim 1, wherein said sample receptacle comprises one or more of a third piercing members located on an outer base surface of said sample receptacle, one or more said third piercing members extend outwardly from said outer base surface.

4. The container according to claim 3, wherein sample receptacle comprises an extension, said extension extends outwardly from said outer base surface of said sample receptacle and an inner of said extension is in fluidic communication with said first open, and wherein said sample receptacle comprises a filter, said filter is configured to filter out debris from sample.

5. The container according to claim 3, wherein said one or more third piercing members are configured to disestablish a pierceable barrier of an adapter, when said container is mounted on said adapter.

6. The container according to claim 5, wherein said sample receptacle comprises one or more outer rings, said one or more outer ring extends outwardly from said outer base surface of said sample receptacle, and wherein at least a portion of inner surface of said adapter, configured to be in contact with said one or more outer rings of said container when said container is mounted on said adapter, is made from or is coated with an elastomeric material substantially coextensive with said elastomeric material of said outer surface of said one or more outer rings, to form a fluid tight seal when said container is mounted on said adapter.

7. The container according to claim 1, wherein said cap comprises a first snap feature and said sample receptacle comprises a second snap feature, said first snap feature and said second snap feature are configured for said first open to be irreversibly closed by said cap.

8. The container according to claim 1, wherein said sample receptacle has a height of no less than about 10 mm.

9. A system, comprising:

a container according to claim 1; a device comprising a first layer, said first layer comprises a sample receiving inlet, and at least one fluid channel extending from and in fluidic communication with said sample receiving inlet, the terminus of each fluid channel is in fluid communication with a vent sealed by a hydrophobic vent material; and wherein said device further comprises an adapter for operably coupling to the container.

10. The system according to claim 9, said system comprises a reader, said reader comprises a thermo control module and a signal detection module.

11. The system according to claim 10, said reader comprise a heating block, said heating block is configured for uniform heating a reaction chamber of said device.

12. A method for preparing a sample derived from a subject, comprising:

I) introducing the sample into a sample receptacle through a first open end of said sample receptable;

II) closing said first open end irreversibly by attaching a cap to said sample receptable;

III) said cap comprises a reservoir for retaining a composition, a first piercing member and a first pierceable barrier for sealing said composition within said reservoir;

wherein said cap comprises a wall defining the outer perimeter of said reservoir, wherein an outer surface of said wall is made from or is coated with an elastomeric material for sealingly engagement against an inner surface of said sample receptacle when said first open end is closed by said cap;

IV) said sample receptacle comprises one or more second piercing members;

wherein at least a portion of an interior surface of the sample receptable, configured to be in contact with said wall of the cap when the cap is closed, is made from or is coated with an elastomeric material substantially coextensive with said elastomeric material of the outer surface of the wall;

V) when the first open end of the sample receptacle is closed by said cap, said first piercing member and said one or more second piercing members effect a force to disestablish the first pierceable barrier from opposite side of said first pierceable barrier.

13. A method for determining the presence and/or amount of a target in a sample, comprising:

I) preparing the sample using the container of claim 1,

II) mounting the container comprising the prepared sample on the device comprising a first layer, said first layer comprises a sample receiving inlet, and at least one fluid channel extending from and in fluidic communication with said sample receiving inlet, the terminus of each fluid channel is in fluid communication with a vent sealed by a hydrophobic vent material; and III) inserting said device into a reader comprising a thermo control module and a signal detection module.

* * * * *